(12) United States Patent  
Tung et al.

(10) Patent No.: US 8,395,621 B2  
(45) Date of Patent: Mar. 12, 2013

(54) SYSTEM FOR PROVIDING STRATEGIES FOR INCREASING EFFICIENCY OF DATA CENTERS

(75) Inventors: Teresa S. Tung, San Jose, CA (US); Jacob O. Wenegrat, Menlo Park, CA (US)

(73) Assignee: Accenture Global Services Limited (IE)

( * ) Notice: Subject to any disclaimer, the term of this patent is extended or adjusted under 35 U.S.C. 154(b) by 1239 days.

(21) Appl. No.: 12/030,040

(22) Filed: Feb. 12, 2008

(65) Prior Publication Data

US 2009/0201293 A1 Aug. 13, 2009

(51) Int. Cl.
*G06T 11/20* (2006.01)
(52) U.S. Cl. ............................................. 345/440
(58) Field of Classification Search .................. 345/440
See application file for complete search history.

(56) References Cited

U.S. PATENT DOCUMENTS

| | | | |
|---|---|---|---|
| 5,483,656 A * | 1/1996 | Oprescu et al. | 713/320 |
| 5,555,195 A * | 9/1996 | Jensen et al. | 700/276 |
| 5,852,560 A | 12/1998 | Takeyama et al. | |
| 5,960,214 A * | 9/1999 | Sharpe et al. | 710/15 |
| 6,490,569 B1 | 12/2002 | Grune et al. | |
| 7,333,903 B2 | 2/2008 | Walters et al. | |
| 7,386,743 B2 * | 6/2008 | Bahali et al. | 713/300 |
| 2002/0004913 A1 * | 1/2002 | Fung | 713/300 |
| 2003/0212589 A1 | 11/2003 | Kish | |
| 2004/0044476 A1 | 3/2004 | Miyamoto et al. | |
| 2004/0049424 A1 | 3/2004 | Murray et al. | |
| 2004/0186927 A1 * | 9/2004 | Eryurek et al. | 710/12 |
| 2005/0102544 A1 * | 5/2005 | Brewer et al. | 713/320 |
| 2005/0144437 A1 | 6/2005 | Ransom et al. | |
| 2005/0231758 A1 | 10/2005 | Reynolds | |
| 2006/0053023 A1 * | 3/2006 | Matsunaga et al. | 705/1 |

(Continued)

FOREIGN PATENT DOCUMENTS

| | | |
|---|---|---|
| GB | 2408592 A | 1/2005 |
| JP | 2004 185310 | 7/2004 |

(Continued)

OTHER PUBLICATIONS

Managing server energy and operational costs in hosting centers Yiyu Chen, Amitayu Das, Wubi Qin, Anand Sivasubramaniam, Qian Wang, Natarajan Gautam Jun. 2005 SIGMETRICS '05: Proceedings of the 2005 ACM.*

(Continued)

*Primary Examiner* — Javid A Amini
(74) *Attorney, Agent, or Firm* — Brinks Hofer Gilson & Lione

(57) ABSTRACT

A system is described for providing strategies for increasing the efficiency of data centers. The system may include a memory, an interface, and a processor. The memory may store a historical dataset, a profile and an initial configuration of a data center. The interface may communicate with a user. The processor may identify the historical dataset and receive the profile and the initial configuration from the user. The user may select a data center initiative and a reduction factor. The processor may determine a subset of the historical dataset that describes data centers with a similar profile as the initial data center. The processor may process the initial configuration, the subset of the historical dataset and the selected initiative to determine a recommended configuration. The recommended configuration may be able to achieve the selected reduction in energy use. The processor may provide the recommended configuration to the user.

16 Claims, 29 Drawing Sheets

U.S. PATENT DOCUMENTS

| | | | |
|---|---|---|---|
| 2006/0123807 A1* | 6/2006 | Sullivan et al. | 62/129 |
| 2006/0161450 A1 | 7/2006 | Carey et al. | |
| 2006/0184445 A1* | 8/2006 | Sandor et al. | 705/37 |
| 2007/0005994 A1* | 1/2007 | Bahali et al. | 713/300 |
| 2007/0010914 A1* | 1/2007 | Johnson et al. | 700/276 |
| 2007/0027593 A1* | 2/2007 | Shah et al. | 701/30 |
| 2007/0038388 A1 | 2/2007 | Nojima et al. | |
| 2007/0038501 A1* | 2/2007 | Lee et al. | 705/10 |
| 2007/0043540 A1 | 2/2007 | Cleland et al. | |
| 2007/0118551 A1 | 5/2007 | Akkiraju et al. | |
| 2007/0174024 A1* | 7/2007 | Rasmussen et al. | 703/1 |
| 2007/0239317 A1 | 10/2007 | Bogolea et al. | |
| 2007/0245163 A1* | 10/2007 | Lu et al. | 713/300 |
| 2007/0260896 A1* | 11/2007 | Brundridge et al. | 713/300 |
| 2007/0300084 A1* | 12/2007 | Goodrum et al. | 713/300 |
| 2008/0028058 A1* | 1/2008 | Shaw et al. | 709/223 |
| 2008/0201595 A1* | 8/2008 | Kawasaki | 713/330 |
| 2008/0228865 A1 | 9/2008 | Cruzada | |
| 2008/0313276 A1 | 12/2008 | Abrams et al. | |
| 2009/0204916 A1* | 8/2009 | Benedek et al. | 715/764 |
| 2009/0307024 A1* | 12/2009 | Edholm et al. | 705/7 |
| 2009/0307508 A1 | 12/2009 | Curtis et al. | |
| 2010/0292877 A1* | 11/2010 | Lee | 701/21 |

FOREIGN PATENT DOCUMENTS

| | | |
|---|---|---|
| JP | 2005 182558 A | 7/2005 |
| WO | WO 02/090914 A1 | 11/2002 |

OTHER PUBLICATIONS http://www.carbonfootprint.com/calculator.aspx, "Carbon Footprint—Calculate, Reduce and Offset—Carbon Footprint Calculator," 12 pages, published at least as of Feb. 11, 2008.

http://www.businessgreen.com/business-green/news/2209241/accenture-launch-calculator, "Accenture Working on Calculator to Track Servers' Embedded Carbon," pp. 1-4, published at least as of Feb. 8, 2008.

http://www.safeclimate.net/calculator, "Climate Change News and Actions by Safeclimate Calculator," 4 pages, published at least as of Feb. 11, 2008.

http://www.bp.com/extendedsectiongenericarticle.do?category Id=9015627&contentId=7044493, "Carbon Footprint Calculator Climate change BP," 9 pages, published at least as of Feb. 11, 2008.

http://www.epa.gov/climatechange/emissions/ind_calculator.html, "Individual Emissions Personal Emissions Calculator Climate Change Greenhouse Gas," pp. 1-6, published at least as of Feb. 11, 2008.

http://www.nature.org/initiatives/climatechange/calculator, "Carbon Footprint Calculator Calculate Your Impact on Climate Change," 6 pages, published at least as of Feb. 11, 2008.

"Virtualization," *Wikipedia, the free encyclopedia*, pp. 1-6, http://en.wikipedia.org/wiki/Virtualization, published at least as of Jan. 18, 2008.

EPO Extended International Search Report of the International Searching Authority (the European Patent Office ) regarding Application No. EP09002154, dated Dec. 2, 2009, 7 pages.

Herrlin M.K., Khankari K., "Method for Optimizing Equipment Cooling Effectiveness and HVAC Cooling Costs in Telecom and Data Centers", Ashrae Transactions, Jan. 23, 2008, XP002556875 New York, 9 pages.

Herrlin, Magnus K. ED—Anonymous: "A New Tool for Evaluating and Designing the Thermal Environment in Telecom Central Offices", Annual International Telecommunications Energy Conference, 28th, IEEE, PI, Sep. 1, 2006, XP031020275 ISBN: 978-1-4244-0430-8, 5 pages.

Extended European Search Report issued for European Patent Application No. 10003602.9, dated Jul. 26, 2010. 11 pages.

Frost & Sullivan. *Intelligent Middleware*. A Frost & Sullivan White Paper 2008. 18 pages.

EPA, "Emission Facts", Apr. 2000, EPA420-F-00-013 pp. 1-3.

Notification of First Office Action from corresponding Chinese Application No. 200910005795.4, 4pp., dated Feb. 5, 2012 (with translation 5 pp.).

http://www.powermeterstore.com/p3865/shark_100s.php, "Shark 100S power meter, wireless," published at least as of May 19, 2008.

Yiyu Chen et al., Managing Server Energy and Operational Costs in Hosting Centers, pp. 303-314, Sigmetrics, Jun. 6-7, 2005.

Office Action issued in commonly owned U.S. Appl. No. 12/416,744, mailed Jan. 9, 2013.

\* cited by examiner

SYSTEM FOR PROVIDING STRATEGIES FOR INCREASING EFFICIENCY OF DATA CENTERS

TECHNICAL FIELD

The present description relates generally to a system and method, generally referred to as a system, for providing strategies for increasing efficiency of data centers, and more particularly, but not exclusively, to providing strategies for increasing efficiency of data centers which may reduce energy costs and carbon emissions.

BACKGROUND

The costs and carbon impact of energy use are becoming increasingly important to consumers, organizations and governments. Organizations may be reassessing their energy use in response to impending regulation, high costs, and public perception. An organization's data center may account for a significant portion of the organization's energy use. Data centers may account for ten to fifteen times the electricity use of a typical office building on a square foot basis. The energy costs attributable to a data center can run upwards of one million dollars per month, and the carbon impact of a data center may be significant. Organizations may be able to reduce their energy costs and carbon impact by migrating to energy efficient data centers.

SUMMARY

A system for providing strategies for increasing efficiency of data centers may include a memory, an interface, and a processor. The memory may be connected to the processor and the interface and may store a historical dataset, a profile and an initial configuration of a data center. The interface may be connected to the memory and the processor and may communicate with a user. The processor may identify the historical dataset and receive the profile and the initial configuration from the user. The user may select a data center initiative and a reduction factor. The processor may determine a subset of the historical dataset that describes data centers with a similar profile as the initial data center. The processor may process the initial configuration, the subset of the historical dataset and the selected initiative to determine a recommended configuration. The recommended configuration may be able to achieve the selected reduction in energy use. The processor may provide the recommended configuration to the user.

Other systems, methods, features and advantages will be, or will become, apparent to one with skill in the art upon examination of the following figures and detailed description. It is intended that all such additional systems, methods, features and advantages be included within this description, be within the scope of the embodiments, and be protected by the following claims and be defined by the following claims. Further aspects and advantages are discussed below in conjunction with the description.

BRIEF DESCRIPTION OF THE DRAWINGS

The system and/or method may be better understood with reference to the following drawings and description. Non-limiting and non-exhaustive descriptions are described with reference to the following drawings. The components in the figures are not necessarily to scale, emphasis instead being placed upon illustrating principles. In the figures, like referenced numerals may refer to like parts throughout the different figures unless otherwise specified.

DETAILED DESCRIPTION

A system and method, generally referred to as a system, may relate to providing strategies for increasing efficiency of data centers, and more particularly, but not exclusively, providing strategies for increasing efficiency of data centers which reduce energy costs and carbon emissions associated with data centers. The principles described herein may be embodied in many different forms.

The system may provide a user with a decision support tool for creating energy saving roadmaps for an organization's data center strategy. The energy saving roadmaps may incorporate both operations and facilities solutions. Statistical analysis may be used to leverage historical data from case studies of similar data centers to the configuration of the user's data center. The system may suggest a data center configuration for the user based on the configuration of similar data centers in the historical data.

The system may allow users to create intelligent strategy roadmaps by suggesting energy saving initiatives as well as scheduling when the initiatives are implemented. The roadmaps may be evaluated for robustness by comparing the roadmaps against multiple user-configured scenarios. The scenarios may represent user-specified forecasts of electrical costs, performance capabilities, and capacity demand. For each scenario the system may generate the forecasted outcomes for carbon output, cost, and electrical demand. The system may display the forecasted outcomes on a graph.

The system may compare a user's strategy roadmap against strategy roadmaps stored in the system's database. The system may assign a relative rating to the user's strategy roadmap indicating how the strategy roadmap compares with other strategy roadmaps in the system. The system may provide a relative rating for both the financial and environmental impact of the user's strategy roadmap. The system may also provide an overall assessment of the financial and environmental impact of the user's strategy roadmap. The system may display a graph comparing the energy savings achieved by the user's strategy roadmap to the energy savings achieved by the strategy roadmaps in the database.

The system may evaluate a user's strategy roadmap and suggest improvements in the organization's data center's facilities and/or equipment. The suggested improvements may lessen the environmental impact of the data center and/or may provide financial savings on energy and/or equipment costs.

The system may allow an organization to efficiently manage the carbon impact of their workplace technology, such as desktops, laptops, monitors, etc. The system may enable an organization to determine the carbon impact of their workplace technology, the impact of the hazardous materials found in their workplace technology, and the amount of trees destroyed by papers use.

Figure 1:
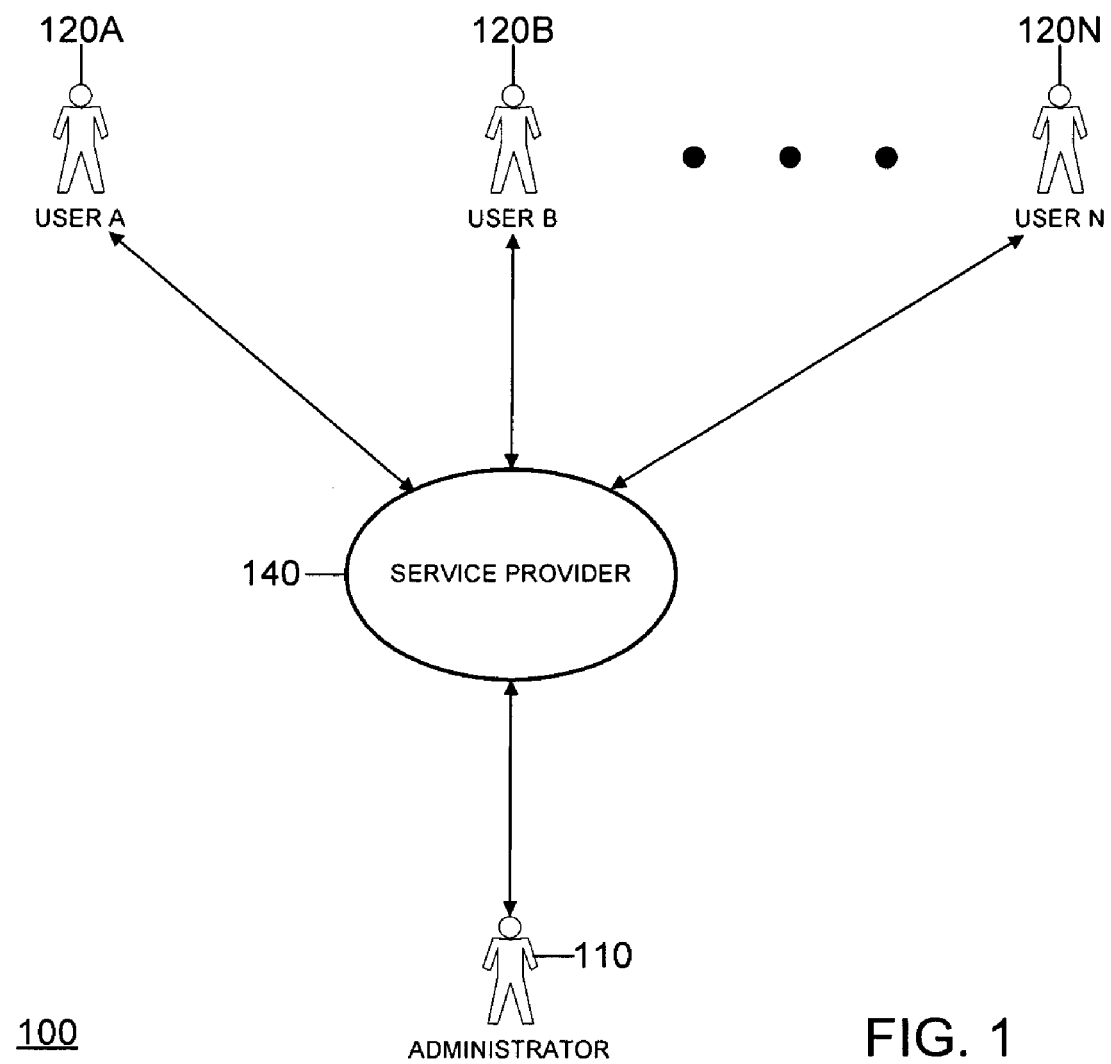
FIG. 1 is a block diagram of a general overview of a system for providing strategies for increasing efficiency of data centers.

FIG. 1 provides a general overview of a system 100 for providing strategies for increasing efficiency of data centers. Not all of the depicted components may be required, however, and some implementations may include additional components. Variations in the arrangement and type of the components may be made without departing from the spirit or scope of the claims as set forth herein. Additional, different or fewer components may be provided.

The system 100 may include one or more users 120A-N, a service provider 140, and an administrator 110. The users 120A-N may be responsible for maintaining, upgrading, and/or developing one or more data centers. The service provider 140 may provide an application to the users 120A-N allowing the users 120A-N to develop energy saving strategies, or green strategies, for their data centers. A green strategy may be a data center strategy which may reduce the carbon emissions of a data center, may reduce the amount of energy consumed by a data center, or may reduce the cost associated with operating a data center. The administrator 110 may be a person or an automated process, and may be responsible for maintaining a database of historical data center implementation data. The historical data may be used to a recommend data center initiatives to the users 120A-N based on real world data.

In operation the service provider 140 may provide the user A 120A with an interface allowing the user A 120A to input a profile of their data center and the current configuration of their data center. The data center profile information may describe the location of the data center, the size of the data center, the industry the data center supports, and/or any general characteristics describing the data center. The current configuration of the data center may include information describing the inventory of information technology ("IT") equipment of the data center and information describing the site infrastructure, or facilities, supporting the data center.

The inventory of equipment may include the equipment that provides the computing capability to the data center, such as servers, storage, network equipment, or generally any computer equipment used in a data center. The user A 120A may provide specific equipment information, such as the specific models, or may provide a more general description of the equipment, such as a "high-end" server. The site infrastructure information may include information describing the facilities that support the proper functioning of the IT equipment, such as lighting systems, cooling delivery, power delivery, or generally any support equipment that supports the IT equipment.

The system 100 may include a database of pre-filled data center profile information, such as specific data center equipment information and/or specific data center facilities information, which the user A 120A may be able to browse or search. The equipment information may include specific data describing data center equipment, such as the make and model of the equipment, the energy rating of the equipment, the processing power of the equipment, or generally any data describing data center equipment. The administrator 110 may maintain the database and may update the database as new information regarding data center equipment becomes available. The administrator 110 may manually update the database or the database may be automatically updated by a data feed.

Once the user A 120A has provided the inventory of their data center, the user A 120A may begin to develop a data center strategy. The user A 120A may select one or more energy saving initiatives for their data center. The initiatives may represent one or more methods for increasing the energy efficiency of a data center. Thus, implementing new initiatives may change the power estimate of the data center's equipment over a period of time. For example one initiative may focus on the consolidation of servers, while another may focus on the virtualization of servers. The consolidation of servers may refer to reducing the number of servers necessary to accomplish the required computing power, while the virtualization of servers may refer to pooling resources and allocating them as needed to specific tasks, allowing data centers to meet their requirements with fewer physical resources. The goal of each initiative may be to reduce the energy used by the data center and the energy used by the data center may be reduced by impacting how efficiently the inventory of equipment is utilized and impacting what equipment is used. Thus, the energy saving initiatives may provide the user A 120A with guidance on the rate at which new equipment should be acquired and the type of equipment to acquire. For example, a server virtualization initiative may change the rate at which new servers must be acquired while moving to energy efficient servers may change the types of servers acquired.

Alternatively or in addition the system 100 may recommend initiatives to the user A 120A based on the current configuration of the data center of the user A 120A. The system 100 may recommend equipment that provides the same capability as the current configuration but subject to lower energy use or operations costs. For example the system 100 may recommend more efficient servers to meet a similar central processing unit ("CPU") and memory requirements, or a more efficient cooling system to deliver the same tonnage of cold air. The system 100 may be able to search across all possible configurations in the data center profile dataset. The data center profile dataset may be pre-sorted to speed the search.

For example, if a new type of cooling delivery is projected to be mature based on industry guidelines the system 100 may recommend the user A 120A adopts this initiative during that time period. In another example some initiatives may require other initiatives to be in place before coming viable. For example, the virtualization initiative may require that standardization initiative occurs first. The system 100 may recommend a strategy to implement all of the perquisite initiatives first, such as the standardization initiative, and then to implement the final initiative, such as the virtualization initiative.

The system 100 may process the data center information of the user A 120A, and the initiatives selected by the user A 120A, to generate recommended future configurations of the data center of the user A 120A, such as estimates of equipment inventory required by the data center. The estimates may be a range of values, a distribution of values, or generally any statistical calculation of values, such as an average or a standard deviation.

The recommended configurations may be based on a historical data center profile dataset maintained by the administrator 110. The historical data center profile dataset may include information regarding the equipment and performance of existing data centers. The system 100 may identify historical data center data relating to both the data center profile of the user A 120A and the initiatives selected by the user A 120A. The system 100 may process the data center profile data to generate estimate values for the recommended data center configuration of the user A 120A. The user A 120A may accept the estimate values of the system 100 or may modify the configuration based on their own assessment.

The calculation of the estimate values may weigh the historical data center data based on characteristics the historical data center profiles share with the profile of the data center of the user A 120A. The data center characteristics may include size, industry, type, such as research and development or production, and geography. For example, the efficiency of a cooling solution may be related to a data center's size, power density, and geography. So initiatives implementing efficient cooling solutions may weigh more heavily the values originating from historical data centers data sharing size, power density and geography characteristics with the data center profile of the user A 120A. Thus, in addition to assisting the user A 120A with estimating values, the system 100 may assist the user A 120A in weighing multiple initiatives based on potential energy savings as well as confidence from past historical implementations.

The system 100 may use several different calculations for weighing the data center data. For example, let $v_i$ be the vector representing the characteristics of data center i. A sample vector for a data center 0, which is 1000 square feet in size, is used in the technology industry, for research and development, in northern California, may be $v_0$=[1000 sq ft, Technology, R&D, Northern CA]. For data center 0, and a specified initiative I, the weight for data center i>0 may be a function $f(v_i, v_0, I)$.

The function f may implement any statistical algorithm capable of identifying a subset of the historical dataset. For example, f may implement a strict filter, $f(v_i, v_0, I) \in \{0, 1\}$. Alternatively or in addition the following equations may be used for ranges, distributions and statistics:

$$f(v_i, v_0, I) = \begin{cases} 1 & \text{if } v_i = v_0 \\ 0 & \text{otherwise.} \end{cases}$$

Alternatively or in addition the data may be quantized into n bins, $f(v_i, v_0, I) \in \{1, 2, \ldots, n\}$, which also may be used for ranges, distributions and statistics, such as to show a different range, distribution and statistics for different quantization bins. Alternatively or in addition the function may map to a continuous value $f(v_i, v_0, I) > 0$. For example, assuming the size is the only field, and $v_0 = [1000 \text{ sq ft.}]$, then a proportional function $f(v_i, v_0, I) = v_i/v_0$ may be used for statistics where the contribution from $v_i$ is proportional to the weight given by f.

In order to accurately measure the effects of the data center strategy, the user A 120A may provide forecasts, or trend scenarios, on the change in electricity costs, the change in capacity demands of the data center, the change in price of carbon offsets, the change in performance demands of the data center over a period of time, and the change in carbon output per kWh generated. The system 100 may apply the trend scenarios provided by the user A 120A to the data center configuration selected by the user A 120A. The system 100 may generate one or more graphs demonstrating the effects of the forecasted changes on the data center configuration over a period of time. The user A 120A may use the information provided in the graphs to further refine the configuration of their data center.

Alternatively or in addition the system 100 may automatically analyze the data center configuration identified by the user A 120A to determine whether the data center configuration may be modified to increase the energy and/or cost saving efficiencies. The system 100 may recommend modifications to the configuration which may result in more efficient energy use.

Once the user A 120A has determined their preferred data center configuration, the system 100 may rate the data center configuration based on other configurations stored in the database. The rating may be based on the energy savings achieved by the data center configuration and/or the cost savings achieved by the data center configuration. The system 100 may further provide an assessment of the initiatives implemented by the user A 120A from both a financial and environmental impact.

The user A 120A may use the system 100 to view the effects of multiple waves of data center initiatives. For example, the user A 120A may wish to implement a consolidation initiative over a period of time, followed by a virtualization initiative over a different period of time. The system 100 may allow the user A 120A to define the periods of time over which the initiatives may be implemented. The system 100 may generate graphs or other visualization data showing the energy and cost savings effects of the multiple data center initiatives. Alternatively or in addition the system 100 may recommend the most efficient order to implement the initiatives.

Alternatively or in addition the system 100 may be used to determine the environmental impact of the hazardous materials found in the data center equipment, the amount of trees destroyed for paper use by the data center, or the amount of carbon generated by flights taken between multiple data centers. The amount of trees destroyed for paper use may be impacted by using electronic documents. The amount of hazardous materials in the equipment may be reduced by reducing the equipment in the data center. The carbon generated by flights taken between multiple data centers may be reduced by consolidating the multiple data centers, or by locating the data centers in close geographic proximity to one another.

Alternatively or in addition the system 100 may be used in conjunction with the IT equipment used by an organization in their workplace, such as offices. In this instance "data center" may refer to the workplace IT equipment of the organization, such as desktops, laptops, printers, etc. In this instance the energy use may be calculated similar to the data center, however in regards to the workplace IT equipment. The impact of the energy use may be reduced by changing the way the IT demand is met, such as the energy use per unit of equipment may be reduced and/or new technology may be used to reduce the total impact to costs and the environment. The energy use per unit of equipment may be reduced by turning on power save functionality to automatically turn off unused equipment. New technology, such as thin clients, electronic documents, and video conferencing may be used to reduce the total impact. In the case of thin clients, organizations may phase out desktops and provide a mainframe environment with thin client terminals and a super computer mainframe. The use of thin clients may reduce the number of times new equipment needs to be purchased. The use of electronic documents may reduce wasted paper and printers; however the use of electronic documents may present a trade off due to the need for storage in the data center to store them. Video conferencing may be used to reduce travel costs and carbon emissions associated with air travel.

Figure 2:
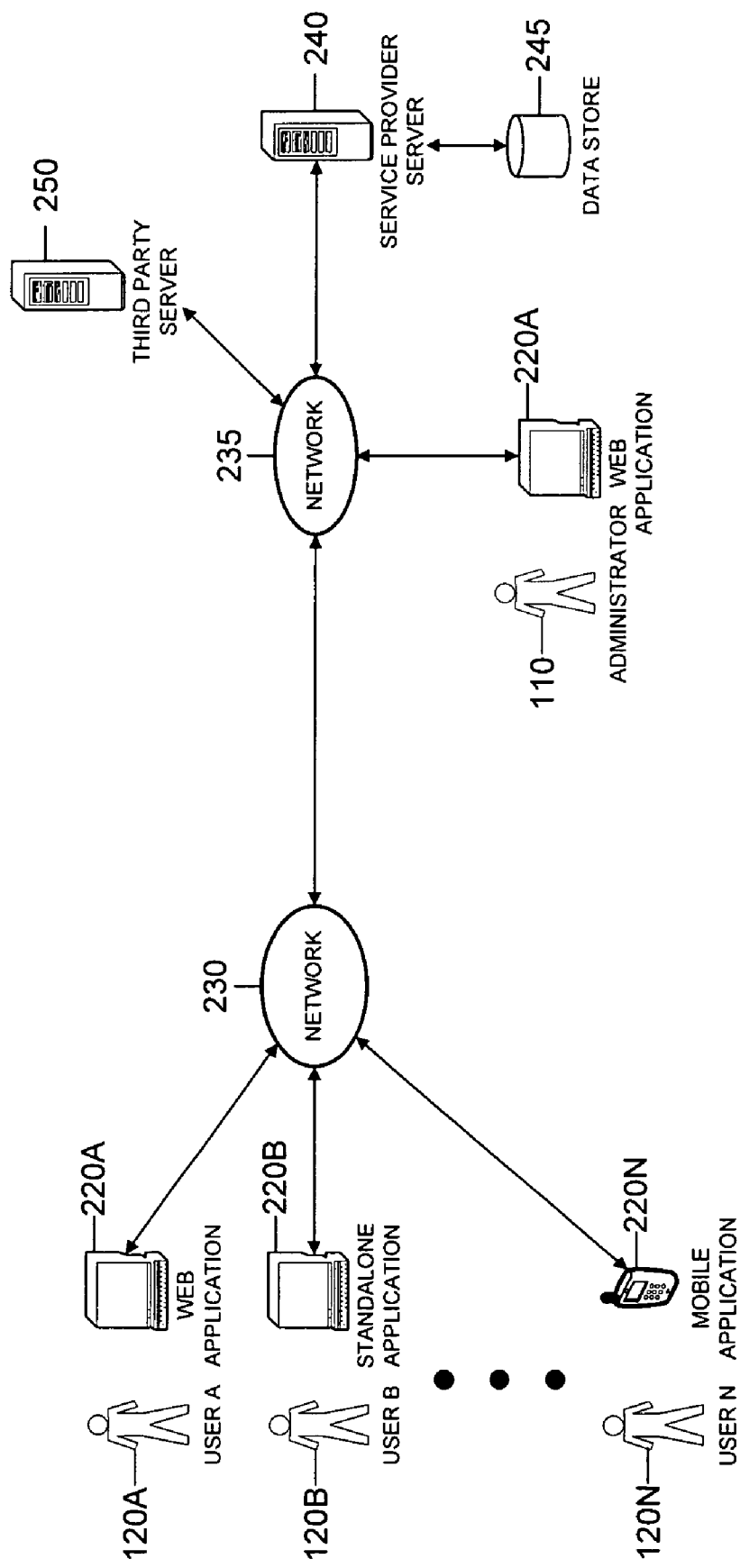
FIG. 2 is a block diagram of a network environment implementing the system of FIG. 1 or other systems for providing strategies for increasing efficiency of data centers.

FIG. 2 provides a simplified view of a network environment 200 implementing the system of FIG. 1 or other systems for providing strategies for increasing efficiency of data centers. Not all of the depicted components may be required, however, and some implementations may include additional components not shown in the figure. Variations in the arrangement and type of the components may be made without departing from the spirit or scope of the claims as set forth herein. Additional, different or fewer components may be provided.

The network environment 200 may include one or more users 120A-N, an administrator 110, a service provider server 240, a third party server 250, a data store 245, networks 230, 235, and one or more web applications, standalone applications, mobile applications 220A-N, which may collectively be referred to as client applications.

Some or all of the service provider server 240 and the third party server 250 may be in communication with each other by way of network 235. The administrator 130 may use a web application 220A to interface with the service provider server 240 and maintain the historical data center data. Alternatively or in addition the administrator 110 may use a mobile application 220N or a standalone application 220B to interface with the service provider server 240.

The networks 230, 235 may include wide area networks (WAN), such as the Internet, local area networks (LAN), campus area networks, metropolitan area networks, or any other networks that may allow for data communication. The network 230 may include the Internet and may include all or part of network 235; network 235 may include all or part of network 230. The networks 230, 235 may be divided into sub-networks. The sub-networks may allow access to all of the other components connected to the networks 230, 235 in the system 200, or the sub-networks may restrict access between the components connected to the networks 230, 235. The network 235 may be regarded as a public or private network connection and may include, for example, a virtual private network or an encryption or other security mechanism employed over the public Internet, or the like.

The web applications, standalone applications and mobile applications 220A-N may be connected to the network 230 in any configuration that supports data transfer. This may include a data connection to the network 230 that may be wired or wireless. Any of the web applications, standalone applications and mobile applications 220A-N may individually be referred to as a client application. The web application 220A may run on any platform that supports web content, such as a web browser or a computer, a mobile phone, personal digital assistant (PDA), pager, network-enabled television, digital video recorder, such as TIVO®, automobile and/or any appliance or platform capable of data communications. The web application 220A may support a rich internet application implemented with the ADOBE FLEX® technologies.

The standalone application 220B may run on a machine that may have a processor, memory, a display, a user interface and a communication interface. The processor may be operatively connected to the memory, display and the interfaces and may perform tasks at the request of the standalone application 220B or the underlying operating system. The memory may be capable of storing data. The display may be operatively connected to the memory and the processor and may be capable of displaying information to the user B 120B. The user interface may be operatively connected to the memory, the processor, and the display and may be capable of interacting with a user B 120B. The communication interface may be operatively connected to the memory, and the processor, and may be capable of communicating through the networks 230, 235 with the service provider server 240. The standalone application 220B may be programmed in any programming language that supports communication protocols. These languages may include: SUN JAVA®, C++, C#, ASP, SUN JAVASCRIPT®, asynchronous SUN JAVASCRIPT®, or ADOBE FLASH ACTIONSCRIPT®, ADOBE FLEX®, amongst others.

The mobile application 220N may run on any mobile device that may have a data connection. The data connection may be a cellular connection, a wireless data connection, an internet connection, an infra-red connection, a Bluetooth connection, or any other connection capable of transmitting data.

The service provider server 240 may include one or more of the following: an application server, a mobile application server, a data store, a database server, and a middleware server. The service provider server 240 may exist on one machine or may be running in a distributed configuration on one or more machines.

Figure 29:
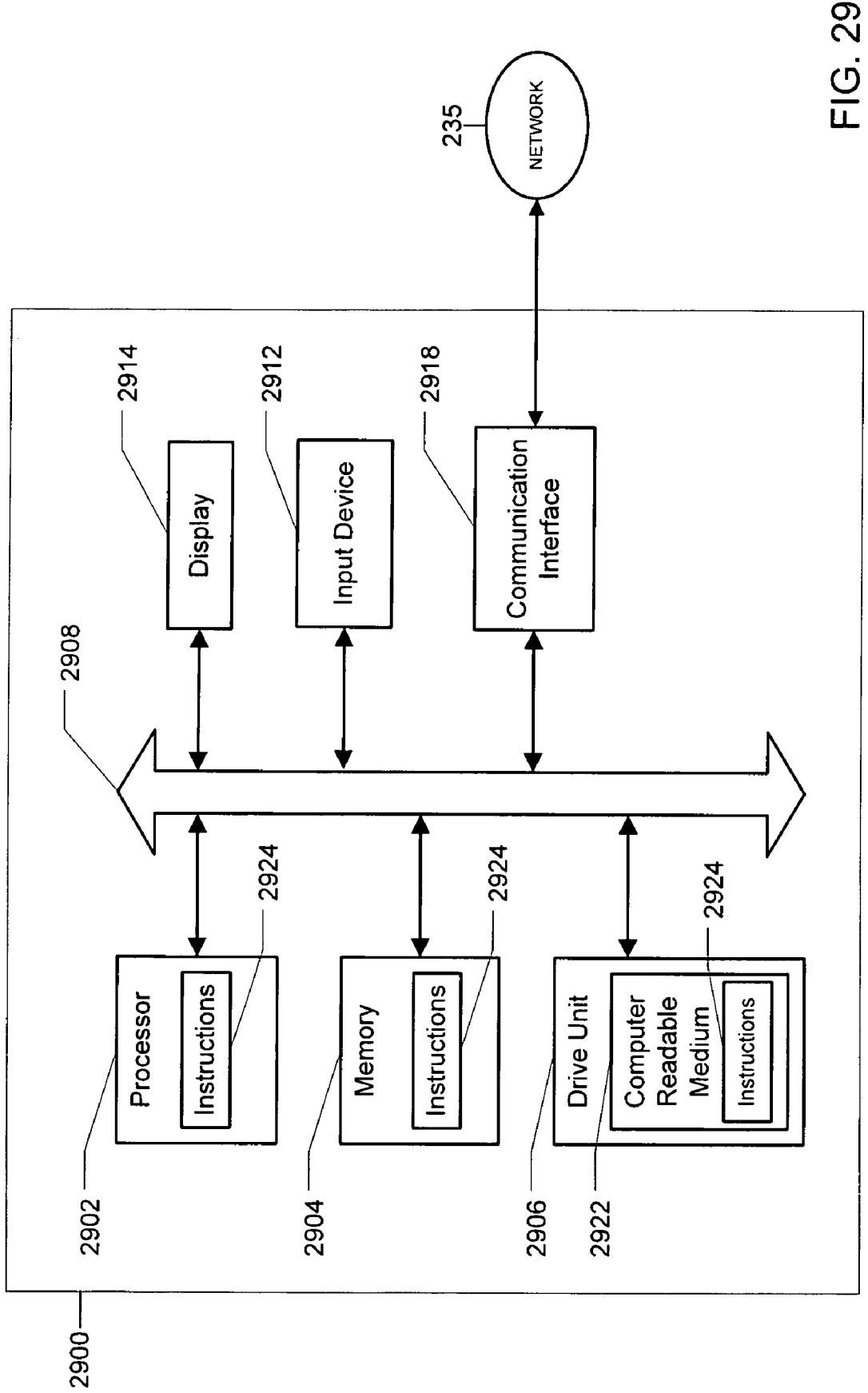
FIG. 29 is an illustration of a general computer system that may be used in the systems of FIG. 2, and FIG. 3, or other systems for providing strategies for increasing efficiency of data centers.

The service provider server 240 and client applications 220A-N may be one or more computing devices of various kinds, such as the computing device in FIG. 29. Such computing devices may generally include any device that may be configured to perform computation and that may be capable of sending and receiving data communications by way of one or more wired and/or wireless communication interfaces. Such devices may be configured to communicate in accordance with any of a variety of network protocols, including but not limited to protocols within the Transmission Control Protocol/Internet Protocol (TCP/IP) protocol suite. For example, the web application 220A may employ the Hypertext Transfer Protocol ("HTTP") to request information, such as a web page, from a web server, which may be a process executing on the service provider server 240.

There may be several configurations of database servers, application servers, mobile application servers, and middleware applications included in the service provider server 240. The data store 245 may be part of the service provider server 240 and may be a database server, such as MICROSOFT SQL SERVER®, ORACLE®, IBM DB2®, SQLITE®, or any other database software, relational or otherwise. The data store 245 may store the historical data center information. The application server may be APACHE TOMCAT®, MICROSOFT IIS®, ADOBE COLDFUSION®, or any other application server that supports communication protocols. The middleware application may be any middleware that provides additional functionality between the application server and the clients 220A-N, such as a PHP: HYPERTEXT PREPROCESSOR ("PHP").

The networks 230, 235 may be configured to couple one computing device to another computing device to enable communication of data between the devices. The networks 230, 235 may generally be enabled to employ any form of machine-readable media for communicating information from one device to another. Each of networks 230, 235 may include one or more of a wireless network, a wired network, a local area network (LAN), a wide area network (WAN), a direct connection such as through a Universal Serial Bus (USB) port, and the like, and may include the set of interconnected networks that make up the Internet. The networks 230, 235 may include any communication method by which information may travel between computing devices.

In operation the user A 120A may access the service provided by the service provider 140 through the web application 220A and the network 230. The web application 220A may download a client side application from the service provider server 240 using ADOBE FLASH PLAYER 9. The web application 220A may request data from the middleware application, such as a PHP server. The PHP server may query the information from the data store 245 and communicate the information to the web application 220A. The user A 120A may interact with the client side application through the web application 220A. The data may be passed between the web application 220A and the database 245 via the PHP server. The majority of the calculations may be performed on the service provider server 240, although some calculations may be completed on the web application 220A in order to speed up response times.

Alternatively or in addition the client applications 220A-N may be able to function in both an online and an offline mode. The client applications 220A-N may include a locally cached data store for offline operations. The local and remote data store 245 may synchronize when online operations are available. In one example the system 100 may use ADOBE AIRP) to implement the online and offline functionality.

Figure 3:
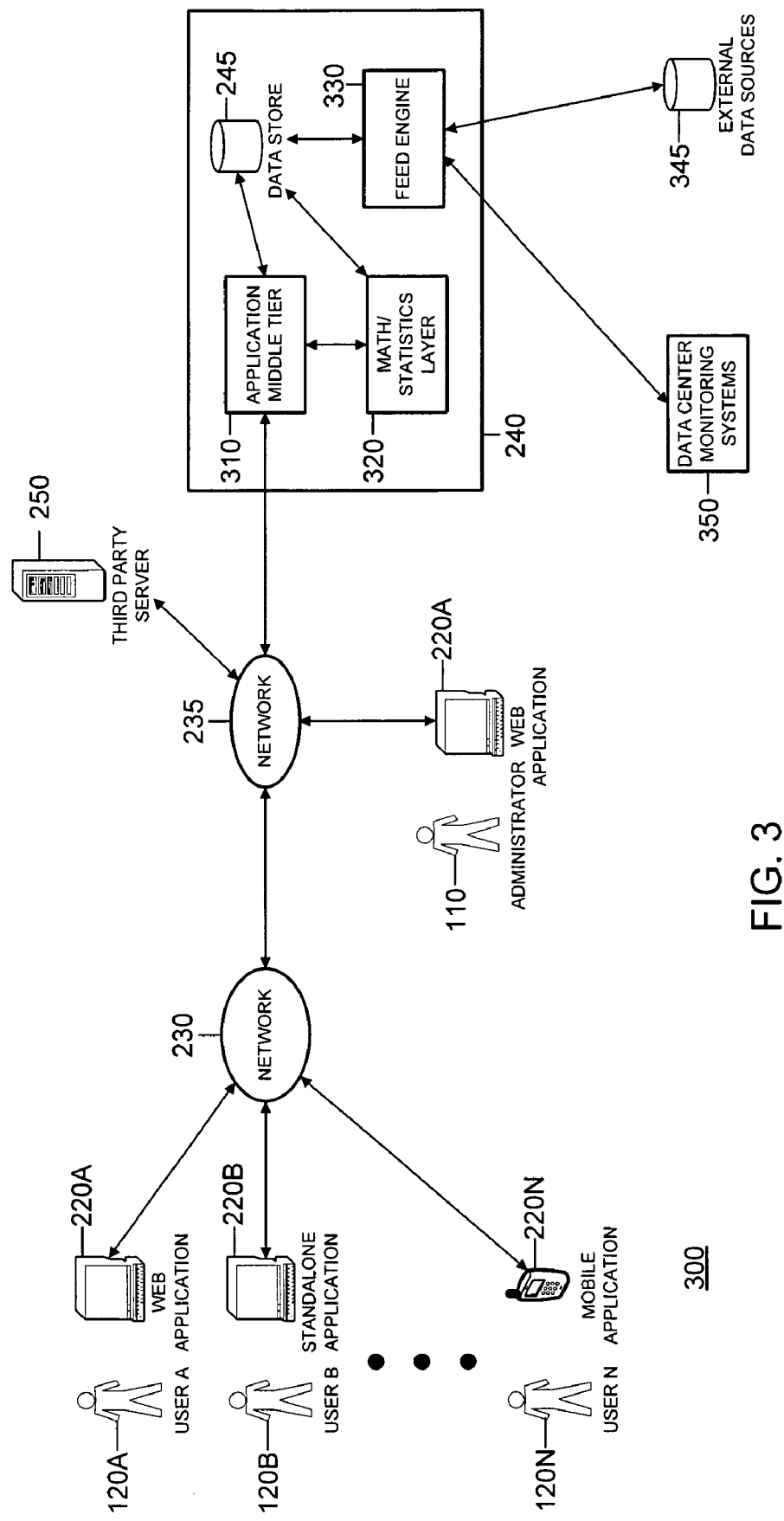
FIG. 3 is a block diagram of a network environment utilizing third party data sources to implement the system of FIG. 1 or other systems for providing strategies for increasing efficiency of data centers.

FIG. 3 provides a simplified view of a network environment 200 utilizing third party data sources to implement the system of FIG. 1 or other systems for providing strategies for increasing efficiency of data centers. Not all of the depicted components may be required, however, and some implementations may include additional components not shown in the figure. Variations in the arrangement and type of the components may be made without departing from the spirit or scope of the claims as set forth herein. Additional, different or fewer components may be provided.

The network environment 300 may represent an alternative server side architecture to the network environment 200. The network environment 300 may include one or more users 120A-N, an administrator 110, a service provider server 240, a third party server 250, a data store 245, an application middle tier 310, a math/statistics layer 320, a feed engine 350, a data center monitoring systems 350, networks 230, 235, and one or more web applications, standalone applications, mobile applications 220A-N, which may collectively be referred to as client applications.

In the network environment 300 external data sources 345 may provide historical data center data to the service provider server 240 via the feed engine 350. The historical data center data may then be stored in the data store 245. The historical data center data may include any current or past known data regarding existing data centers. The feed engine 350 may also be used to receive any other data relevant to the system 100, such as real-time information on electricity prices, carbon per kwh generated, etc. The external data sources 345 may be Internet based, such as a third party server 250. Alternatively or in addition the historical data center data may be received from the data center monitoring systems 350. The data center monitoring systems 350 may also be third party servers 250 and may provide real-time visibility into data center operations. The math/statistics layer 320 may be an application used to perform advanced modeling, statistics, and mathematics calculations. The math/statistics layer may allow for more sophisticated analytics to be applied with the application.

Figure 4:
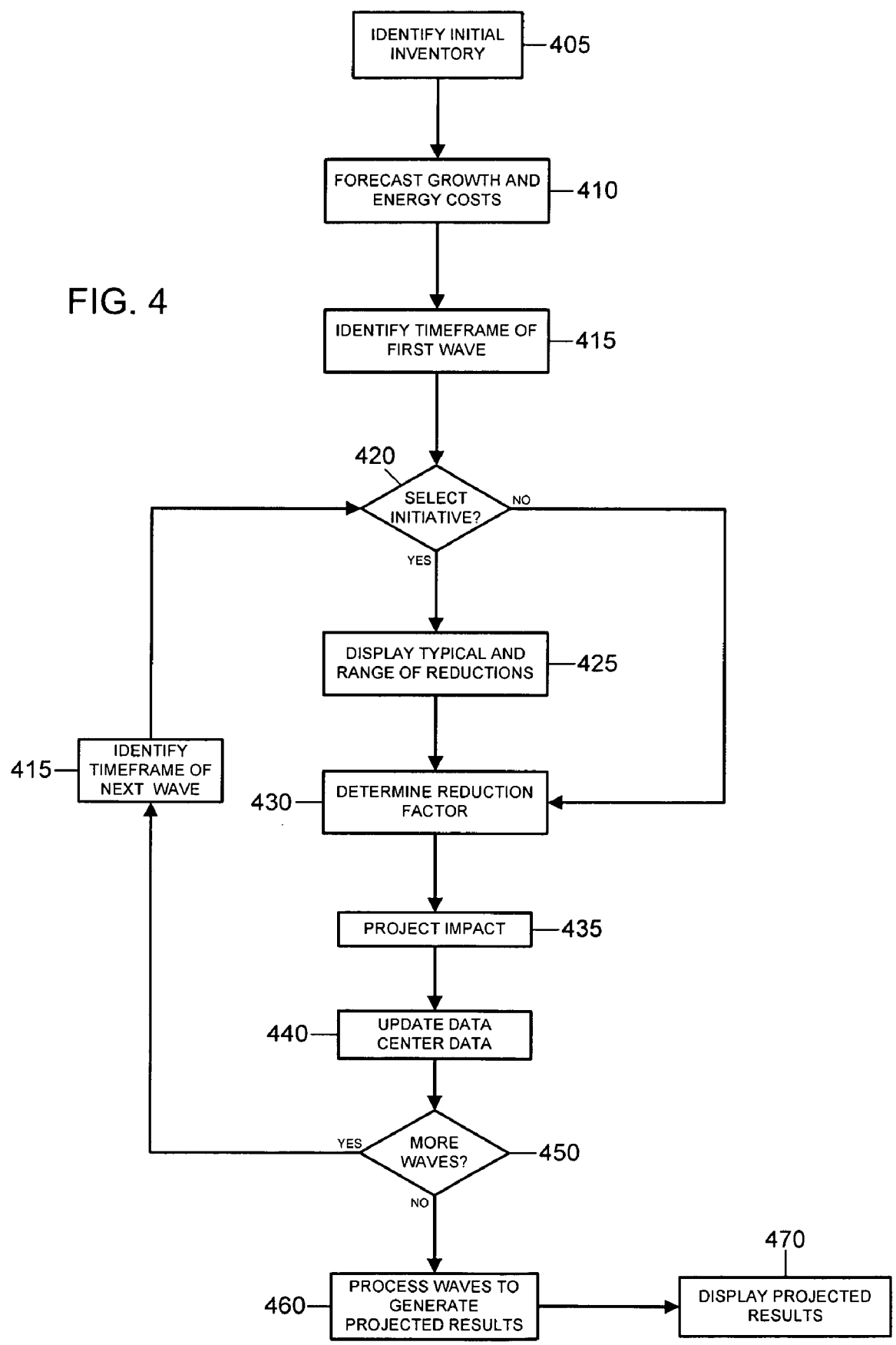
FIG. 4 is a flowchart illustrating the operations of the system of FIG. 1, or other systems for providing strategies for increasing efficiency of data centers.

FIG. 4 is a flowchart illustrating the operations of the system of FIG. 1, or other systems for providing strategies for increasing efficiency of data centers. At block 405 the user A 120A may identify the initial inventory and profile of their data center. The initial inventory may include both equipment and facilities. The inventory may be a general description using average values to describe the equipment, or a detailed description capturing the data values of the particular servers used in the data center. The facilities inventory may include the power delivery systems, the lighting system, the cooling systems, or generally any equipment or systems that may be used in a data center. The profile of the data center may include the location of the data center, the type of data center, the size of the data center, or generally any data that might affect the energy use of the data center. Alternatively or in addition the user A 120A may provide a data file, such as a MICROSOFT EXCEL file, an extensible markup language (XML) file, or generally any data file, with the data center's initial configuration to the system 100. The system 100 may process the file and load the values of the file into the data store 245.

At block 410 the user A 120A may provide their initial data center growth forecasts and energy cost forecasts. The users A 120A may create one or more trends with the one or more sets of projected values. The system 100 may display a visual representation of the projected energy costs and carbon emissions of the current data center configuration based on the forecasts of the user A 120A.

The system 100 may also provide the user A 120A with expert suggestions for the forecasts, such as expert suggestions of the increase in the cost of electricity or expert suggestions for predicting the efficiency of server performance as measured in million instructions per second ("MIPS")/Watt. The expert predictions may be retrieved from government reports, such as reports including data and analysis conducted by government agencies. Alternatively or in addition the expert predictions may be retrieved from industry experts, such as experts who may provide their expectations for the forecasts which may affect their business. The industry experts may be vendors and/or analysts, such as GARDNER, IDC, and/or FORRESTER. Alternatively or in addition the expert predictions may be retrieved from ACCENTURE experts who may create their own pre-configured projects to make the knowledge available to the users 120A-N.

Alternatively or in addition the user A 120A may be able to view the aggregated forecast, or trend, data across all of the other users 120B-N. The user A 120A may be able to filter the results in order to receive a more detailed, customized projection. The aggregate forecast data may be filtered by the geography of the users 120B-N, the industry of the users 120B-N, or the expertise of the users 120B-N. The system 100 may also provide the user A 120A with a level of confidence data. The level of confidence data may allow the user A 120A to determine the number of other users 120B-N whose data is represented in the aggregated forecast data. The level of confidence data may be reported to the user A 120A by displaying a count per filter combination. The count per filter combination may allow the user A 120A to see the number of other users 120B-N whose data is sourced in the aggregated forecast data. Alternatively or in addition other statistical techniques may be used to provide the user A 120A with confidence levels and/or other measures of potential error. In this case the system 100 may show a range of initiatives on the screen, or an average value with confidence intervals where some percentage of the inputs from the users 120B-N are captured.

At block 415 the user A 120A may identify the time frame for implementing the data center improvement strategy. The system 100 may use the timeframe to determine the projected energy needs and costs of the data center at that time. At block 420 the user A 120A may select an initiative for the current wave of the data center strategy. The initiative may be a strategy to affect two types of change within the data center, reducing the amount of equipment to achieve the same capacity, or reducing the efficiency per equipment. A strategy may affect one or both of the types of change.

For example, in regards to the equipment, such as servers, storage, network, etc., there may be initiatives focusing on virtualization, efficiency and/or consolidation. The virtualization strategy may guide the user A 120A to reduce the number of physical servers needed to maintain the same number of applications. A virtualization initiative may be affected by the projected growth of the data center. For example, the user A 120A might select the virtualization initiative and may set the reduction factor to v given as a percentage. The reduction factor v may be the percentage of servers the user A 120A wishes to reduce their total servers by. For example, if the user A 120A indicates a growth of a over the time period, where a is given as a percentage, and an initial server count of x, then due solely to growth, the number of servers needed for the next wave may be $(1+a)*x$. If the user A 120A selects a reduction factor of v, then the number of servers x should decrease to $y=(1-v)(1+a)*x$ in the next wave. The calculation may incorporate the projected growth and the reduction factor to determine the total number of servers in the wave through the equation $y=(1-v)(1+a)*x$.

The number of servers needed in the subsequent wave may be calculated by reapplying this equation to the growth rate of the wave. For example, let the server count from the previous wave, y, be denoted as x', the virtualization factor of the subsequent wave denoted as v', the growth factor over the period between the previous wave and the subsequent wave denoted as a', and the suggested server count of the subsequent wave denoted as y'. The number of servers needed in the subsequent wave, without accounting for the virtualization factor, may be $x'/(1-v)$. The growth from the previous wave to the subsequent wave may be accounted for by multiply by $(1+a')$. The virtualization factor of the subsequent wave may be accounted for my multiplying by $(1-v')$. The suggested server count of the subsequent wave, y', may then be calculated as $y'=[(1-v')/(1-V)](1+a')x'$.

The efficiency initiative may focus on making all aspects of the data center more efficient. For example, energy efficient power supplies in servers may reduce the power needed by each physical machine. The virtualization initiative may focus on operationally identifying the optimum utilization to run the servers at, which may reduce both the number of machines needed and the total energy used.

In regards to the facilities, such as the power delivery systems, the lighting systems, the cooling systems, etc., there may be initiatives focusing on power delivery improvements, lighting improvements, cooling center optimization, efficiency, and/or rack cooling. A power delivery initiative may focus on buying more efficient uninterruptible power supplies (UPS) or more efficient power delivery units (PDU). Lighting initiatives may focus on upgrading the bulbs to compact fluorescent lamps (CFLs) or adding sensors to automatically turn off lights when they are not in use. The cooling system initiatives may be separated into cooling generation and cooling delivery. The cooling generation may be impacted by free cooling or more efficient chillers. The cooling delivery may be impacted improved by room alignment, packaged rack cooling, and fan efficiency.

If the user A 120A selects more than one initiative the system 100 may suggest an order in which the initiatives may be implemented. The order may be optimized relative to the scenarios for the energy costs, the carbon emissions per kWh, the capacity demands, such as computing demands, storage capacity demand, and/or cooling and power delivery capacity, or other factors. For example, the user A 120A may choose to minimize the energy use subject to a bound on meeting the compute capacity. The order may then be determined by ranking initiatives that provide the lowest energy use subject to a constraint on delivering the compute capacity.

Alternatively or in addition the user A 120A may maximize the compute capacity within the data center subject to a bound on the energy use. The order may then be determined by ranking the initiatives that provide the largest capacity improvements subject to a bound on energy use. Alternatively or in addition the user A 120A may optimize over a cost function of trading off the various factors: energy use, cost, carbon emissions, and/or capacity. A method for determining the optimum order may be to compute over all possible arrangements and then present the optimum. The number of initiatives may be in the hundreds and such a method should be feasible.

If at block 420 the user A 120A selects an initiative, the system 100 may move to block 425, otherwise the system 100 moves to block 430. At block 425 the system 100 may process the data center profile of the user A 120A and the historical data center data to determine ranges of energy use reduction that have been achieved by similar data centers for the initiative. The system 100 may display to the user A 120A the typical and range of reductions that have been achieved. At block 430 the user A 120A may select a reduction factor which best fits their data center profile. At block 435 the system 100 may project the impact of implementing this reduction to the equipment and facilities of the data center. The projection may account for all forecasted values, such as energy costs and demand growth. The system 100 may suggest a data center configuration best suited to implement the selected reduction and any selected initiatives.

Alternatively or in addition the system 100 may allow the user A 120A to view real-time estimates showing relevant planning metrics as the user A 120A selects initiatives and/or updates their data center configuration. The metrics may include the energy use in kWh, the carbon footprint, the implementation and operation cost, the capability and capacity of the configuration, such as the CPU cycles, storage volume, tones of cooling delivered, power delivered, or generally any metric that may be of interest to the user A 120A.

At block 440 the user A 120A may update the data center configuration data with the suggested values of the system 100. Alternatively or in addition the user A 120A may disregard the suggestion of the system 100 and insert values determined by their own assessment. At block 450 the user A 120A may identify whether they wish to plan more waves of data center planning strategies. If at block 450 the user A 120A wishes to plan out another wave, the system 100 moves to block 415, otherwise the system 100 moves to block 460. At block 415 the user A 120A may identify the timeframe of the next wave and then the system 100 may move to block 420.

At block 460 the system 100 may process all the waves created by the user A 120A to generate the projected results of the waves on the carbon emissions, cost, and energy use of the data center. A more detailed description of the processing of the waves may be found in FIG. 5. The system 100 may generate one or more graphs showing the projected values of these variables over the course of the planned timeframe.

If the user A 120A has identified multiple initiatives per wave and an order of the initiatives within the waves, the system 100 may provide a schedule of planned implementation dates of the wave plans. Alternatively or in addition the user A 120A may manually specify the timing of the wave deployment. The schedule may be optimized relative to the scenarios for electricity cost, carbon emissions per kWh, capacity demands, or other factors. The plans may also be optimized based on operational expenses, capital expenses, or other measures. For example, to minimize capital expenditures ("CAPEX"), the system 100 may suggest timing of initiatives in a manner that leverages the savings garnered from the previous waves to finance the cost of later waves. This may require the forecasted cost of the electricity as an input. Alternatively or in addition, to lower operational expenditure ("OPEX") constraint to an annual budget, the system 100 may suggest a timing of initiatives to coincide with changes in energy prices.

At block 470 the system 100 may display the graphs and projected results to the user A 120A. The system 100 may also provide the user A 120A with a rating and assessment of their data center strategy. The rating may be based on the strategies and reduction factors of the other users 120B-N.

Alternatively or in addition the system 100 may allow the user A 120A to create multiple data center instances. For each data center instance the user A 120A may specify separate initiatives, waves, or generally any data associated with the data centers. The user A 120A may be able to manage the strategy planning across multiple data centers so as to ensure that the entire cross data center strategy is optimized. The user A 120A may be able to plan the consolidation strategy of multiple data centers into one. The system 100 may allow the user A 120A to view the "as-is" or current configuration of the data centers, as well as view the projections of their planned changes across all of their data centers. The information may be used to support other business activities and/or decisions of the user A 120A.

Figure 5:
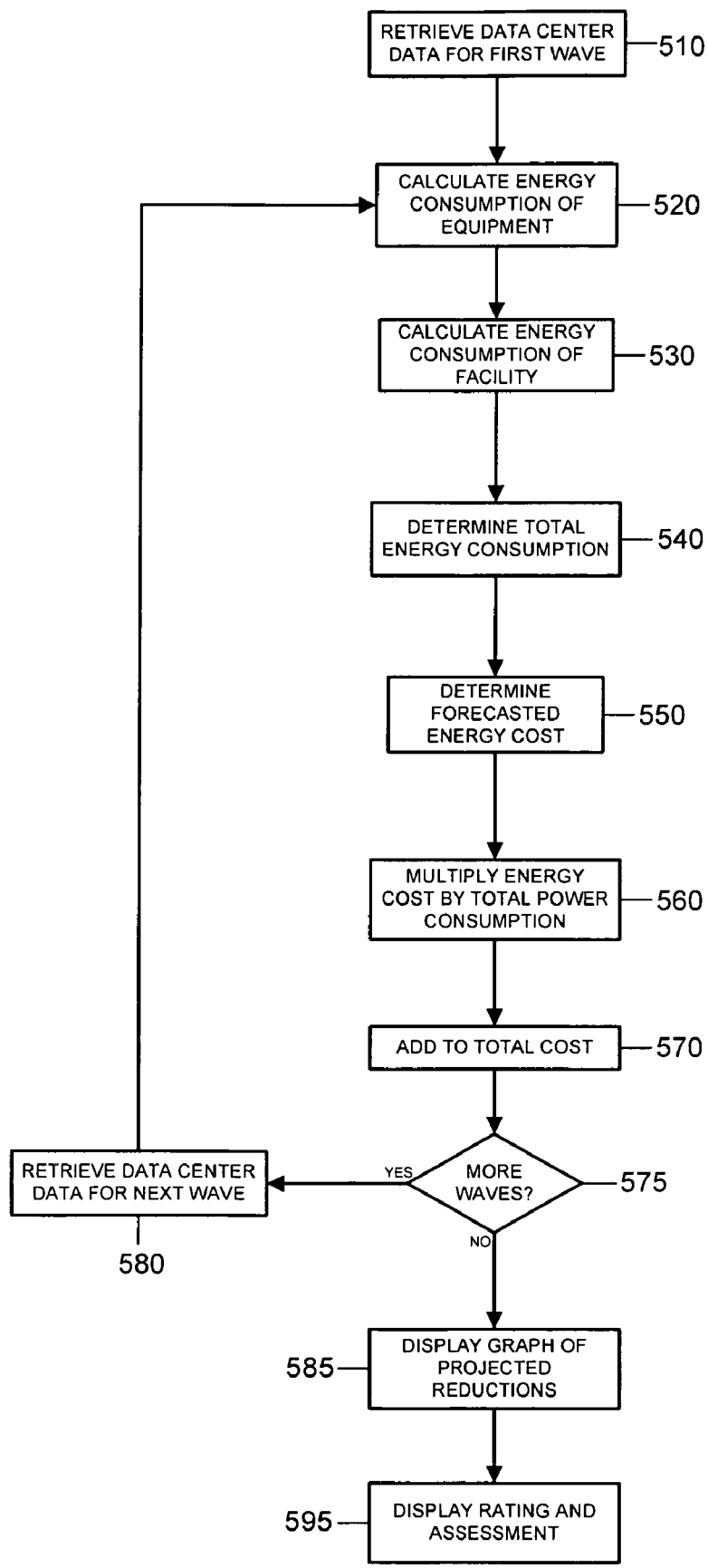
FIG. 5 is a flowchart illustrating the operations of processing the wave data in the system of FIG. 1, or other systems for providing strategies for increasing efficiency of data centers.

FIG. 5 is a flowchart illustrating the operations of processing wave data in the system of FIG. 1, or other systems for providing strategies for increasing efficiency of data centers. At block 510 the system 100 may retrieve the data center configuration data for the first wave identified by the user A 120A. At block 520 the system 100 may calculate the energy consumption of the computer equipment needed for the wave, such as servers, storage, network, or generally any computer equipment used in the data center. The system 100 may estimate the power consumed by the equipment by calculating the power rating (P) in terms of kilowatts. The power rating may refer to the maximum power drawn by the equipment at any given time or the typical average power drawn by the equipment. The power used over a period of time T maybe equal to P*T kWh. Alternatively or in addition the system 100 may substitute the power estimates with the actual power used by equipment in the historical dataset.

The system 100 may calculate a general estimate of the power consumed by the equipment by splitting the servers in to a number of N classes. For instance, three classes may be: generic volume, mid-range and high-end servers. For each class c there may be an average estimate of power use $p_c$. The data center configuration may be analyzed to determine the quantity of servers that exist for each class type $k_c$. The final power rating may be $P=\Sigma_{c-1,\ldots,N} p_c k_c$.

Alternatively or in addition the system 100 may calculate a detailed estimate of the power consumed by the equipment based on a specific distribution of servers rather than using generic models. For example the system 100 may determine a quantity of machines per manufacturer make and model, where the power rating or average power is maintained per make and model. Alternatively or in addition the system 100 may specify an exact configuration for each machine that includes the random access memory ("RAM"), central processing unit ("CPU"), drives, and utilization. The power estimates may be determined by retrieving the actual power consumption of each component of each machine, or may be determined by estimating the power use of the RAM, CPU, drives, etc.

For any method of determining the power consumption of the equipment the system 100 may leverage information stored in the data store 245 based on historical data, vendor sources, and/or industry sources. For each machine the power use may be estimated based on the vendor released power rating on the back plate, the averages or maximums released by the vendor or industry sources, based on measurements and/or as a function of the utilization based on vendor or industry source, such as Standard Performance Evaluation Corporation ("SPEC") benchmarks. Using the function of utilization based on vendor or industry source, a lookup table and inputs of the utilization may be used to determine the estimate of energy use.

At block 530 the system 100 may calculate the energy consumption of the data center infrastructure, including lighting, power delivery and/or cooling. The energy consumption of the data center infrastructure may be calculated using the standard industry approach elaborated by the environmental protection agency ("EPA"). The approach may rely on two inputs, P and PUE. P may refer to the total power rating of the equipment described above and PUE may refer to the power usage effectiveness ratio. The PUE may be defined as the ratio between the total data center power over the total equipment power. For example, if the data center uses P' power from a power grid, the PUE would be equal to P'/P. The ratio may establish the overhead needed by the facility. A PUE of 1 may be the theoretical optimal ratio for all facilities as all of the power delivered to the data center is used to power the equipment.

The PUE may be measured or estimated for the entire data center facility. Alternatively or in addition the PUE may be calculated by determining the PUE of the various components of the data center, such as lighting power delivery, and/or cooling delivery, and then combining the PUEs to determine the PUE of the data center as a whole. For example, the PUE total for the data center may be equal to $PUE=1+PUE_{light}+PUE_{PDU}+PUE_{UPS}+PUE_{HVAC}$. The additional 1 may for $PUE_{IT}$ the ratio of power drawn by the IT equipment over the power used by the IT equipments. Alternatively or in addition, the power used by a generator, humidifier and/or the effects of the room configuration on the facilities' power consumption may also be used in the facilities calculation.

The power used by the components of the data center may be calculated individually. For example, to determine the $PUE_{light}$ the system 100 may determine the square footage of the room, S, the lighting efficiency in watts/square feet, L, and the percentage of the time the lights are on, $\alpha$. $\alpha$ may be equal to 1 if the data center has no sensors and the lights are on constantly. These values may be provided by the user A 120A. Once these variables are determined the $PUE_{light}$ may be calculated by the equation $PUE_{light}=(\alpha*S*L)/P$.

The power used by the power delivery system may be determined by identifying the transformer efficiency (%) of the data center, $\rho_{PDU}$. The user A 120A may provide the transformer efficiency to the system 100. The tare loss and the load loss may also be incorporated into the transformer efficiency value. The $PUE_{PDU}$ may then be calculated as $PUE_{PDU}=(1-\rho_{PDU})$.

The power used by the UPS system may be determined by identifying the UPS efficiency (%), $\rho_{UPS}$. The user A 120A may provide the UPS efficiency. The tare loss and the load loss may also be incorporated into the UPS efficiency determination. The $PUE_{UPS}$ may then be calculated as $PUE_{UPS}=(1-\rho_{UPS})$.

The power used by the HVAC system may be determined by identifying the cooling requirements. The user A 120A may identify the chiller plant efficiency (kW/ton), $\beta_C$, the pump efficiency (kW/ton), $\beta_P$, and the fan efficiency (kW/ton), $\beta_F$. The tare loss and load loss for chiller, pump and fans may also be used in the determination. The power used by the HVAC system, $PUE_{HVAC}$, may then be calculated as $PUE_{HVAC}=0.283*(\beta_C+\beta_P+\beta_F)$. The constant 0.283 may be the conversion factor for converting from kW/ton to kW/kW of IT power.

At block 540 the system 100 may determine the total energy consumption for the wave by adding the energy consumption of the equipment, the energy consumption of the facilities and generally any other energy used by the data center for the wave. The total energy consumption may represent the power drawn by the data center equipment and the power drawn by the facilities, such as the site infrastructure needed for support. The total energy consumption may be calculated by multiplying PUE times P.

At block 550 the system 100 may determine the forecasted energy cost for the period of time covered by the wave. The forecasted energy cost may be based on estimates provided by third parties or estimates entered directly by the user A 120A. At block 560 the system 100 may multiply the cost of the energy by the total power consumption of the wave to determine the total cost for the wave. At block 570 the system 100 may add the cost estimate of the current wave to the total cost estimate. At block 575 the system 100 may determine whether the user A 120A has identified any additional waves. Alternatively or in addition the system 100 may also determine the forecasted carbon effect per wave.

If the user A 120A has identified additional waves the system 100 may move to block 580, otherwise the system 100 moves to block 585. At block 580 the system 100 retrieves the identified data center data for the next wave. The system 100 then returns to block 520 and repeats the calculations for the next wave. Once all of the waves have been accounted for the system 100 moves to block 585. At block 585 the system 100 displays the graphs of the projected reductions to the user A 120A. At block 595 the system 100 may display the assessment and rating of the projected reductions to the user A 120A. The assessment and rating may be determined by analyzing the reductions achieved by the users 120B-N. The system 100 may also display the amount of time it will take for the energy savings achieved by the recommended configuration to offset the costs of improving the equipment and/or facilities.

Figure 6:
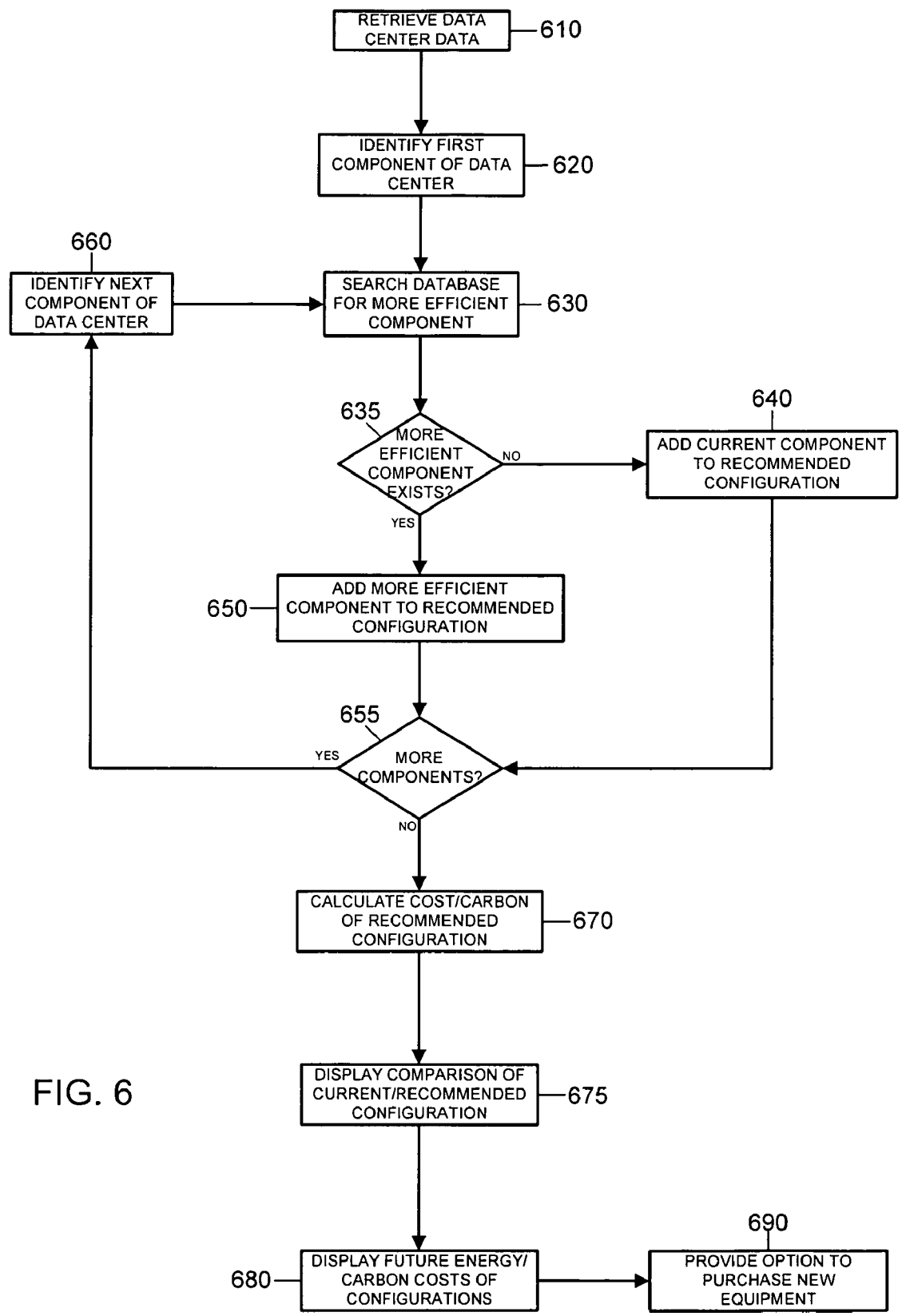
FIG. 6 is a flowchart illustrating the operations of recommending an energy efficient data center configuration in the system of FIG. 1, or other systems for providing strategies for increasing efficiency of data centers.

FIG. 6 is a flowchart illustrating the operations of recommending energy efficient data center configurations in the system of FIG. 1, or other systems for providing strategies for increasing efficiency of data centers. At block 610 the system 100 may retrieve the data center profile data of the user A 110A. The profile data may include the initial and/or current equipment inventory of the user A 120A. The inventory data may include specific make and model numbers of the equipment used in the data center.

At block 620 the system 100 may identify the first component of the data center equipment, such as a server. At block 630 the system 100 may search the historical dataset for a component that is more efficient, either cost-wise or carbon emissions-wise, than the component currently used in the data center. Alternatively or in addition the system 100 may attempt to consolidate multiple components into one more efficient component. At block 635 the system 100 may determine whether a more efficient component exists, capable of replacing one or more components in the current configuration.

If at block 635 the system 100 determines that a more efficient component exists the system 100 may move to block 650. At block 650 the system 100 may add the more efficient component to a recommended configuration. If at block 635 the system 100 determines that a more efficient component does not exist then the system 100 may move to block 640. At block 640 the system 100 may add the current component to the recommended configuration. At block 655 the system 100 may determine whether there are additional components to analyze in the data center inventory. If at block 655 the system 100 determines there are additional components then the system 100 may move to block 660. At block 660 the system 100 may identify the next component to analyze and may repeat the steps of determining whether a more efficient component exists.

After analyzing each of the components in the data center inventory, and generating a recommended configuration, the system 100 may move to block 670. At block 670 the system 100 may determine the cost of the recommended configuration and the carbon output of the recommended configuration. If the recommended configuration is identical to the initial configuration of the user A 120A then the system 100 may report to the user A 120A that there are no optimizations to their data center configuration.

At block 670 the system 100 may display a comparison of the current configuration and the recommended configuration to the user A 120A. The comparison may display to the user A 120A the cost savings and the carbon emissions reductions achieved by the current data center configuration of the user A 120A and those achieved by the recommended configuration. At block 680 the system 100 may display the future forecasted energy and cost scenarios of the current configuration of the user A 120A and the configuration recommended by the system 100. At block 690 the system 100 may offer the user A 120A the option to purchase the equipment necessary to upgrade their data center to the recommended configuration. The service provider 140 may sell the equipment directly to the user A 120A or the service provider 140 may refer the user A 120A to a retailer. If the service provider 140 refers the user A 120A to a retailer the service provider 140 may receive a referral fee or a percentage of any purchases made by the user A 120A.

Figure 7:
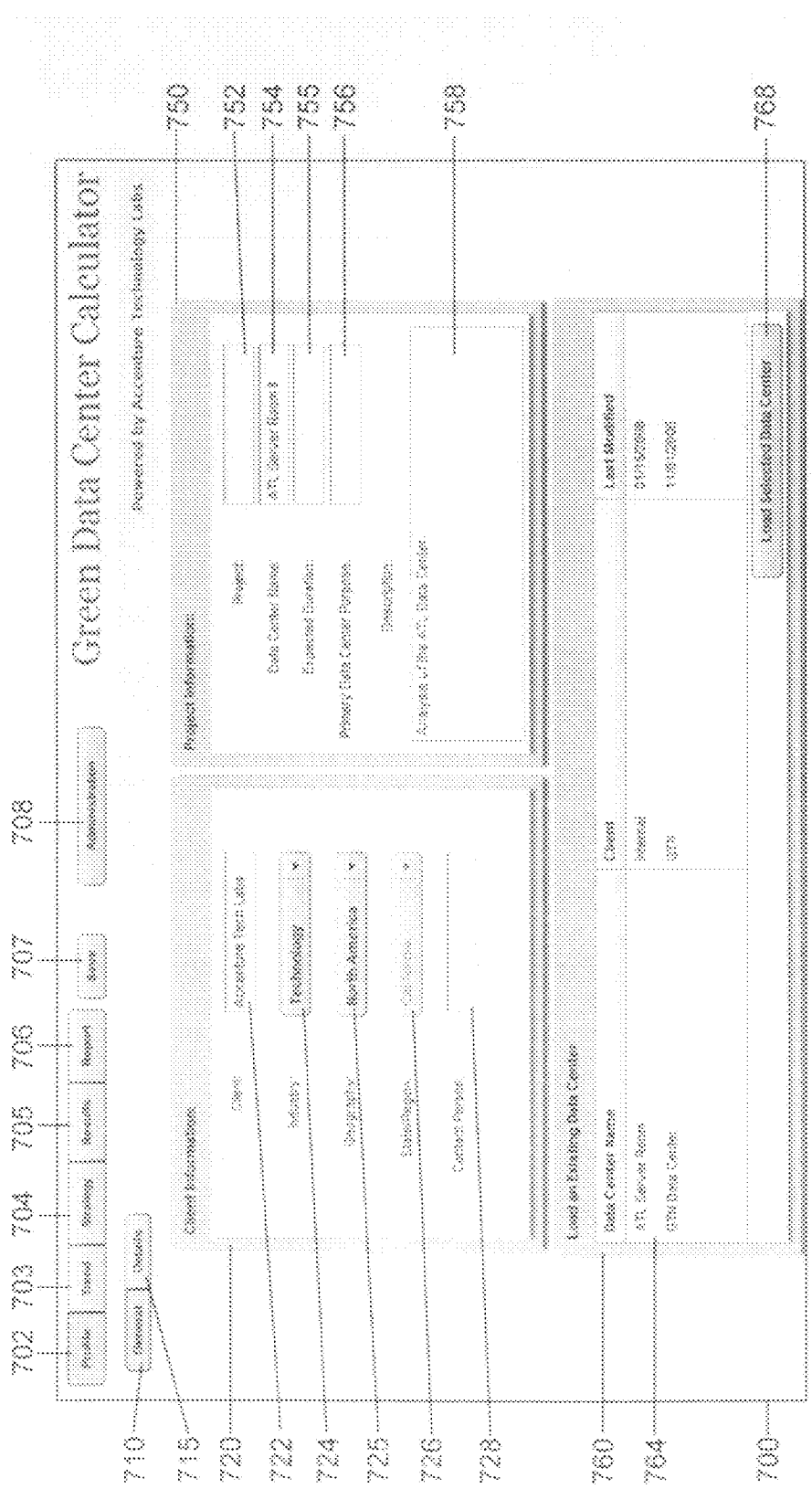
FIG. 7 is a screenshot of a user interface for inputting general data center profile information in the system of FIG. 1, or other systems for providing strategies for increasing efficiency of data centers.

FIG. 7 is a screenshot 700 of a user interface for inputting general data center profile information in the system of FIG. 1, or other systems for providing strategies for increasing efficiency of data centers. The service provider server 240 may display the screenshot 700 to the user A 120A when the user A 120A first interacts with the system 100. The user A 120A may use the screenshot 700 to input their data center profile information. The screenshot 700 may include a profile tab 702, a trend tab 703, a strategy tab 704, a results tab 705, a report tab 706, save button 707, an administration button 708, a general tab 710, a details tab 715, a client information subsection 720, an existing data center subsection 760, and a project information subsection 750. The client information subsection 720 may include a client name field 722, a industry selector 724, a geography selector 725, a state/region selector 726 and a contact person field 728. The project information subsection 750 may include a project name field 752, a data center name field 754, an expected duration field 755, a primary data center purpose field 756, and a description field 758. The existing data center subsection may include an existing data center table 764 and a load data center button 768.

In operation the user A 120A may click on the tabs 702, 703, 704, 705, 706, 708, 710, 715 to change the screen displayed to the user A 120A. For example, by clicking on the trend tab 703, the system 100 may display a trend screen to the user A 120A. The user A 120A may enter a profile of their organization in the client information subsection 720 and a profile of the project the data center may be used for in the project subsection 750. The user A 120A may load a saved data center configuration in the existing data center table 764 by selecting a data center name and clicking on the load data center button 768.

Figure 8:
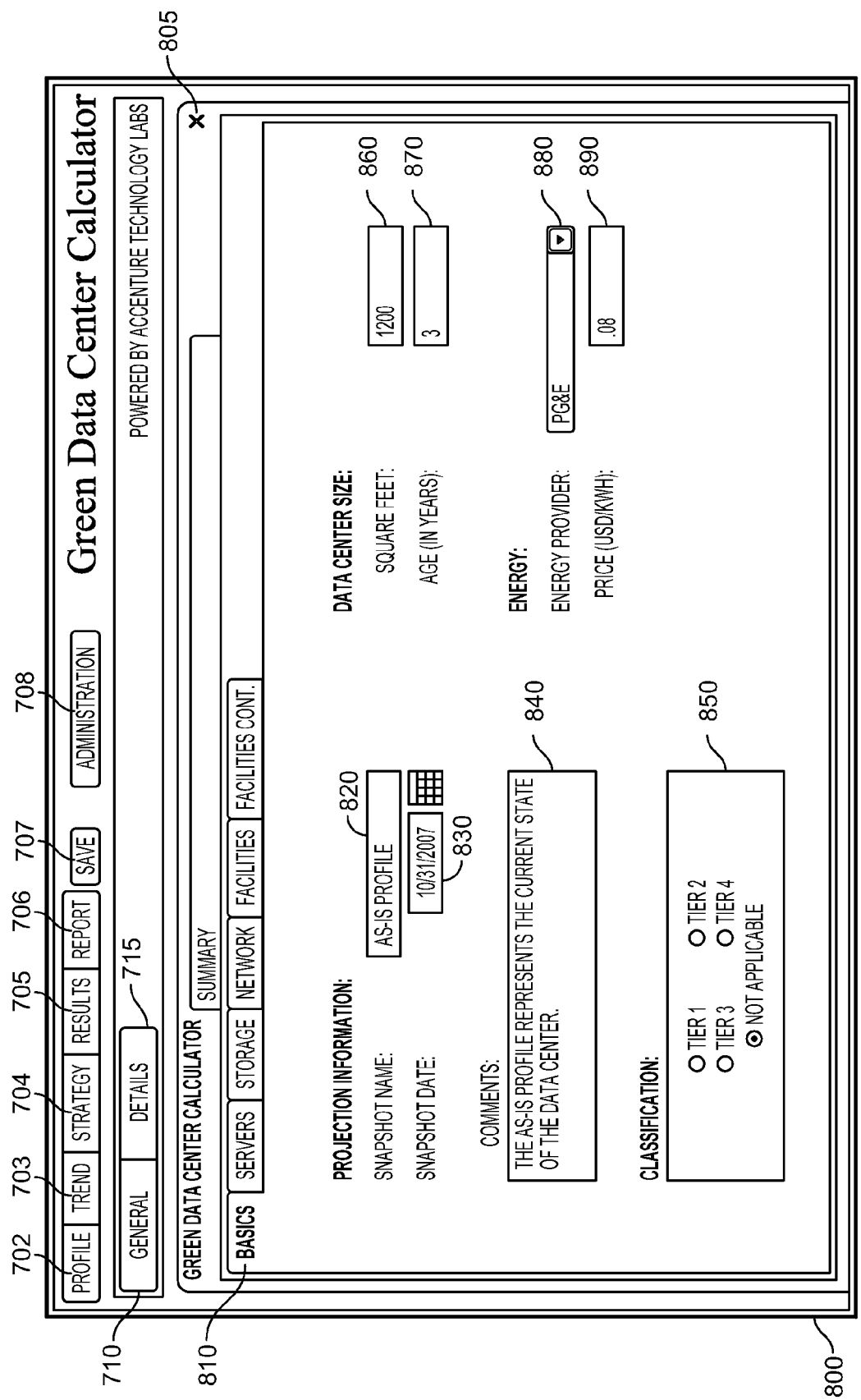
FIG. 8 is a screenshot of a user interface for inputting basic data center profile statistics in the system of FIG. 1, or other systems for providing strategies for increasing efficiency of data centers.

FIG. 8 is a screenshot 800 of a user interface for inputting basic data center profile statistics in the system of FIG. 1, or other systems for providing strategies for increasing efficiency of data centers. The service provider server 240 may display the screenshot 800 to the user A 120A when the user A 120A clicks on the details tab 715. The user A 120A may use the screenshot 800 to input their data center configuration data. The screenshot 800 may include a profile tab 702, a trend tab 703, a strategy tab 704, a results tab 705, a report tab 706, save button 707, an administration button 708, a general tab 710, a details tab 715, a details tabset 810, a close button 805, a snapshot name field 820, a snapshot date field 830, a comments field 840, a classification selector 850, a size field 860, an age field 870, an energy provider selector 880 and an energy price field 890.

In operation the details tabset 810 may allow the user A 120A to enter specific information regarding the basics servers, storage, network, and facilities of their data center. The screenshot 800 may correlate to the basic data center information. The user A 120A may enter the name of the profile into the snapshot name field 820. The user A 120A may input the date the profile of the data center was taken into the snapshot date field 830. The user A 120A may input comments into the comments field 840. The user A 120A may identify the data center tier, referring to the level of redundancy needed, in the classification selector 850. The user A 120A may enter the size of the data center, in square feet, in the size field 860, and the age of the data center in the age field 870. The size and age of the data center may directly affect the facilities needs of the data center. The user A 120A may select an energy provider from the energy provider selector 880. The energy selector may be populated with energy providers who service the geographic area identified by the user A 120A in the state/region selector 726 of FIG. 7. The service provider 140 may automatically populate the price field 890 when the user A 120A selects an energy provider in the energy provider selector 880. If the value populated in the price field 890 is incorrect the user A 120A may manually change the value. The user A 120A may exit to the general profile screenshot 700 by clicking on the close button 805.

Figure 9:
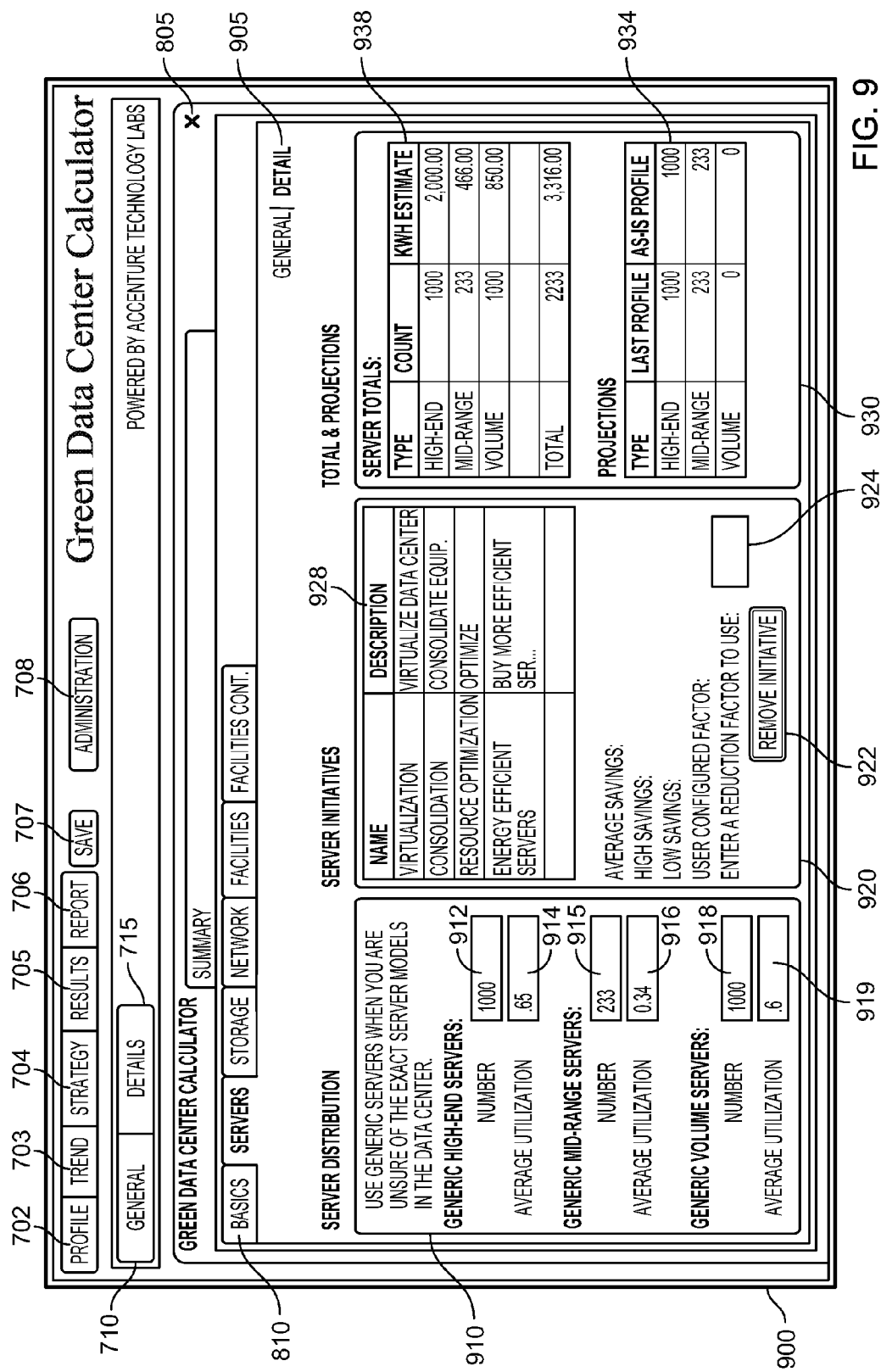
FIG. 9 is a screenshot of a user interface for inputting generic server profile information in the system of FIG. 1, or other systems for providing strategies for increasing efficiency of data centers.

FIG. 9 is a screenshot 900 of a user interface for inputting generic server profile information in the system of FIG. 1, or other systems for providing strategies for increasing efficiency of data centers. The service provider server 240 may display the screenshot 900 to the user A 120A when the user A 120A clicks on the servers tab in the details tabset 810. The user A 120A may use the screenshot 900 to input their data center configuration data. The screenshot 900 may include a profile tab 702, a trend tab 703, a strategy tab 704, a results tab 705, a report tab 706, save button 707, an administration button 708, a general tab 710, a details tab 715, a details tabset 810, a close button 805, a server distribution subsection 910, a server initiatives subsection 920, a projections subsection 930 and a general/detail button 905. The server distribution subsection 910 may include a high-end servers number field 912, a high-end servers average utilization field 914, a mid-range servers number field 915, a mid-range servers average utilization field 916, a generic volume servers number field 918 and a generic volume servers average utilization field 919. The server initiatives subsection 920 may include an initiatives table 928, a reduction factor field 924 and a remove initiative button 922. The projection subsection 930 may include a server totals table 938 and a projections table 934.

In operation the user A 120A may enter generic server information in the server distribution subsection 910. The user A 120A may choose to enter generic server information when they are unsure of the exact server models in the data center. The system 100 may use average values from the historical data center information to determine the power consumption and processing power of the generic server types. The user A 120A may enter the number of generic high end servers in the high end servers number field 912 and the utilization of the generic high end servers in the high end servers utilization field 914. Similarly the user A 120A may enter the number of mid range servers in the mid range servers number field 915 and the average utilization of the mid range servers in the mid range servers utilization field 916. Lastly the user A 120A may enter the number of generic volume servers in the generic volume servers field 918 and the average utilization of the generic volume servers in the volume servers utilization field 919.

In the server initiatives subsection 920, the user A 120A may view selected initiatives in the initiatives table 928 and may remove an initiative from the initiatives table 928 by clicking on the remove initiative button 922. The user A 120A may change the reduction factors associated with the initiatives by clicking on an initiative in the initiatives table 928 and entering a new reduction factor in the reduction field 924. In the projections subsection 930 the service provider 140 may display the projected number of servers required for the user A 120A to implement the initiatives selected in the initiatives table 928. The projections may be based on the values the user A 120A entered in the server distribution subsection 910, the initiatives selected by the user A 120A in the initiatives table 928, and the historical data center data. The service provider 140 may utilize historical data center data pertaining to data centers with a similar profile as the data center of the user A 120A to populate the projections subsection 930. The user A 120A may click on the general/detail button 905 to change the screen from the general view to the detailed view.

Figure 10:
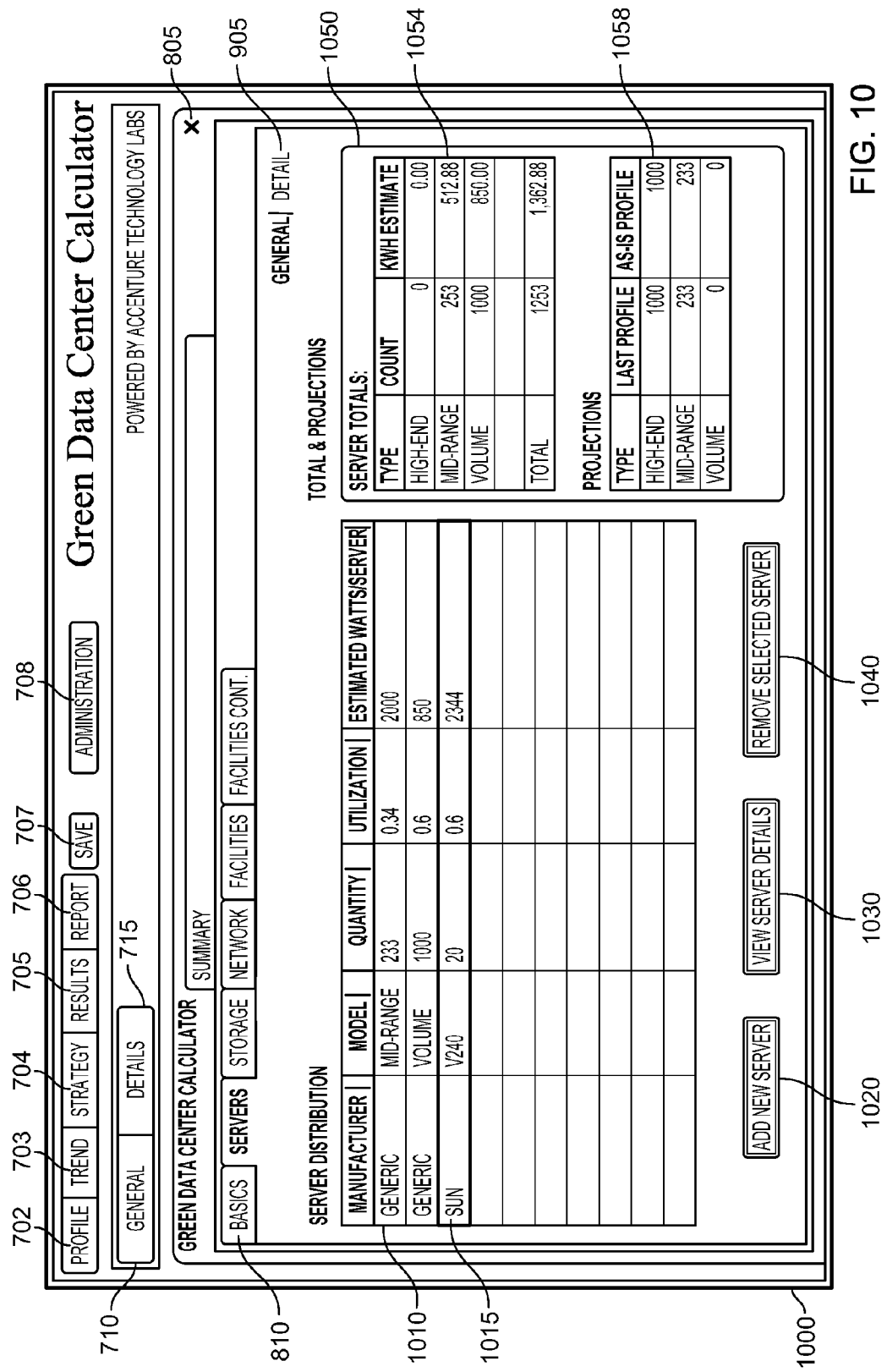
FIG. 10 is a screenshot of a user interface for inputting detailed server profile information in the system of FIG. 1, or other systems for providing strategies for increasing efficiency of data centers.

FIG. 10 is a screenshot 1000 of a user interface for inputting detailed server profile information in the system of FIG. 1, or other systems for providing strategies for increasing efficiency of data centers. The service provider server 240 may display the screenshot 1000 to the user A 120A when the user A 120A clicks on the general/detail button 905 in the screenshot 900. The user A 120A may use the screenshot 1000 to input their data center configuration data. The screenshot 1000 may include a profile tab 702, a trend tab 703, a strategy tab 704, a results tab 705, a report tab 706, save button 707, an administration button 708, a general tab 710, a details tab 715, a details tabset 810, a close button 805, a general/detail button 905, a server distribution table 1010, a add new server button 1020, a view server details button 1030, a remove selected server button 1040, and a projections subsection 1050. The server distribution table 1010 may include a selected server 1015. The projection subsection 1050 may include a server totals table 1054 and a projections table 1058.

In operation the user A 120A may create the server distribution of their data center in the server distribution table 1010. The user A 120A may enter specific information regarding each server, such as the manufacturer, model, quantity, utilization and the estimated watts/server. Alternatively or in addition the data store 245 may contain the data associated with each server. In this instance the user A 120A may enter the manufacturer and model of a server to retrieve the stored information associated with the server. The user A 120A may add a new server by clicking on the add new server button 1020, may view the server details by clicking on the view server details button 1030, or may remove the selected server 1015 by clicking on the remove selected server button 1040.

The service provider 140 may process the server information and data center profile information provided by the user A 120A to populate the projections subsection 1050. The server totals table 1054 may indicate the total number of servers and the estimated kilo-Watts per hour (kWh) used by the servers. The projections table 1058 may show the user A 120A the server configuration necessary to achieve their selected initiatives.

Figure 11:
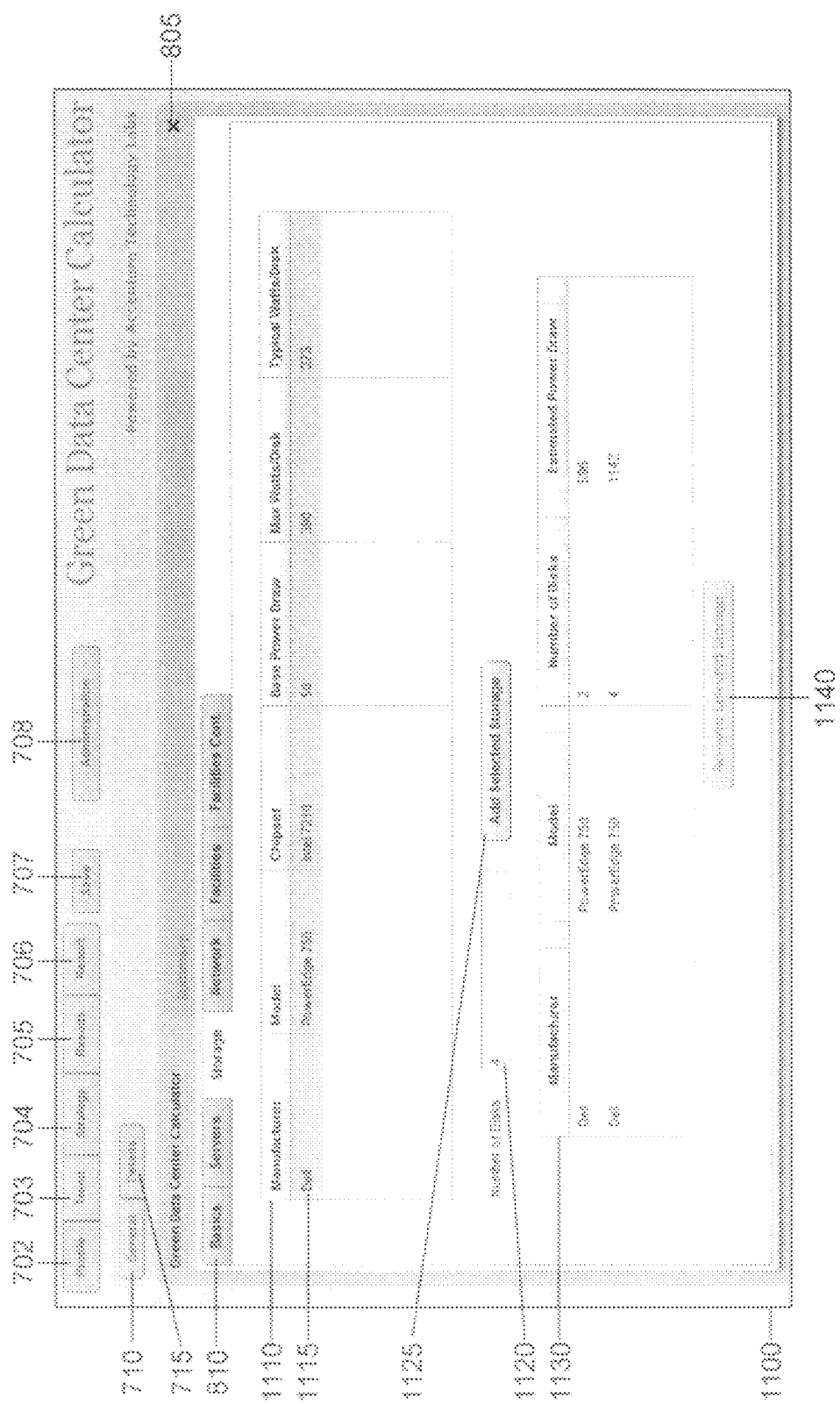
FIG. 11 is a screenshot of a user interface for inputting storage profile information in the system of FIG. 1, or other systems for providing strategies for increasing efficiency of data centers.

FIG. 11 is a screenshot 1100 of a user interface for inputting storage profile information in the system of FIG. 1, or other systems for providing strategies for increasing efficiency of data centers. The service provider server 240 may display the screenshot 1100 to the user A 120A when the user A 120A clicks on the storage tab in the details tabset 810. The user A 120A may use the screenshot 1100 to input their data center configuration data. The screenshot 1100 may include a profile tab 702, a trend tab 703, a strategy tab 704, a results tab 705, a report tab 706, save button 707, an administration button 708, a general tab 710, a details tab 715, a details tabset 810, a close button 805, a storage select table 1110, a number of disks field 1020, an add selected storage button 1125, a current storage table 1130 and a remove selected storage button 1140.

In operation the user A 120A may create a profile of their storage information in the screenshot 1100. The storage select table 1115 may display one or more storage types that the user A 120A may add to their storage profile. The storage types may have been previously added to the data store 245 by the administrator 110. The storage data may include the manufacturer, the model, the chipset, the base power draw, the max Watts/disk, and the typical Watts/disk of the storage type. The user A 120A may input the number of disks of the storage type in the number of disks field 1120 and the user A 120A may add the storage type to the storage profile by clicking the add selected storage button 1125. The current storage table 1130 may display the current storage profile of the data center of the user A 120A. The user A 120A may remove a storage type from the storage profile by clicking on the remove selected storage button 1140.

Figure 12:
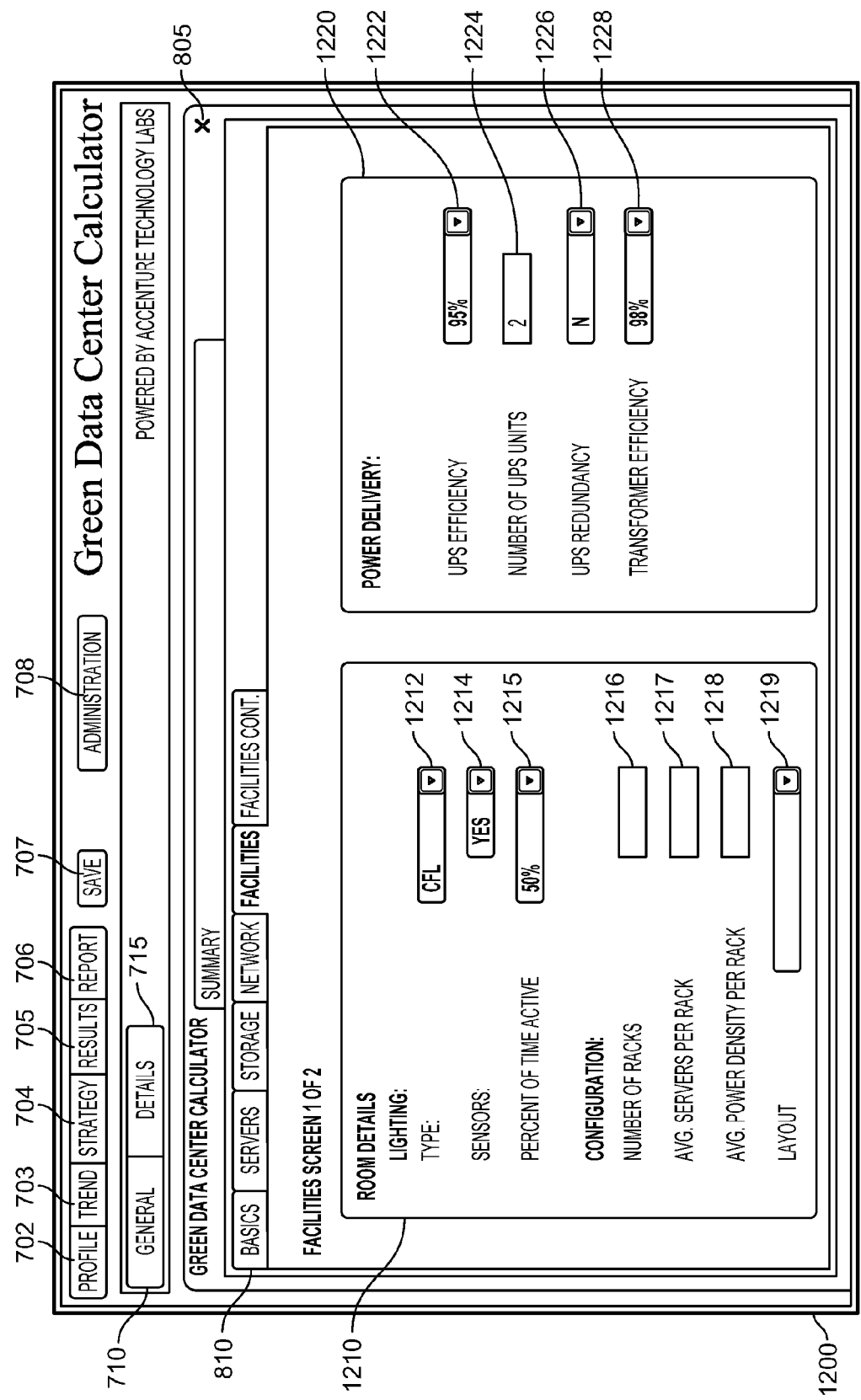
FIG. 12 is a screenshot of a user interface for inputting facilities profile information in the system of FIG. 1, or other systems for providing strategies for increasing efficiency of data centers.

FIG. 12 is a screenshot 1200 of a user interface for inputting facilities profile information in the system of FIG. 1, or other systems for providing strategies for increasing efficiency of data centers. The service provider server 240 may display the screenshot 1200 to the user A 120A when the user A 120A clicks on the facilities tab in the details tabset 810. The user A 120A may use the screenshot 1200 to input their data center configuration data. The screenshot 1200 may allow the user A 120A to create a profile of their facilities supporting their data center. The screenshot 1200 may include a profile tab 702, a trend tab 703, a strategy tab 704, a results tab 705, a report tab 706, save button 707, an administration button 708, a general tab 710, a details tab 715, a details tabset 810, a close button 805, a room details subsection 1210, and a power delivery subsection 1220. The room details subsection 1210 may include a lighting type selector 1212, a sensors selector 1214, a percent of time active selector 1215, a number of racks field 1216, an average servers per rack field 1217, an average power density per rack 1218 and a layout selector 1219. The power delivery subsection 1220 may include an uninterruptible power supply ("UPS") efficiency selector 1222, a number of UPS units 1224, a UPS redundancy 1226 and a transformer efficiency 1228.

In operation the user A 120A may use the room details subsection 1210 to create a profile of the room housing their data center. The type of lighting may be identified in the lighting type selector 1212, whether the data center has sensors to shut off the lights when not in use may be selected with the sensors selector 1214, and the percentage of the time the lights are active may be selected in the percent of time active selector 1215. The number of racks may be identified in the number of racks field 1216, the average servers per rack may be identified in the average servers per rack field 1217, the average power density per rack may be identified in the average power density per rack 1218, and the layout may be identified with the layout selector 1219. The UPS efficiency may be selected with the UPS efficiency selector 1222, the number of UPS units may be identified in the number of UPS units field 1224, the redundancy of the UPS may be selected with the UPS redundancy selector 1226, and the efficiency of the transformer may be selected with the transformer efficiency selector 1228.

Figure 13:
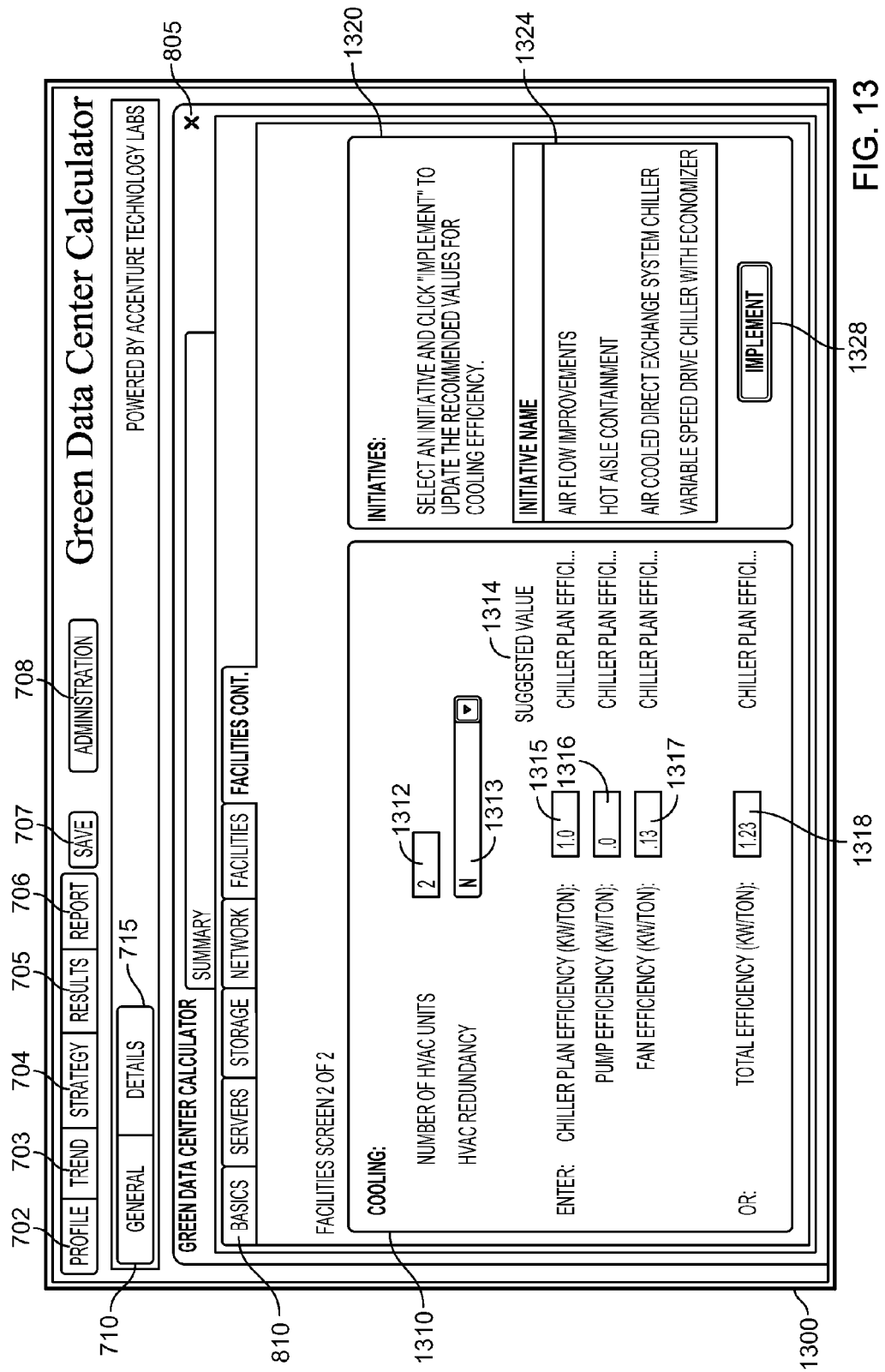
FIG. 13 is a screenshot of a user interface for inputting additional facilities profile information in the system of FIG. 1, or other systems for providing strategies for increasing efficiency of data centers.

FIG. 13 is a screenshot 1300 of a user interface for inputting additional facilities profile information in the system of FIG. 1, or other systems for providing strategies for increasing efficiency of data centers. The service provider server 240 may display the screenshot 1300 to the user A 120A when the user A 120A clicks on the "Facilities Cont." tab in the details tabset 810. The user A 120A may use the screenshot 1300 to input their data center configuration data. The screenshot 1300 may allow the user A 120A to create a profile of the facilities supporting their data center. The screenshot 1300 may include a profile tab 702, a trend tab 703, a strategy tab 704, a results tab 705, a report tab 706, save button 707, an administration button 708, a general tab 710, a details tab 715, a details tabset 810, a close button 805, a cooling subsection 1310, and an initiative subsection 1320. The cooling subsection 1310 may include a number of HVAC units field 1312, an HVAC redundancy selector 1313, a suggested value column 1314, a chiller plan efficiency field 1315, a pump efficiency field 1316, a fan efficiency field 1317, and a total efficiency field 1318. The initiative subsection 1320 may include an initiatives table 1324, and an implement button 1328.

In operation the user A 120A may identify the number of HVAC units in the data center with the number of HVAC units field 1312, and the HVAC redundancy with the HVAC redundancy selector 1313. The user A 120A may input the chiller plan efficiency in kilowatts/ton in the chiller plan efficiency field 1315. The pump efficiency may be inputted in the pump efficiency field 1316, and the fan efficiency may be inputted in the fan efficiency field 1317. The total efficiency may be displayed in the total efficiency field 1318.

The user A 120A may use the initiatives subsection 1320 to implement various initiatives focused on making the facilities of the data center more energy efficient. The user A 120A may select one or more initiatives from the initiative table 1324 and click on the implement button 1328. When the user A 120A clicks on the implement button 1328 the service provider 140 may update the suggested value column 1314 with the values suggested for each of the fields 1315, 1316, 1317 to achieve the selected initiatives.

Figure 14:
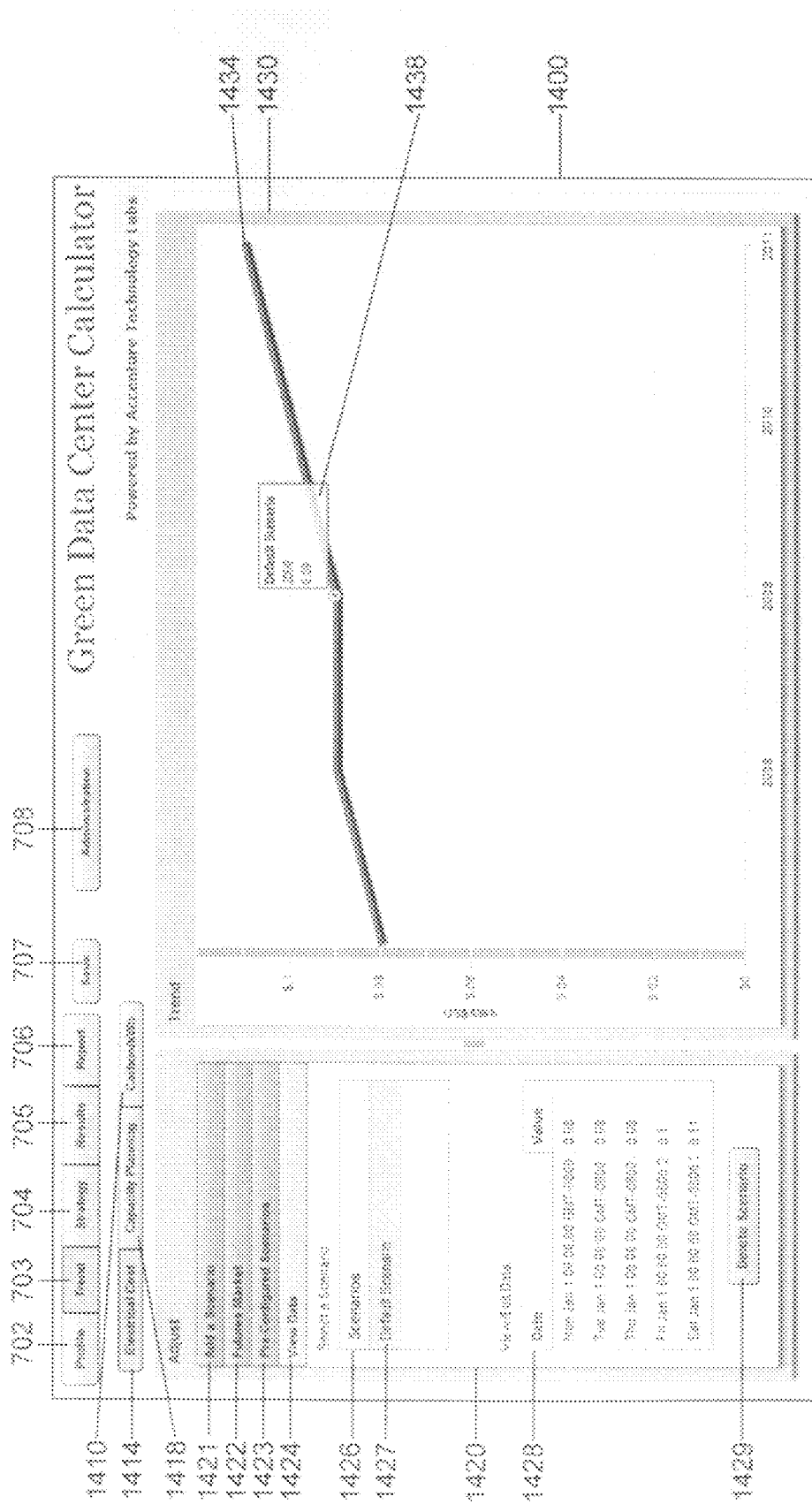
FIG. 14 is a screenshot of a user interface for inputting and viewing trend scenarios in the system of FIG. 1, or other systems for providing strategies for increasing efficiency of data centers.

FIG. 14 is a screenshot 1400 of a user interface for inputting and viewing trend scenarios in the system of FIG. 1, or other systems for providing strategies for increasing efficiency of data centers. The service provider server 240 may display the screenshot 1400 to the user A 120A when the user A 120A clicks on the trend tab 703. The screenshot 1400 may allow the user A 120A to create one or more trend scenarios and view the effects of the trend scenarios on the data center configuration selected by the user A 120A. The trend scenarios may include forecasted values of electricity cost, capacity needs and carbon emissions per kilowatt-hour. The screenshot 1400 may include a profile tab 702, a trend tab 703, a strategy tab 704, a results tab 705, a report tab 706, save button 707, an administration button 708, a electrical cost tab 1414, a capacity planning tab 1418, a carbon per kilowatt-hour tab 1410, an adjust subsection 1420 and a forecast graph 1430. The adjust subsection 1420 may include an add scenario button 1421, a futures market button 1422, a pre-configured scenarios button 1423, a view data button 1424, a scenarios table 1426, a selected scenario 1427 a scenario details table 1428 and a delete scenario button 1429. The forecast graph 1430 may include a forecast line 1434 and point in time information 1438.

In operation the user A 120A may use the electrical cost tab 1414 to forecast the change in the cost of electricity over a future time period, the capacity planning tab 1418 may be used to forecast the change in growth needs of the data center over a period of time, and the carbon per kilowatt hour tab 1410 to forecast the change in the amount of carbon emissions emitted for a kilowatt-hour of energy use over a period of time. The user A 120A may add a new scenario using the ad scenario button 1421. The user A 120A may select futures market data, which may be indicative of the aggregate scenarios created by the users 120B-N, by clicking on the futures market button 1422. The user A 120A may select pre-configured scenarios, such as scenarios stored in the data store 245, by using the pre-configured scenarios button 1423. The user A 120A may view the forecasted results of the scenarios by using the view data button 1424. The user A 120A may select a scenario to view the forecasted results of in the scenarios table 1426. The selected scenario 1427 may be highlighted in the scenarios table 1426. The user A 120A may view the specific changes of the variables over the period of time in the scenario details table 1428 and the user A 120A may delete the selected scenario 1427 by clicking the delete scenario button 1429.

The user A 120A may view the forecasted effects of the scenarios on the energy costs of the data center via the forecast line 1434 of the forecast graph 1430. The user A 120A may view the point in time information 1438 by sliding a pointer over any particular moment in time on the forecast line 1434.

Figure 15:
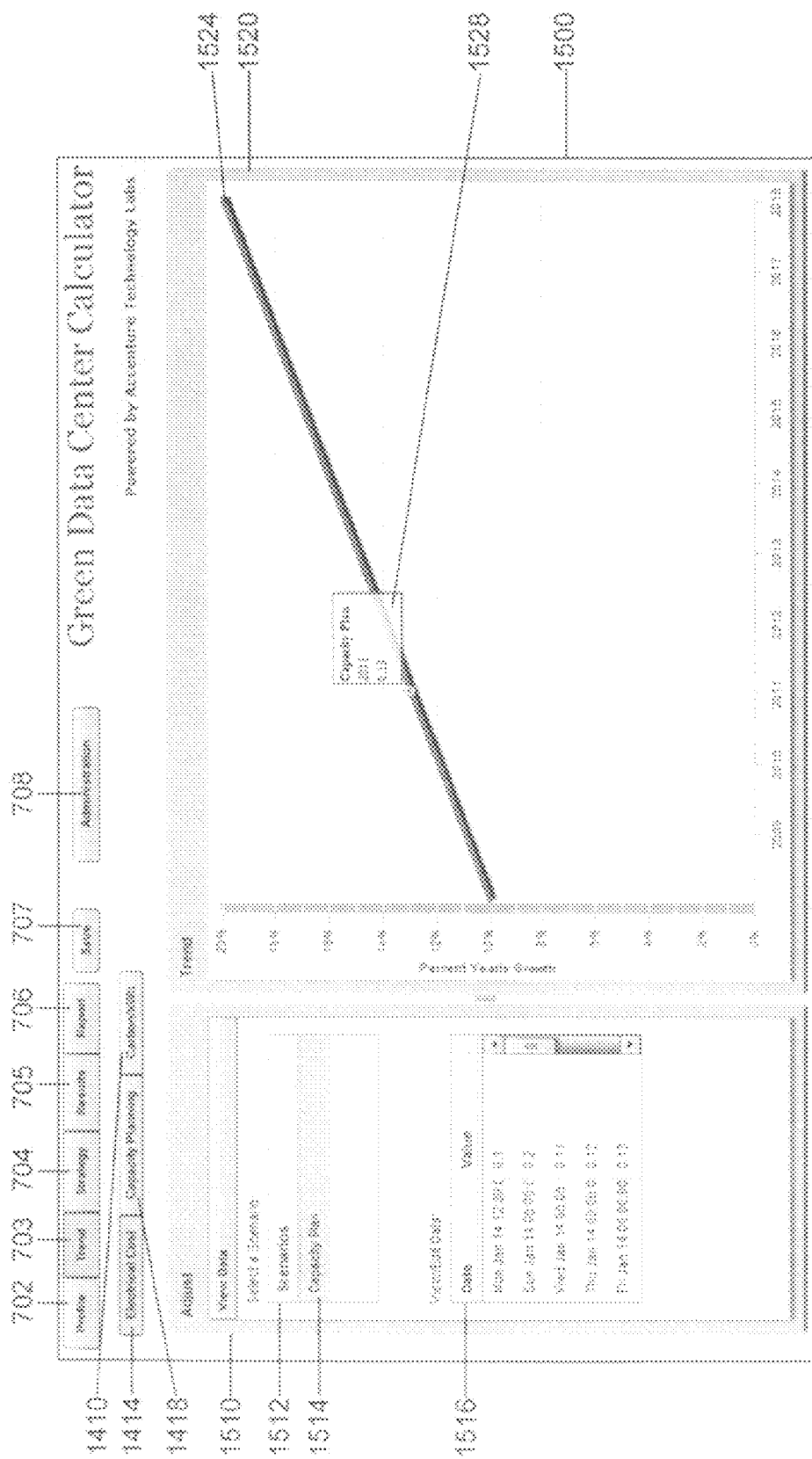
FIG. 15 is a screenshot of a user interface for inputting and viewing trend scenarios in the system of FIG. 1, or other systems for providing strategies for increasing efficiency of data centers.

FIG. 15 is a screenshot 1500 of a user interface for inputting and viewing trend scenarios in the system of FIG. 1, or other systems for providing strategies for increasing efficiency of data centers. The service provider server 240 may display the screenshot 1500 to the user A 120A when the user A 120A clicks on the trend tab 703 and then the capacity planning button 1418. The screenshot 1500 may allow the user A 120A to create one or more capacity planning scenarios and view the effects of the capacity planning scenarios on the data center configuration selected by the user A 120A.

The screenshot 1500 may include a profile tab 702, a trend tab 703, a strategy tab 704, a results tab 705, a report tab 706, save button 707, an administration button 708, a electrical cost tab 1414, a capacity planning tab 1418, a carbon per kilowatt-hour tab 1410, an adjust subsection 1510 and a forecast graph 1520. The adjust subsection 1510 may include a scenarios table 1512, a selected scenario 1514, and a scenario detail table 1516. The forecast graph 1520 may include a forecast line 1524 and point in time information 1528.

In operation the user A 120A may select a capacity planning scenario from the scenario table 1512. The selected scenario 1514 may be highlighted in the scenario table 1512 when selected by the user A 120A. The user A 120A may view the detailed change in values over the period of time in the scenario details table 1516. The user A 120A may view the forecasted effects of the selected scenario 1514 via the forecast line 1524 of the forecast graph 1520. The user A 120A may view the point in time information 1528 by sliding a pointer over any particular moment in time on the forecast line 1524.

Figure 16:
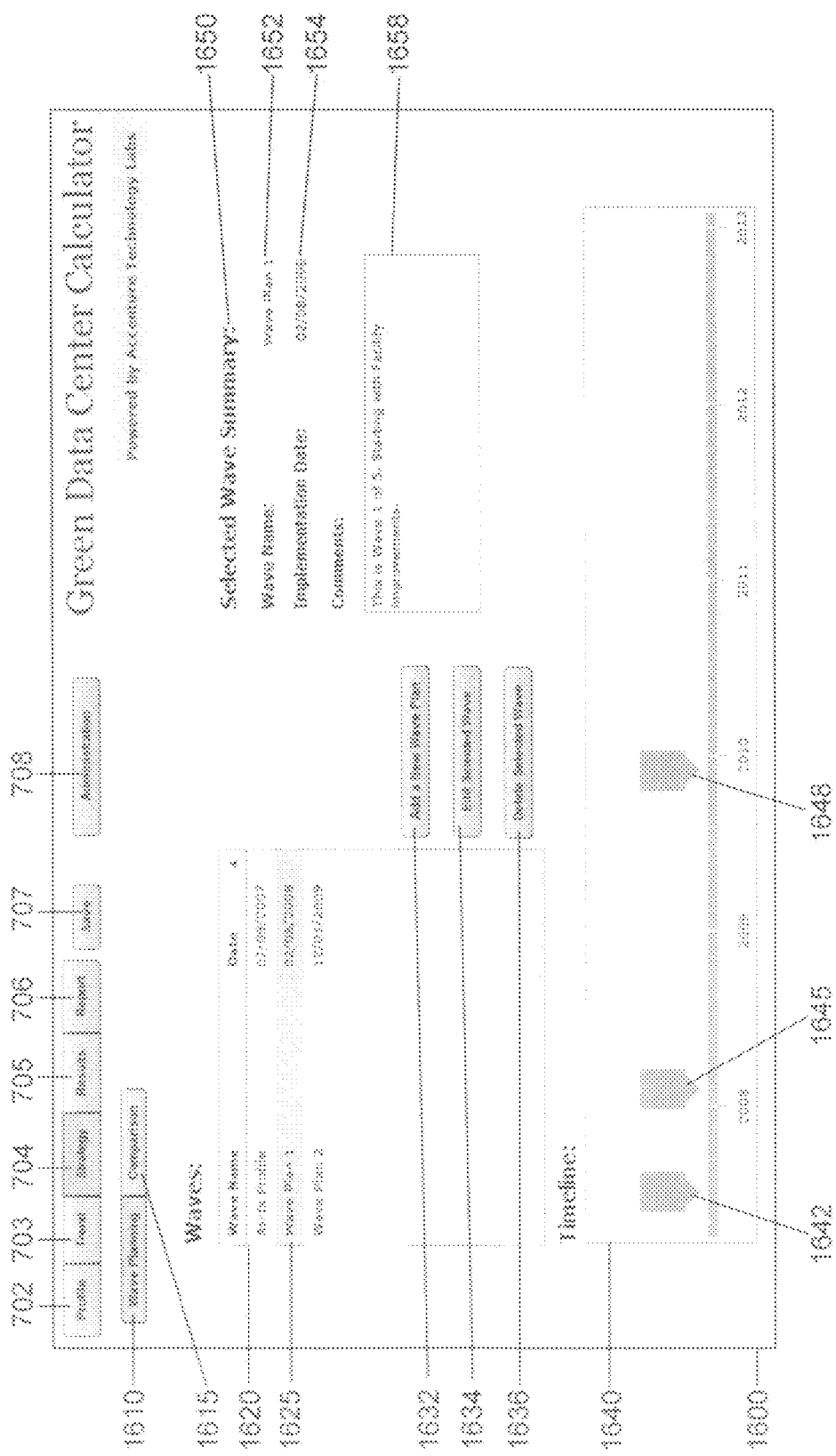
FIG. 16 is a screenshot of a user interface for creating wave plans in the system of FIG. 1, or other systems for providing strategies for increasing efficiency of data centers.

FIG. 16 is a screenshot 1600 of a user interface for creating wave plans in the system of FIG. 1, or other systems for providing strategies for increasing efficiency of data centers. The service provider server 240 may display the screenshot 1600 to the user A 120A when the user A 120A clicks on the strategy tab 704. The screenshot 1600 may allow the user A 120A to create one or more wave plans for their data center. The user A 120A may identify one or more initiatives for each wave plan and the time period of each wave plan. The screenshot 1600 may include a profile tab 702, a trend tab 703, a strategy tab 704, a results tab 705, a report tab 706, save button 707, an administration button 708, a wave planning tab 1610, a comparison tab 1615, a wave table 1620, an add new wave plan button 1632, an edit selected wave button 1634, and a delete selected wave button 1636, a selected wave summary subsection 1650 and a timeline 1640. The wave table 1620 may include a selected wave 1625. The timeline 1640 may include a first wave date 1642, a second wave date 1645 and a third wave date 1648. The selected wave summary 1650 may include a wave name 1652, an implementation date 1654 and a comments field 1658.

In operation the user A 120A may create one or more waves describing the data center strategies of the user A 120A. The user A 120A may input the implementation date and strategy for each wave. The user A 120A may view the created waves in the wave table 1620. A new wave plan may be added by clicking on the add a new wave plan button 1632, and the selected wave 1625 may be deleted by clicking on the delete selected wave button 1636. The user A 120A may edit the selected wave 1625 by clicking on the edit selected wave button 1634. The selected wave summary subsection 1650 may display the wave name 1652, the implementation date 1654 and the comments 1658 of the selected wave 1625. The user A 120A may view the timeframe of the implementation of the waves in the timeline 1640. There may be a wave date 1642, 1645, 1648 for each of the waves listed in the wave table 1620.

Figure 17:
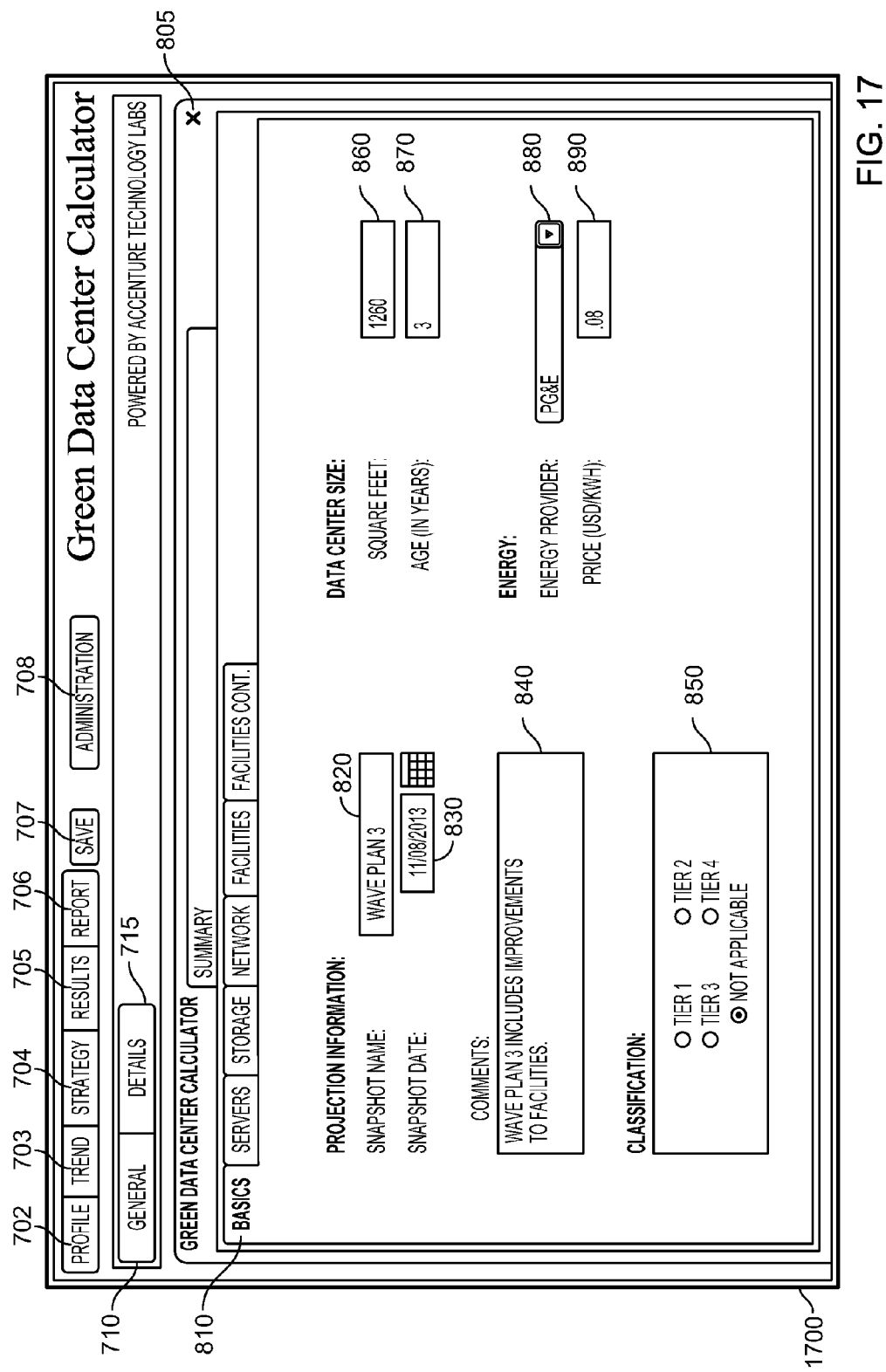
FIG. 17 is a screenshot of a user interface for inputting basic data center information for a wave plan in the system of FIG. 1, or other systems for providing strategies for increasing efficiency of data centers.

FIG. 17 is a screenshot 1700 of a user interface for inputting basic data center information for a wave plan in the system of FIG. 1, or other systems for providing strategies for increasing efficiency of data centers. The service provider server 240 may display the screenshot 1700 to the user A 120A when the user A 120A clicks on the edit selected wave button 1634 in FIG. 16. The screenshot 1700 may include a profile tab 702, a trend tab 703, a strategy tab 704, a results tab 705, a report tab 706, save button 707, an administration button 708, a general tab 710, a details tab 715, a details tabset 810, a close button 805, a snapshot name field 820, a snapshot date field 830, a comments field 840, a classification selector 850, a size field 860, an age field 870, an energy provider selector 880 and an energy price field 890.

In operation the details tabset 810 may allow the user A 120A to enter specific information regarding the basics servers, storage, network, and facilities of this wave of their data center implementation. The screenshot 800 may correlate to the basic data center information. The user A 120A may enter the name of the profile into the snapshot name field 820. The user A 120A may input the date the profile of the data center was taken into the snapshot date field 830. The user A 120A may input comments into the comments field 840. The user A 120A may identify the number of tiers the data center uses in the classification selector 850. The user A 120A may enter the size of the data center, in square feet, in the size field 860, and the age of the data center in the age field 870. The size and age of the data center may directly affect the facilities needs of the data center. The user A 120A may select an energy provider from the energy provider selector 880. The service provider 140 may automatically populate the price field 890 when the user A 120A selects an energy provider in the energy provider selector 880. If the value populated in the price field 890 is incorrect the user A 120A may manually change the value. The user A 120A may exit to the wave planning screenshot 1600 by clicking on the close button 805.

Figure 18:
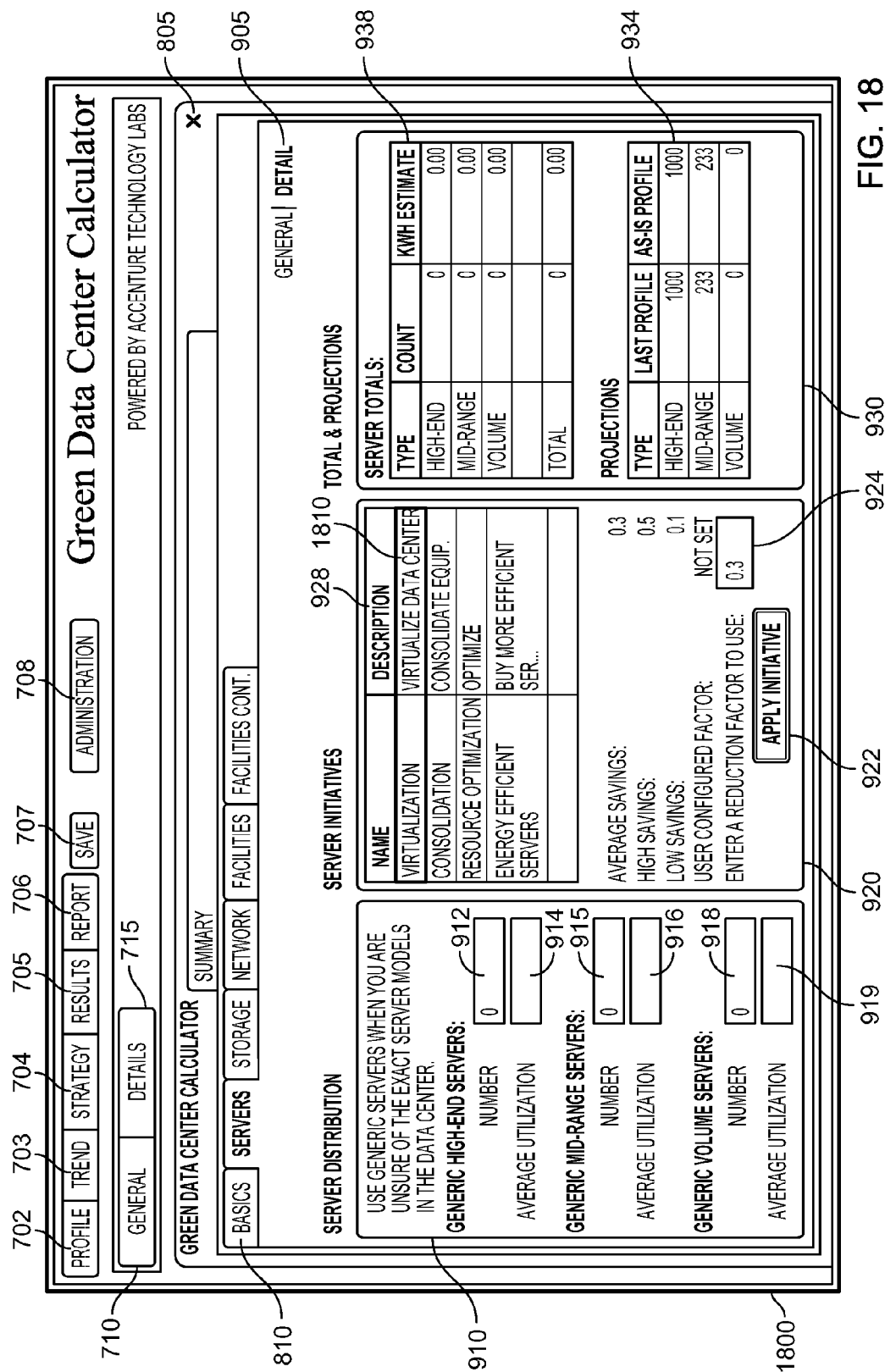
FIG. 18 is a screenshot of a user interface for selecting an initiative for a wave plan in the system of FIG. 1, or other systems for providing strategies for increasing efficiency of data centers.

FIG. 18 is a screenshot 1800 of a user interface for selecting an initiative for a wave plan in the system of FIG. 1, or other systems for providing strategies for increasing efficiency of data centers. The service provider server 240 may display the screenshot 1800 to the user A 120A when the user A 120A clicks on the servers tab in the details tabset 810. The screenshot 1800 may allow the user A 120A to update or create the server distribution for the current wave plan selected in FIG. 16. The screenshot 1800 may include a profile tab 702, a trend tab 703, a strategy tab 704, a results tab 705, a report tab 706, save button 707, an administration button 708, a general tab 710, a details tab 715, a details tabset 810, a close button 805, a server distribution subsection 910, a server initiatives subsection 920, a projections subsection 930, and a general/detail button 905. The server distribution subsection 910 may include a high-end servers number field 912, a high-end servers average utilization field 914, a mid-range servers number field 915, a mid-range servers average utilization field 916, a generic volume servers number field 918, and a generic volume servers average utilization field 919. The server initiatives subsection 920 may include an initiatives table 928, a reduction factor field 924, and a remove initiative button 922. The projection subsection 930 may include a server totals table 938 and a projections table 934.

In operation the user A 120A may enter generic server information in the server distribution subsection 910. The user A 120A may enter generic server information when the user A 120A is unsure of the exact server models in the data center. The system 100 may use average values from the historical data center information to determine the power consumption and processing power of the generic server types. The user A 120A may enter the number of generic high end servers in the high end servers number field 912, and the utilization of the generic high end servers in the high end servers utilization field 914. Similarly the user A 120A may enter the number of mid range servers in the mid range servers number field 915, and the average utilization of the mid range servers in the mid range servers utilization field 916. Lastly the user A 120A may enter the number of generic volume servers in the generic volume servers field 918, and the average utilization of the generic volume servers in the volume servers utilization field 919.

In the server initiatives subsection 920, the user A 120A may view selected initiatives in the initiatives table 928 and may remove an initiative from the initiatives table 928 by clicking on the remove initiative button 922. The user A 120A may change the reduction factors associated with the initiatives by clicking on an initiative in the initiatives table 928 and entering a new reduction factor in the reduction field 924. In the projections subsection 930 the service provider 140 may display the projected number of servers required for the user A 120A to implement the initiatives selected in the initiatives table 928. The projections may be based on the values the user A 120A entered in the server distribution subsection 910, the initiatives selected by the user A 120A in the initiatives table 928, and the historical data center data. The service provider 140 may utilize historical data center data pertaining to data centers with a similar profile as the data center of the user A 120A to populate the projections subsection 930. The user A 120A may click on the general/detail button 905 to change the screen from the general view to the detailed view.

Figure 19:
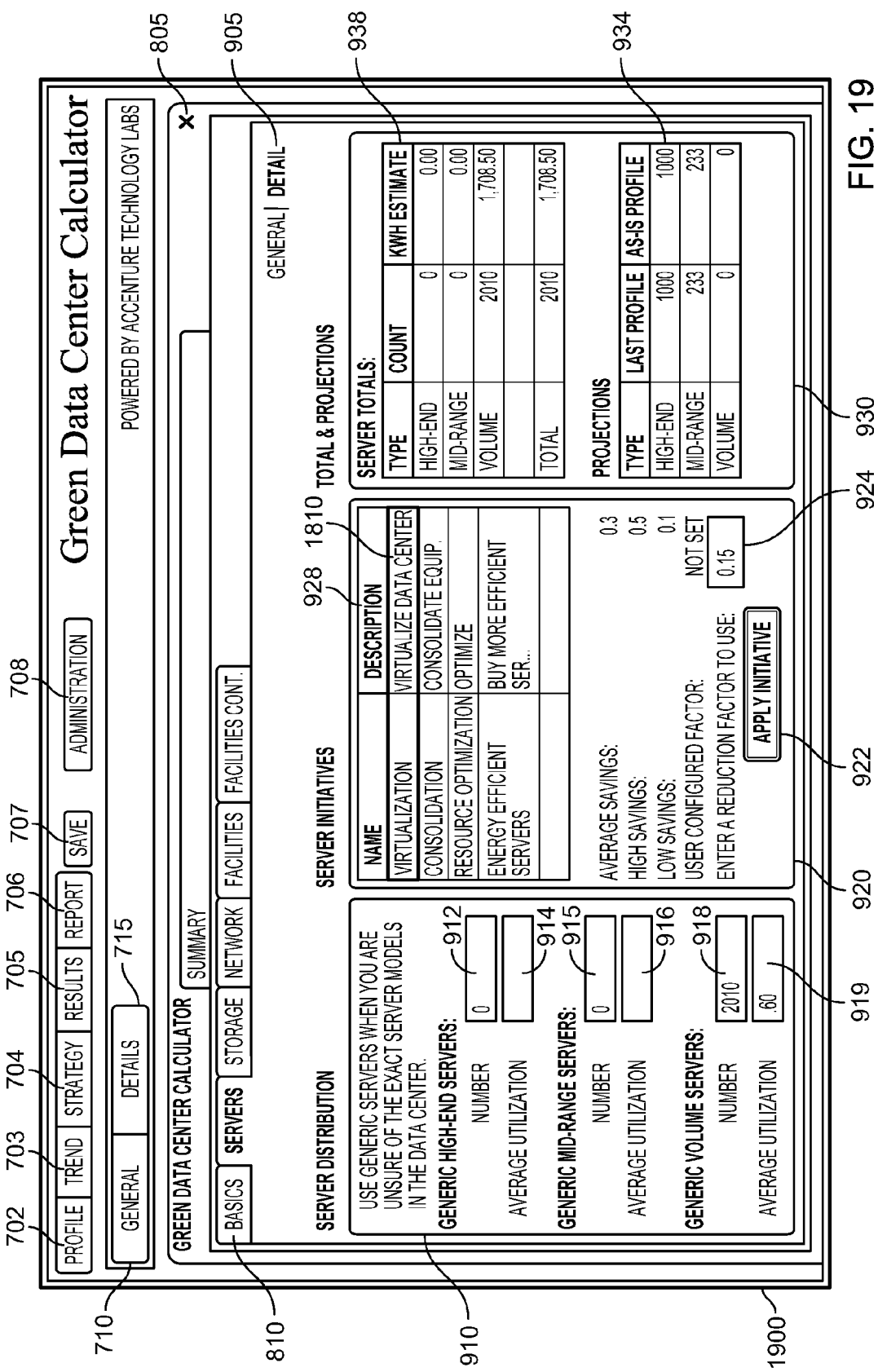
FIG. 19 is a screenshot of a user interface showing the projections of an initiative for a wave plan in the system of FIG. 1, or other systems for providing strategies for increasing efficiency of data centers.

FIG. 19 is a screenshot 1900 of a user interface showing the projections of an initiative for a wave plan in the system of FIG. 1, or other systems for providing strategies for increasing efficiency of data centers. The service provider server 240 may display the screenshot 1900 to the user A 120A when the user A 120A clicks on the apply initiative button 922 in the screenshot 1800. The screenshot 1900 may include a profile tab 702, a trend tab 703, a strategy tab 704, a results tab 705, a report tab 706, save button 707, an administration button 708, a general tab 710, a details tab 715, a details tabset 810, a close button 805, a server distribution subsection 910, a server initiatives subsection 920, a projections subsection 930 and a general/detail button 905. The server distribution subsection 910 may include a high-end servers number field 912, a high-end servers average utilization field 914, a mid-range servers number field 915, a mid-range servers average utilization field 916, a generic volume servers number field 918 and a generic volume servers average utilization field 919. The server initiatives subsection 920 may include an initiatives table 928, a reduction factor field 924 and a remove initiative button 922. The projection subsection 930 may include a server totals table 938 and a projections table 934.

In operation the user A 120A may enter generic server information in the server distribution subsection 910. The user A 120A may enter generic server information when the user A 120A is unsure of the exact server models in the data center. The system 100 may use average values from the historical data center information to determine the power consumption and processing power of the generic server types. The user A 120A may enter the number of generic high end servers in the high end servers number field 912 and the utilization of the generic high end servers in the high end servers utilization field 914. Similarly the user A 120A may enter the number of mid range servers in the mid range servers number field 915 and the average utilization of the mid range servers in the mid range servers utilization field 916. Lastly the user A 120A may enter the number of generic volume servers in the generic volume servers field 918 and the average utilization of the generic volume servers in the volume servers utilization field 919.

In the server initiatives subsection 920, the user A 120A may view selected initiatives in the initiatives table 928 and may remove an initiative from the initiatives table 928 by clicking on the remove initiative button 922. The user A 120A may change the reduction factors associated with the initiatives by clicking on an initiative in the initiatives table 928 and entering a new reduction factor in the reduction field 924.

In the projections subsection 930 the service provider 140 may display the projected number of servers required for the user A 120A to implement the initiatives selected in the initiatives table 928, and the reduction factor selected in the reduction factor field 924. The projections may be based on the values the user A 120A entered in the server distribution subsection 910, the initiatives selected by the user A 120A in the initiatives table 928, and the historical data center data. The service provider 140 may utilize historical data center data pertaining to data centers with a similar profile as the data center of the user A 120A to populate the projections subsection 930. The user A 120A may click on the general/detail button 905 to change the screen from the general view to the detailed view.

Figure 20:
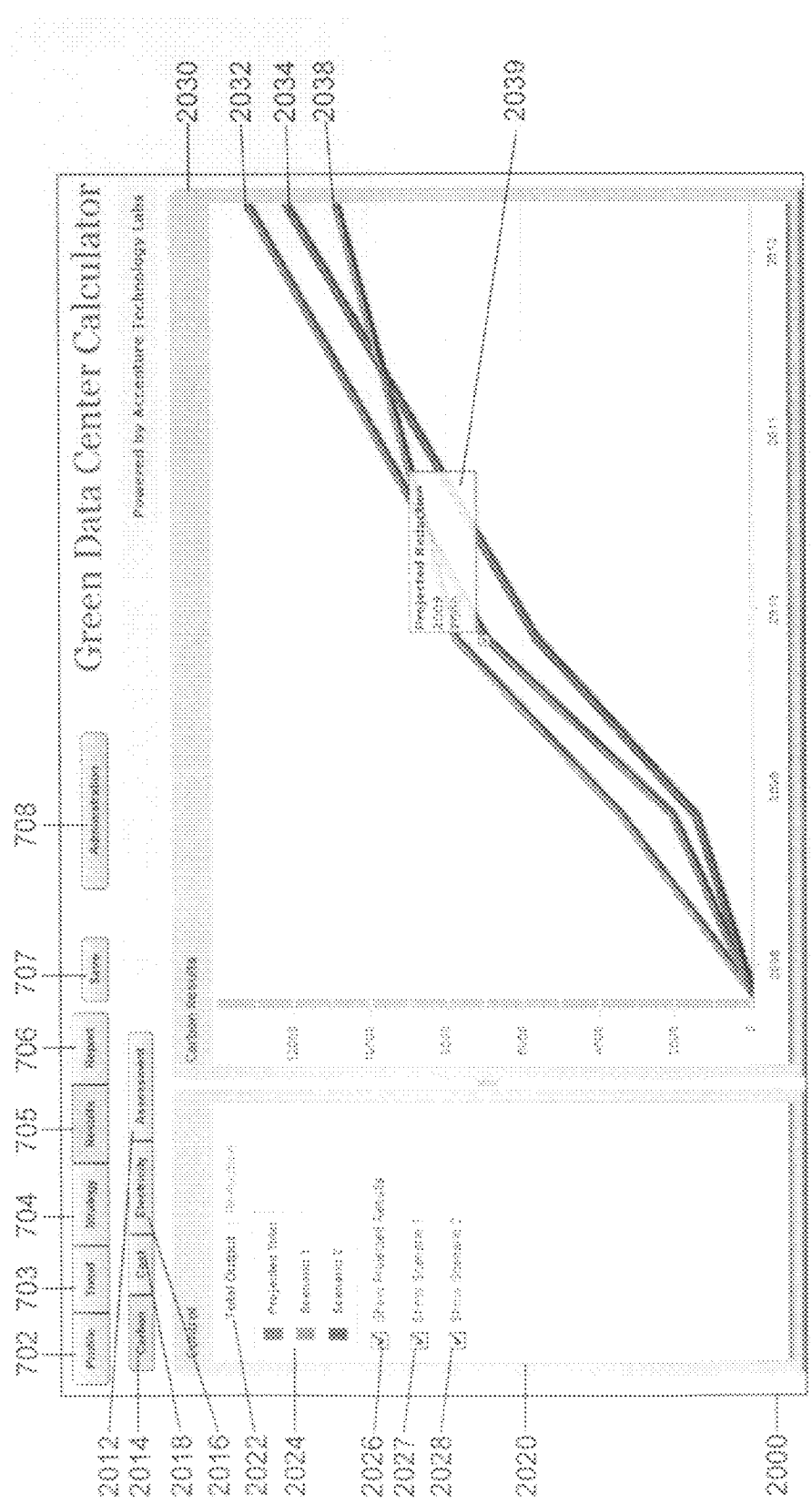
FIG. 20 is a screenshot of a results screen in the system of FIG. 1, or other systems for providing strategies for increasing efficiency of data centers.

FIG. 20 is a screenshot 2000 of a results screen in the system of FIG. 1, or other systems for providing strategies for increasing efficiency of data centers. The service provider server 240 may display the screenshot 2000 to the user A 120A when the user A 120A clicks on the results tab 705. The screenshot 2000 may include a profile tab 702, a trend tab 703, a strategy tab 704, a results tab 705, a report tab 706, save button 707, an administration button 708, a general tab 710, a details tab 715, a carbon tab 2014, a cost tab 2018, an electricity tab 2016, an assessment tab 2012, a control subsection 2020, and a graph 2030. The control subsection may include a total output button 2022, a projected total key 2024, a show projected results selector 2026, a show scenario 1 selector 2027 and a show scenario 2 selector 2028. The graph 2030 may include a projected total line 2032, a scenario 2 line 2034, a scenario 1 line 2038, and point in time information 2039.

In operation the user A 120A may select one or more of the lines 2032, 2034, 2038 to view on the graph 2030 by selecting the selectors 2026, 2027, 2028. The graph 2038 may demonstrate the effects of each scenario on the wave plans created by the user A 120A. The user A 120A may use the point in time information 2039 to view the data values on the graph 2030 at a particular period in time. The user A 120A may view the effects of the forecast scenarios on the cost of the energy by clicking on the cost tab 2018, on the electricity consumption by clicking on the electricity tab 2016 and a general assessment by clicking on the assessment tab 2012.

Figure 21:
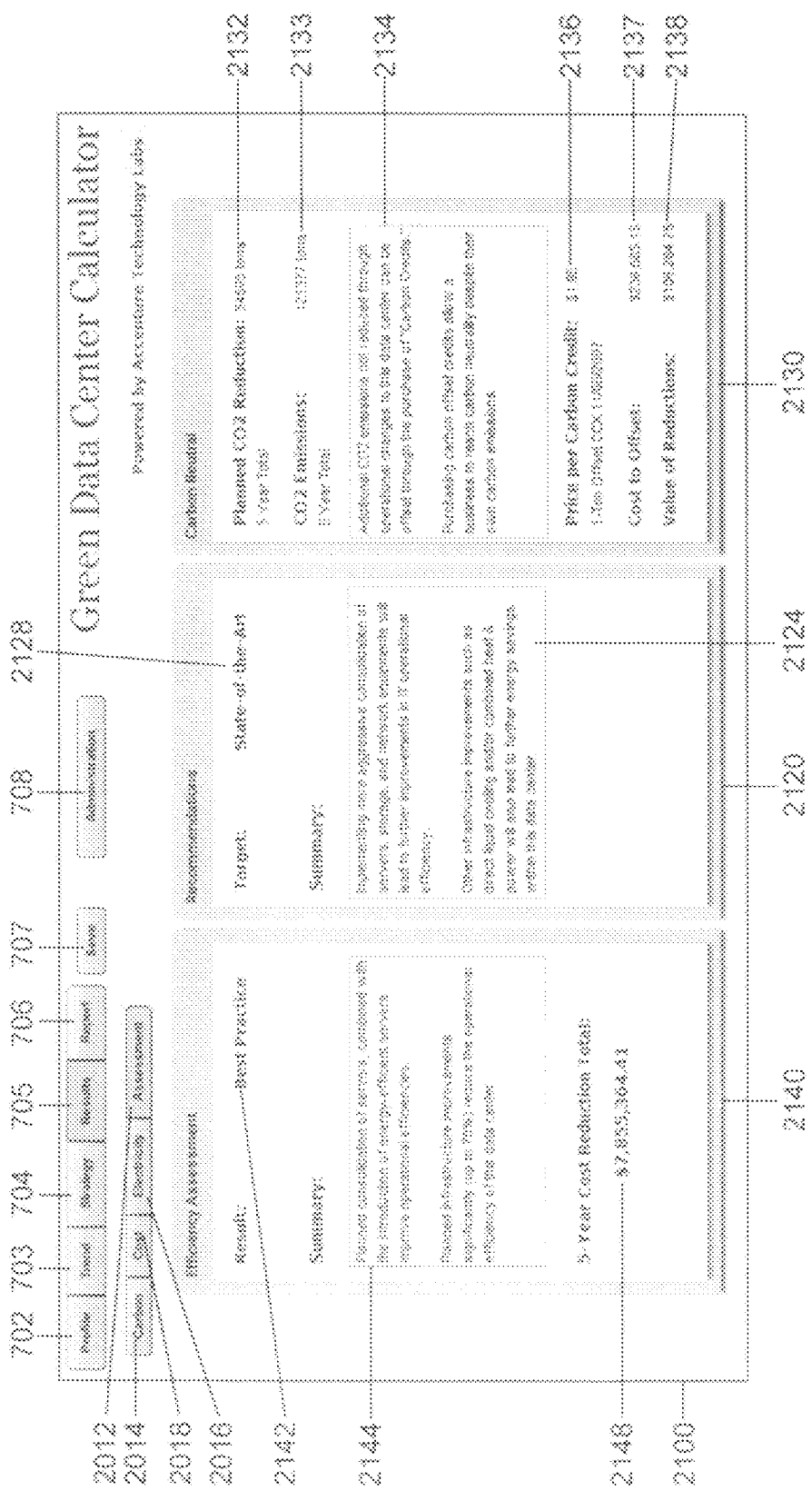
FIG. 21 is a screenshot of a report screen in the system of FIG. 1, or other systems for providing strategies for increasing efficiency of data centers.

FIG. 21 is a screenshot 2100 of an assessment screen in the system of FIG. 1, or other systems for providing strategies for increasing efficiency of data centers. The service provider server 240 may display the screenshot 2100 to the user A 120A when the user A 120A clicks on the assessment tab 2012. The screenshot 2100 may include a profile tab 702, a trend tab 703, a strategy tab 704, a results tab 705, a report tab 706, save button 707, an administration button 708, a general tab 710, a details tab 715, a carbon tab 2014, a cost tab 2018, an electricity tab 2016, an assessment tab 2012, an efficiency assessment subsection 2140, a recommendations subsection 2120, and a carbon neutral subsection 2130. The efficiency assessment subsection 2140 may include a result value 2142, a summary field 2144 and a cost reduction value 2148. The recommendations subsection 2120 may include a recommendation target value 2128 and a recommendation summary field 2124. The carbon neutral section 2130 may include a planned $CO_2$ reduction value 2132, a $CO_2$ emissions value 2133, an emissions summary 2134, a price per carbon credit 2136, a cost to offset value 2137 and a value of reductions 2138.

In operation the service provider 140 may rate the data center strategies of the user A 120A against the data center strategies inputted by the other users 120B-N. The efficiency assessment subsection 2140 may display the rating of the data center's efficiency in the result value 2142. A summary of the efficiency rating may be displayed in the summary field 2144 and the calculated five year total cost reduction may be displayed in the total cost reduction value 2148. The service provider 140 may calculate the total cost reduction value 2148 by calculating the cost of operating the initial data center configuration of the user A 120A over the next five years and subtracting the calculated cost of operating the configuration of the data center planned through the use of the system 100.

The recommendations subsection 2120 may provide the user A 120A with further recommendations on how to increase the efficiency of their data center. The service provider 140 may calculate the additional energy savings if the user A 120A were to implement any additional initiatives. The initiatives that result in the highest projected energy savings may be recommended to the user A 120A in the summary field 2124.

The carbon neutral subsection 2130 may display the carbon emissions of the data center configuration selected by the user A 120A. The planned CO2 reduction value 2132 may display the projected five year total reduction in carbon emissions. The CO2 emissions value 2133 may display the total projected carbon dioxide emissions of the data center over the next five years. The emissions summary 2134 may display the summary of the emissions output of the selected data center configuration of the user A 120A. The price per carbon credit value 2136 may be a projected carbon credit price or may be obtained from futures market data, third party data, government data, or generally any data provided by a third party server 250. The cost to offset value 2137 may be calculated by multiplying the tons of carbon emissions by the price per ton carbon credit. The value of reductions may display the carbon credit savings achievable by implementing the selected data center configuration.

Figure 22:
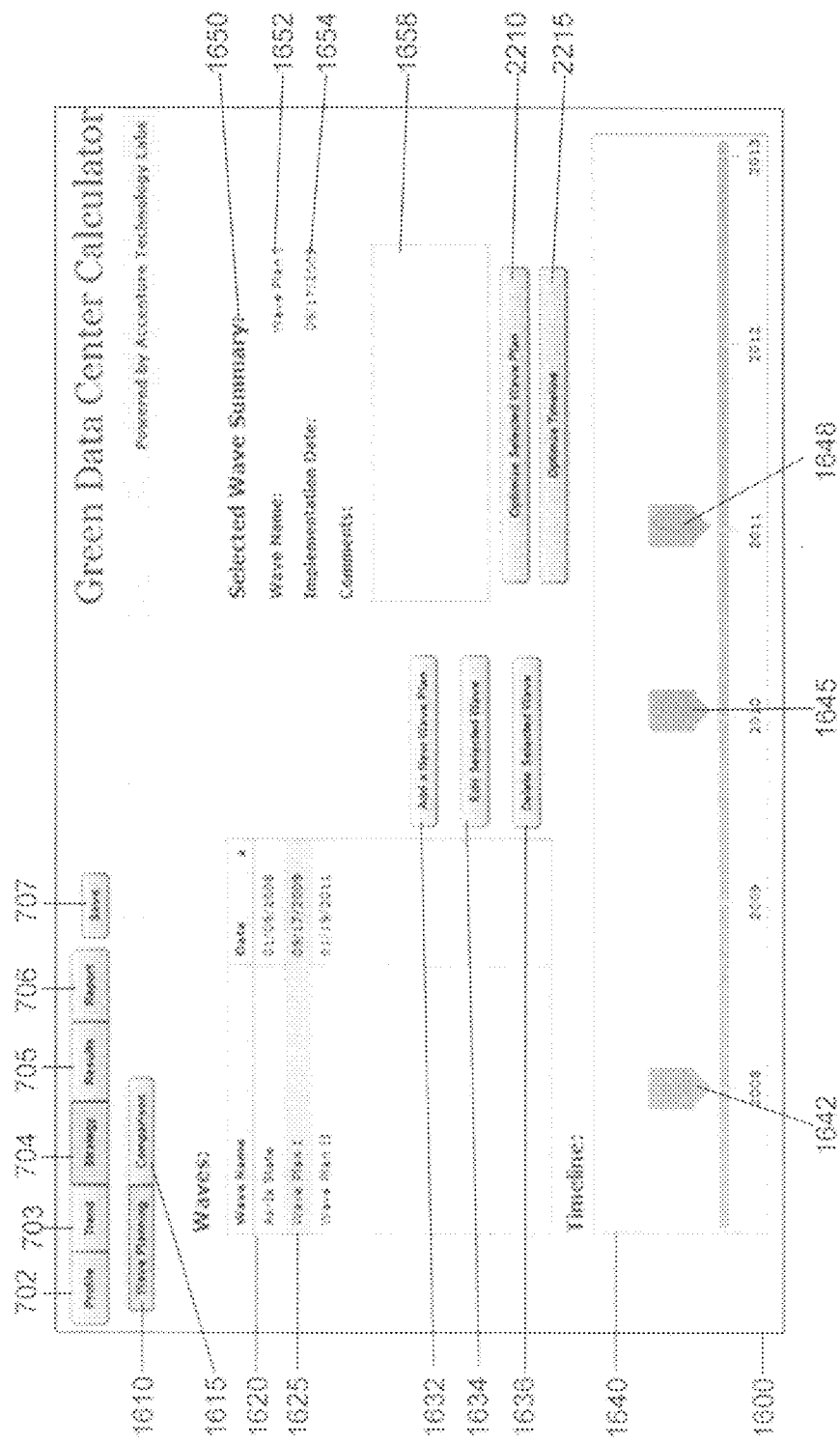
FIG. 22 is a screenshot of a user interface for optimizing wave plans in the system of FIG. 1, or other systems for providing strategies for increasing efficiency of data centers.

FIG. 22 is a screenshot of a user interface for optimizing wave plans in the system of FIG. 1, or other systems for providing strategies for increasing efficiency of data centers. The service provider server 240 may display the screenshot 2200 to the user A 120A when the user A 120A clicks on the strategy tab 704. The screenshot 2200 may allow the user A 120A to create one or more wave plans for their data center. The user A 120A may identify the strategy of each wave plan and the time period of each wave plan. The screenshot 2200 may allow the user A 120A to optimize a wave plan or the timeline of wave plans. The screenshot 2200 may include a profile tab 702, a trend tab 703, a strategy tab 704, a results tab 705, a report tab 706, save button 707, a wave planning tab 1610, a comparison tab 1615, a wave table 1620, an add new wave plan button 1632, an edit selected wave button 1634, and a delete selected wave button 1636, a selected wave summary subsection 1650, a timeline 1640, a optimize selected wave plan button 2210 and a optimize timeline button 2215. The wave table 1620 may include a selected wave 1625. The timeline 1640 may include a first wave date 1642, a second wave date 1645 and a third wave date 1648. The selected wave summary 1650 may include a wave name 1652, an implementation date 1654 and a comments field 1658.

In operation the user A 120A may create one or more waves describing the data center strategies of the user A 120A. The user A 120A may input the implementation date and strategy for each wave. The user A 120A may view the created waves in the wave table 1620. A new wave plan may be added by clicking on the add a new wave plan button 1632, and the selected wave 1625 may be deleted by clicking on the delete selected wave button 1636. The user A 120A may edit the selected wave 1625 by clicking on the edit selected wave button 1634. The selected wave summary subsection 1650 may display the wave name 1652, the implementation date 1654 and the comments 1658 of the selected wave 1625. The user A 120A may view the timeframe of the implementation of the waves in the timeline 1640. There may be a wave date 1642, 1645, 1648 for each of the waves listed in the wave table 1620.

The user A 120A may click on the optimize selected wave plan button 2210 to request that the system 100 optimize the selected wave plan 1625. The system 100 may analyze the data center configuration associated with the selected wave plan 1625, and determine whether any of the equipment and/or facilities may be modified to include more efficient equipment/facilities. The system 100 may recommend modifications to the data center configuration of the selected wave plan 1625.

The user A 120A may click on the optimize timeline button 2215 to request the system 100 to optimize the order in which the wave plans are performed. Some initiatives may require other initiatives to be in place before becoming viable. For example, the virtualization initiative may require the standardization initiative to occur first. The system 100 may optimize the timeline by suggesting an order of wave plans to ensure all of the prerequisite initiatives are fulfilled before implementing the next wave plan.

Figure 23:
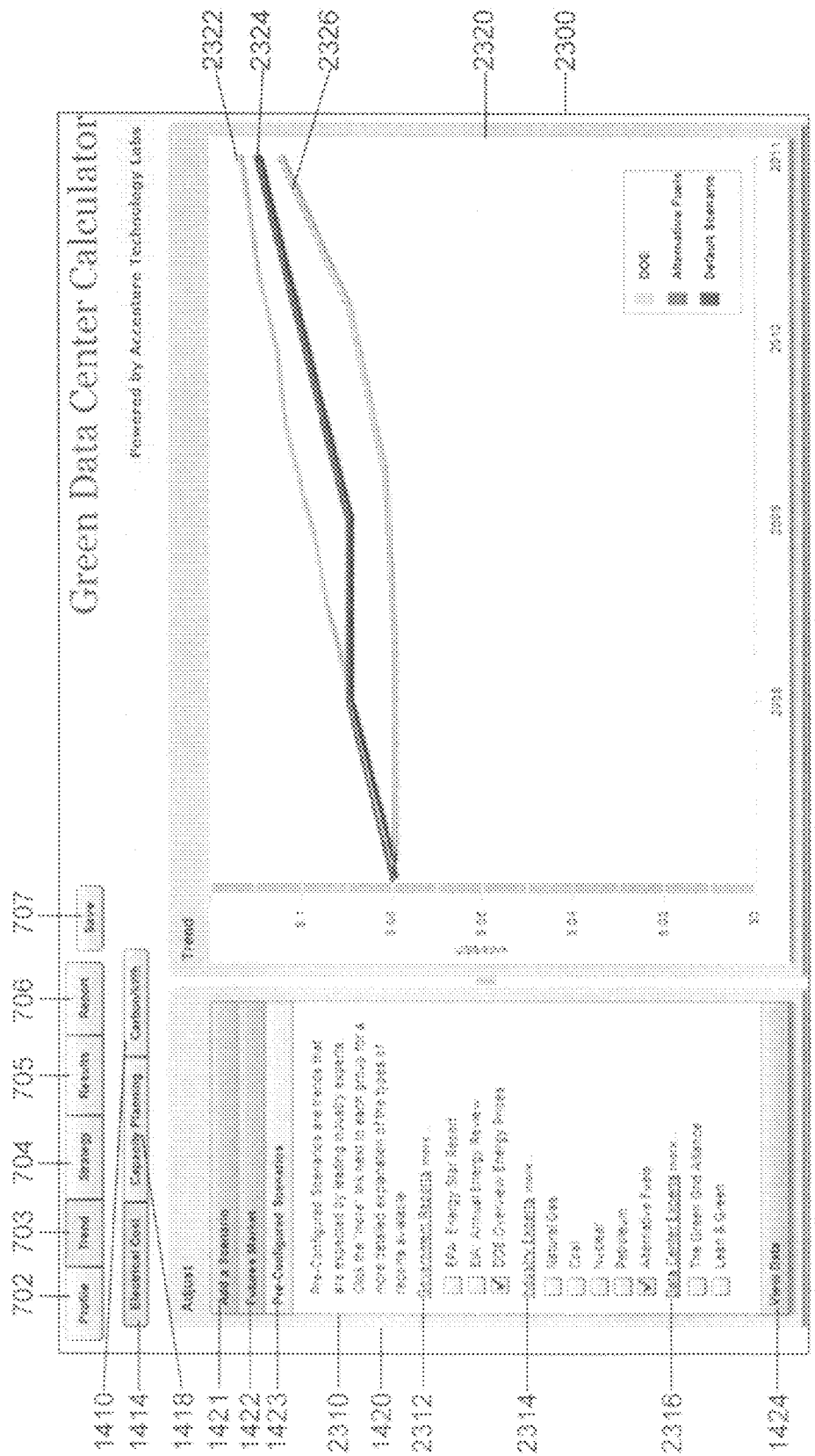
FIG. 23 is a screenshot of a user interface for overlaying pre-configured trend scenarios in the system of FIG. 1, or other systems for providing strategies for increasing efficiency of data centers.

FIG. 23 is a screenshot of a user interface for overlaying pre-configured trend scenarios in the system of FIG. 1, or other systems for providing strategies for increasing efficiency of data centers. The service provider server 240 may display the screenshot 2300 to the user A 120A when the user A 120A clicks on the trend tab 703 followed by the pre-configured scenarios button 1423. The screenshot 2300 may allow the user A 120A to view one or more preconfigured scenarios developed by experts, such as through government reports, by industry experts, and/or by ACCENTURE experts. The expert created scenarios may include forecasted values of electricity cost, capacity needs and carbon emissions per kilowatt-hour.

The screenshot 2300 may include a profile tab 702, a trend tab 703, a strategy tab 704, a results tab 705, a report tab 706, save button 707, a electrical cost tab 1414, a capacity planning tab 1418, a carbon per kilowatt-hour tab 1410, an adjust subsection 1420, a preconfigured scenarios subsection 2310, and a forecast graph 2320. The adjust subsection 1420 may include an add scenario button 1421, a futures market button 1422, a pre-configured scenarios button 1423, and a view data button 1424. The pre-configured scenarios subsection 2310 may include a government reports selector 2312, a industry experts selector 2314 and a data center experts selector 2316. The forecast graph 2320 may include a first forecast line 2322, a second forecast line 2324, and a third forecast line 2326.

In operation the user A 120A may use the electrical cost tab 1414 to forecast the change in the cost of electricity over a future time period, the capacity planning tab 1418 may be used to forecast the change in growth needs of the data center over a period of time, and the carbon per kilowatt hour tab 1410 to forecast the change in the amount of carbon emissions emitted for a kilowatt-hour of energy use over a period of time. The user A 120A may add a new scenario using the ad scenario button 1421. The user A 120A may select futures market data, which may be indicative of the aggregate scenarios created by the users 120B-N, by clicking on the futures market button 1422. The user A 120A may select pre-configured scenarios, such as scenarios stored in the data store 245, by using the pre-configured scenarios button 1423. The user A 120A may view the forecasted results of the scenarios by using the view data button 1424.

The user A 120A may select one or more pre-configured scenarios from the pre-configured scenarios subsection 2310. The user A 120A may select one or more scenarios generated from government reports using the government reports selector 2312. The government reports may include EPA reports, Department of Energy ("DOE") reports, and Energy Information Administration ("EIA") reports. The user A 120A may select one or more pre-configured scenarios based on industry experts in using the industry experts selector 2314. The industry experts may include natural gas experts, coal experts, nuclear experts, petroleum experts, and/or alternative fuels experts. The user A 120A may select one or more pre-configured scenarios created by data center experts using the data center experts selector 2316. The data center experts may include the Green Grid Alliance and/or the Lean & Green.

The user A 120A may view the forecasted effects of the pre-configured scenarios on the energy costs of the data center via the forecast lines 2322, 2324, 2326 of the forecast graph 2320. The graph 2320 may display a separate forecast line 2322, 2324, 2326, for each scenario chosen by the user A 120A.

Figure 24:
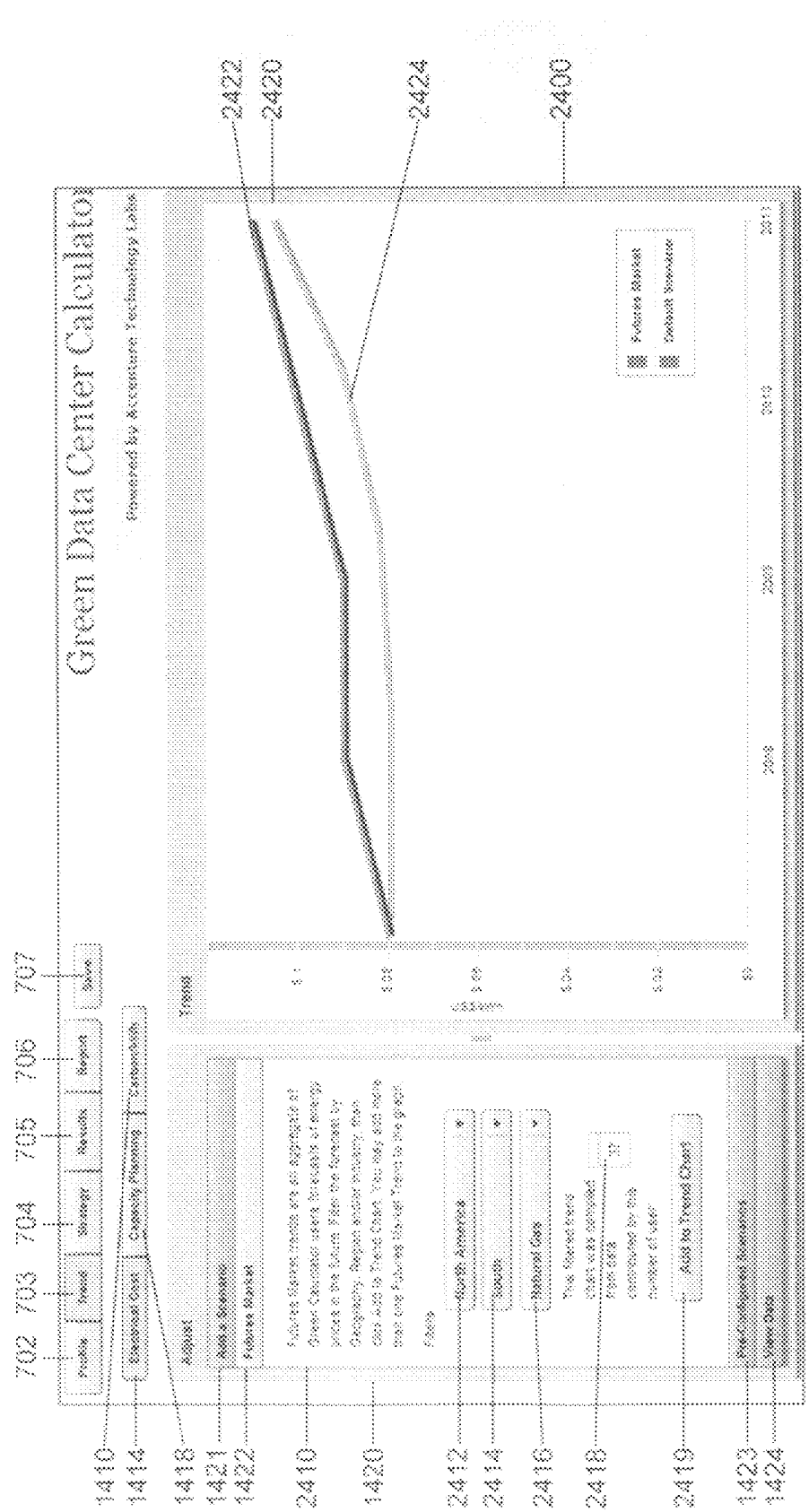
FIG. 24 is a screenshot of a user interface for overlaying aggregate data across multiple users in the system of FIG. 1, or other systems for providing strategies for increasing efficiency of data centers.

FIG. 24 is a screenshot of a user interface for overlaying aggregate data across multiple users in the system of FIG. 1, or other systems for providing strategies for increasing efficiency of data centers. The service provider server 240 may display the screenshot 2400 to the user A 120A when the user A 120A clicks on the trend tab 703 followed by the futures market button 1422. The screenshot 2400 may allow the user A 120A to view an aggregate of the forecast scenarios of the one or more other users 120B-N.

The screenshot 2300 may include a profile tab 702, a trend tab 703, a strategy tab 704, a results tab 705, a report tab 706, save button 707, a electrical cost tab 1414, a capacity planning tab 1418, a carbon per kilowatt-hour tab 1410, an adjust subsection 1420, a futures market subsection 2410, and a forecast graph 2420. The adjust subsection 1420 may include an add scenario button 1421, a futures market button 1422, a pre-configured scenarios button 1423, and a view data button 1424. The futures market subsection 2410 may include a geography selector 2412, a region selector 2414, an energy type selector 2416, a confidence field 2418, and a add to chart button 2419. The forecast graph 2420 may include a first forecast line 2422, and a second forecast line 2424.

In operation the user A 120A may use the electrical cost tab 1414 to forecast the change in the cost of electricity over a future time period, the capacity planning tab 1418 may be used to forecast the change in growth needs of the data center over a period of time, and the carbon per kilowatt hour tab 1410 to forecast the change in the amount of carbon emissions emitted for a kilowatt-hour of energy use over a period of time. The user A 120A may add a new scenario using the ad scenario button 1421. The user A 120A may select pre-configured scenarios, such as scenarios stored in the data store 245, by using the pre-configured scenarios button 1423. The user A 120A may view the forecasted results of the scenarios by using the view data button 1424.

The user A 120A may view an aggregate of the forecasts of the other users 120B-N by using the futures market subsection 2410. The user A 120A may filter the other users 120B-N to view specific aggregate forecast data by using the geography selector 2412, the region selector 2414 and the energy type selector 2416. The values selected with the selectors 2412, 2414, 2416, may be used to filter the users 120B-N whose data centers share the same characteristics as the data center of the user A 120A. The confidence field 2418 may display the number of users who share the chosen characteristics. If the value of the confidence field 2418 is low, the aggregate data may be unreliable. The user A 120A may view the aggregate of the forecast data of the filtered users 120B-N by clicking on the add to chart button 2419.

The user A 120A may view the forecasted effects of the aggregate forecast data on the energy costs of the data center via the forecast lines 2422, 2424 of the forecast graph 2420. The graph 2420 may display a separate forecast lines 2422, 2424 for the futures market data and for the default scenario data.

Figure 25:
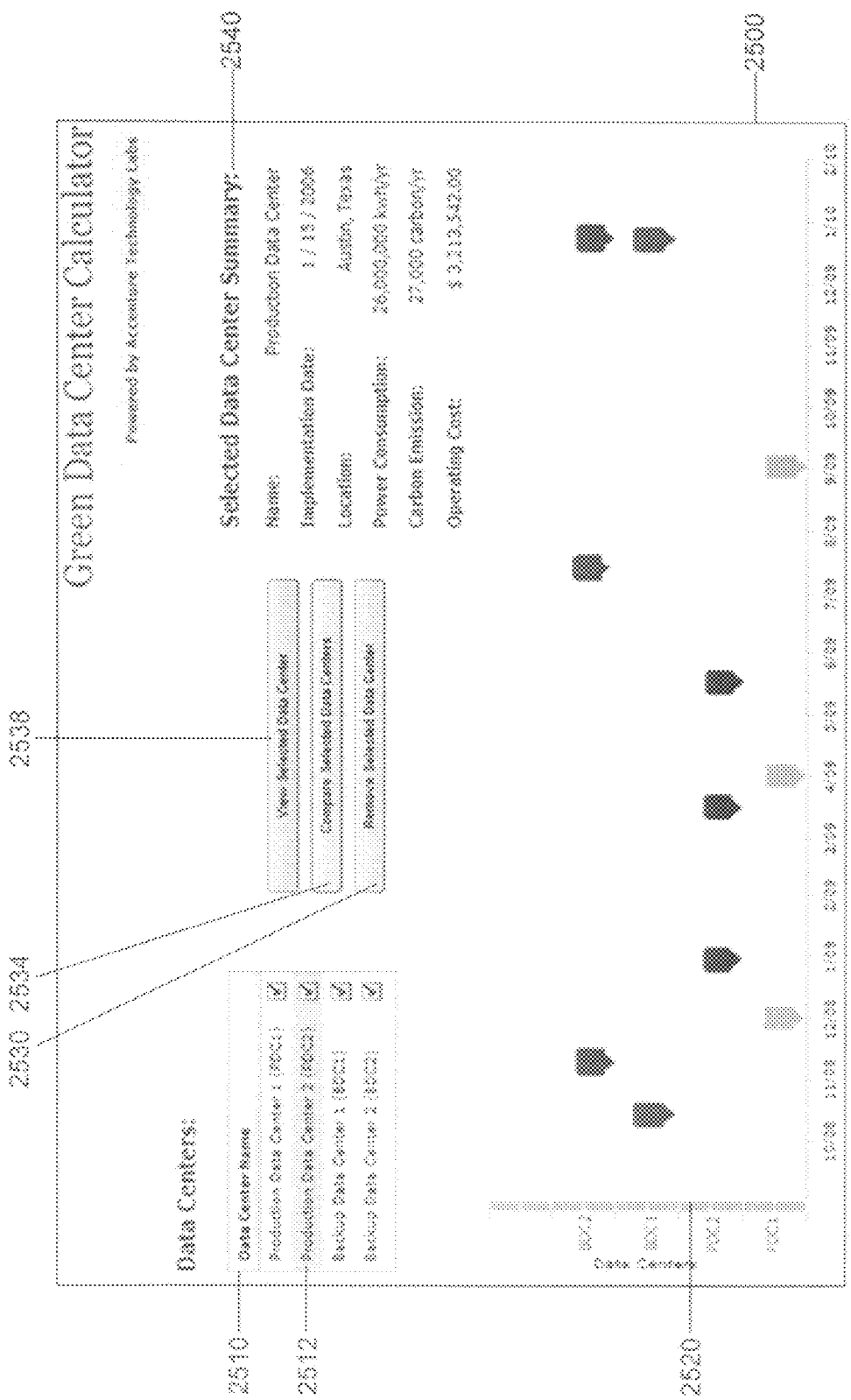
FIG. 25 is a screenshot of a user interface for managing strategy planning across multiple data centers in the system of FIG. 1, or other systems for providing strategies for increasing efficiency of data centers.

FIG. 25 is a screenshot of user interface for managing strategy planning across multiple data centers in the system of FIG. 1, or other systems for providing strategies for increasing efficiency of data centers. The screenshot 2500 may allow the user A 120A to view and manage wave plan data of multiple data centers. The screenshot 2500 may include a data center table 2510, a data center graph 2520, a remove selected data center 2530, a compare selected data centers 2534, a view selected data center 2538, and a selected data center summary 2540. The data center table 2510 may include a selected data center 2512.

In operation the user A 120A may use the screenshot 2500 to view the wave plan data associated with multiple data centers. The available data centers may be displayed to the user A 120A in the data center table 2510. The user A 120A may select one or more data centers from the data center table 2510. The user may view the selected data center 2512 by clicking on the view selected data center button 2538. The user A 120A may remove the selected data center 2512 by clicking on the remove selected data center button 2530. The user A 120A may compare multiple data centers by selecting multiple data centers from the data centers table 2510 and clicking on the compare selected data centers button 2534.

The system 100 may display the data associated with the selected data center 2512 in the selected data center summary 2540. The selected data center summary 2540 may display data associated with the selected data center 2512, such as name, implementation date, location, power consumption, carbon emission and operating cost. The user A 120A may view the wave plans of all of the data centers in the data center graph 2520. The data center graph 2520 may enable the user A 120A to properly coordinate the scheduling of the wave plans of multiple data centers.

Figure 26:
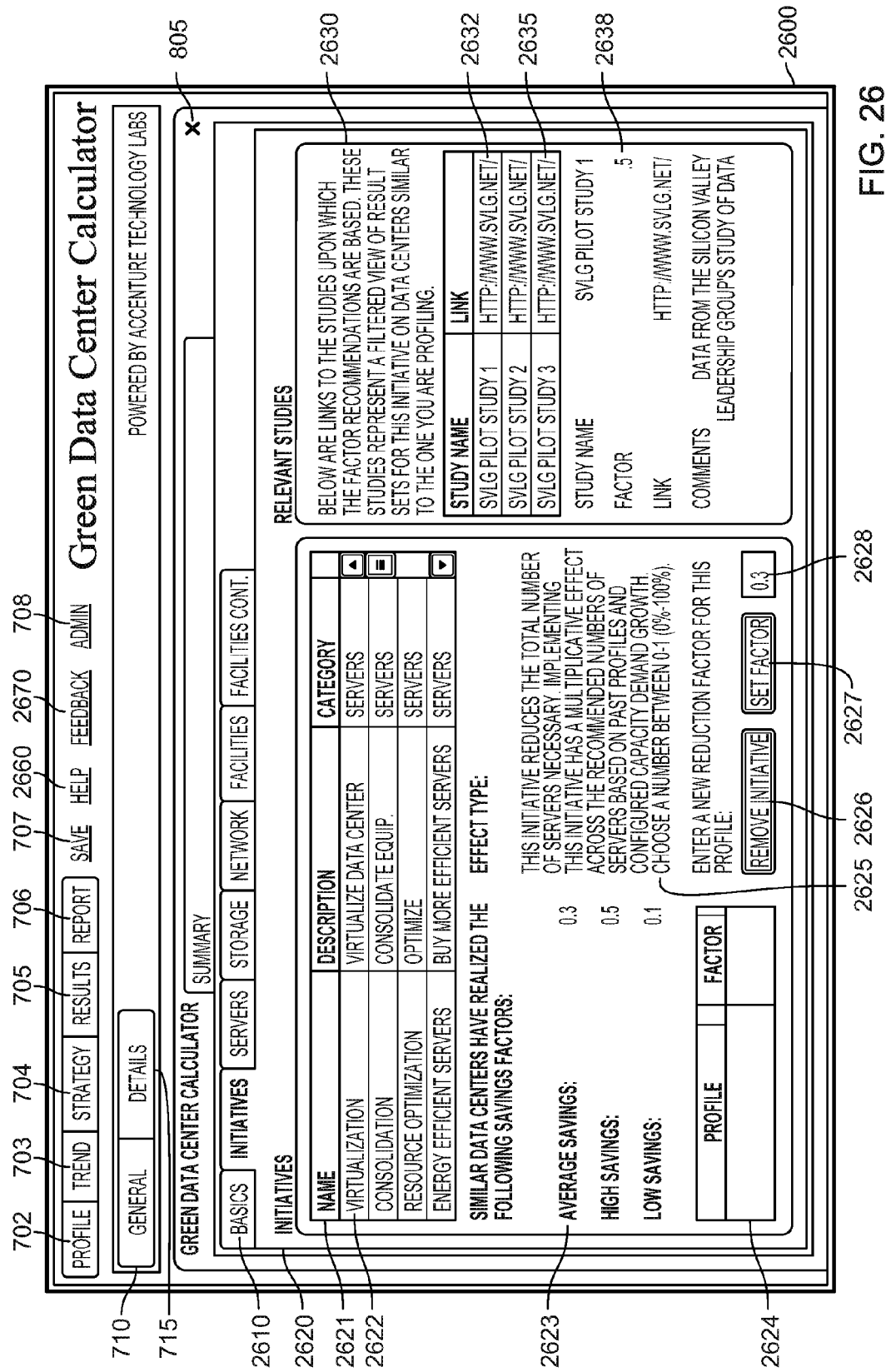
FIG. 26 is a screenshot of a user interface for selecting an initiative for a wave plan in the system of FIG. 1, or other systems for providing strategies for increasing efficiency of data centers.

FIG. 26 is a screenshot of a user interface for selecting an initiative for a wave plan in the system of FIG. 1, or other systems for providing strategies for increasing efficiency of data centers. The service provider server 240 may display the screenshot 2600 to the user A 120A when the user A 120A clicks on the initiatives tab in the details tabset 2610. The user A 120A may use the screenshot 2600 to select an initiative to implement on their data center. The screenshot 2600 may include a profile tab 702, a trend tab 703, a strategy tab 704, a results tab 705, a report tab 706, save button 707, a help button 2660, a feedback button 2670, an administration button 708, a general tab 710, a details tab 715, a details tabset 2610, a close button 805, an initiatives subsection 2620, and a relevant studies subsection 2630. The initiatives subsection 2620 may include an initiatives table 2621, a selected initiative 2622, a similar savings data 2623, a profile table 2624, an effect type 2625, a remove initiative button 2626, a set factor button 2627, and a factor field 2628. The relevant studies subsection 2630 may include a studies table 2635, a selected study 2632, and a study profile data 2638.

In the server initiatives subsection 2620, the user A 120A may view the initiatives in the initiative table 2621. The user A 120A may view the selected initiative 2622 in the initiatives table 2621 and may remove the selected initiative 2622 from the initiatives table 2621 by clicking on the remove initiative button 2626. The user A 120A may change the reduction factor associated with the selected initiative 2622 by entering a new reduction factor in the factor field 2628 and clicking the set factor button 2627. The user A 120A may view the savings achieved by similar data centers implementing the selected initiative 2622 in the similar savings data 2623. The system 100 may determine the similar data centers' savings using the historical data center data, or relevant studies data.

The user A 120A may view data related to the relevant studies in the relevant studies subsection 2630. The user A 120A may view the relevant studies in the studies table 2635. The user A 120A may click on a study in the studies table 2632 to view the study profile data 2638 associated with the study. The user A 120A may use the study profile data 2638 as guidance in selecting a reduction factor in the factor field 2628. The study profile data 2638 may display information regarding the study profile of the selected study 2632, including the study name, the factor value, the link to the study, and comments regarding the study. The user A 120A may receive help by clicking on the help button 2660 and the user A 120A may submit feedback by clicking on the feedback button 2670.

Figure 27:
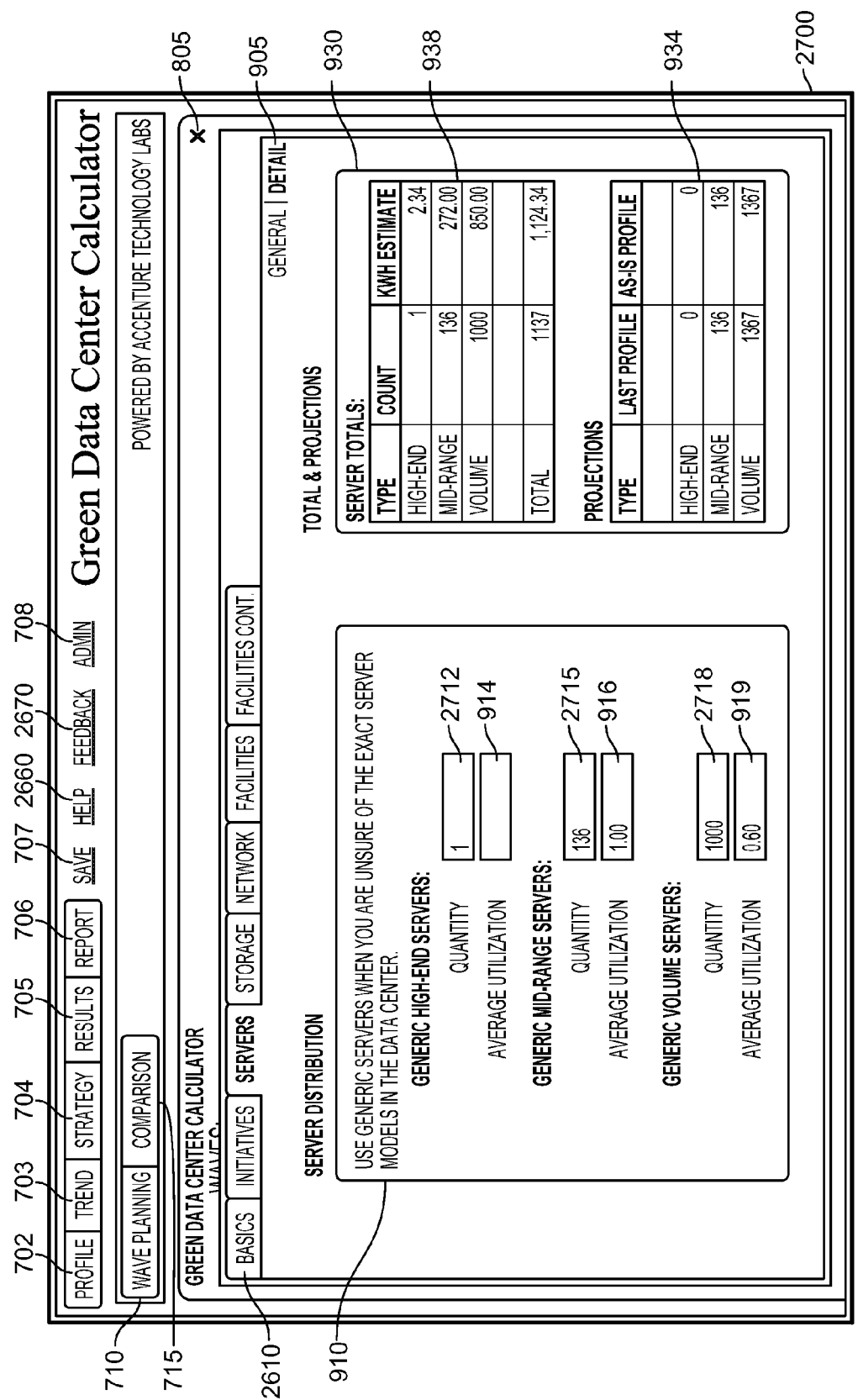
FIG. 27 is a screenshot of a user interface user interface for inputting generic server profile information in the system of FIG. 1, or other systems for providing strategies for increasing efficiency of data centers.

FIG. 27 is a screenshot of a user interface for inputting generic server profile information in the system of FIG. 1, or other systems for providing strategies for increasing efficiency of data centers. The service provider server 240 may display the screenshot 2700 to the user A 120A when the user A 120A clicks on the servers tab in the details tabset 2610. The user A 120A may use the screenshot 2700 to input their data center configuration data. The screenshot 2700 may include a profile tab 702, a trend tab 703, a strategy tab 704, a results tab 705, a report tab 706, save button 707, a help button 2660, a feedback button 2670, an administration button 708, a general tab 710, a details tab 715, a details tabset 2610, a close button 805, a server distribution subsection 910, a projections subsection 930 and a general/detail button 905. The server distribution subsection 910 may include a high-end servers quantity field 2712, a high-end servers average utilization field 914, a mid-range servers quantity field 2715, a mid-range servers average utilization field 916, a generic volume servers quantity field 2718 and a generic volume servers average utilization field 919. The projection subsection 930 may include a server totals table 938 and a projections table 934.

In operation the user A 120A may enter generic server information in the server distribution subsection 910. The user A 120A may choose to enter generic server information when they are unsure of the exact server models in the data center. The system 100 may use average values from the historical data center information to determine the power consumption and processing power of the generic server types. The user A 120A may enter the number of generic high end servers in the high end servers quantity field 2712 and the utilization of the generic high end servers in the high end servers utilization field 914. Similarly the user A 120A may enter the number of mid range servers in the mid range servers quantity field 2715 and the average utilization of the mid range servers in the mid range servers utilization field 916. Lastly the user A 120A may enter the number of generic volume servers in the generic volume servers quantity field 2718 and the average utilization of the generic volume servers in the volume servers utilization field 919.

In the projections subsection 930 the service provider 140 may display the projected number of servers required for the user A 120A to implement the reduction factor and initiatives selected in FIG. 26. The projections may be based on the values the user A 120A entered in the server distribution subsection 910, the initiatives selected by the user A 120A in the initiatives table 2621 in FIG. 26, and the historical data center data. The service provider 140 may utilize historical data center data pertaining to data centers with a similar profile as the data center of the user A 120A to populate the projections subsection 930. The user A 120A may click on the general/detail button 905 to change the screen from the general view to the detailed view. The user A 120A may receive help by clicking on the help button 2660 and the user A 120A may submit feedback by clicking on the feedback button 2670.

Figure 28:
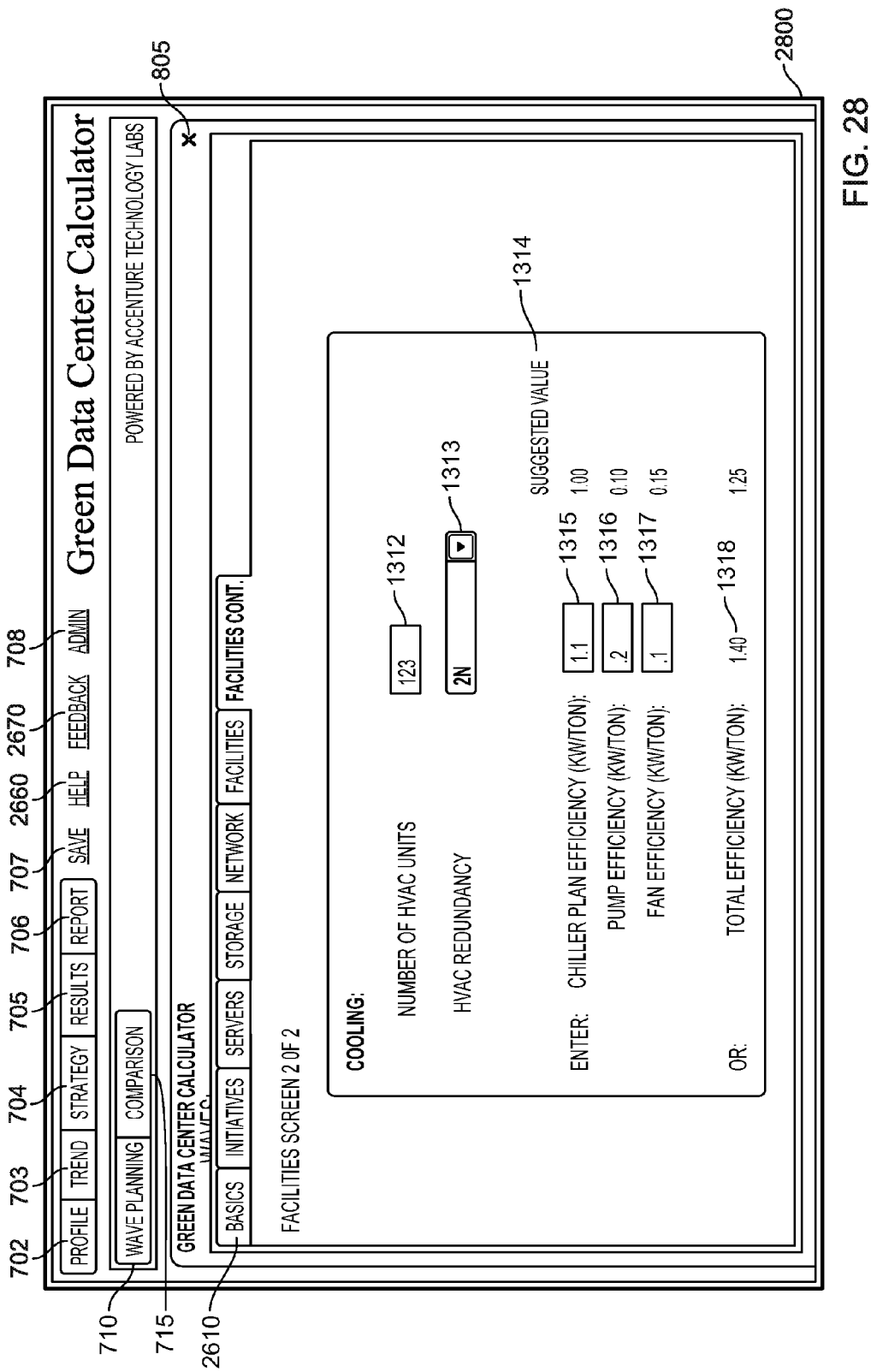
FIG. 28 is a screenshot of a user interface for inputting additional facilities profile information in the system of FIG. 1, or other systems for providing strategies for increasing efficiency of data centers.

FIG. 28 is a screenshot of a user interface for inputting additional facilities profile information in the system of FIG. 1, or other systems for providing strategies for increasing efficiency of data centers. The service provider server 240 may display the screenshot 2800 to the user A 120A when the user A 120A clicks on the "Facilities Cont." tab in the details tabset 2610. The user A 120A may use the screenshot 2800 to input their data center configuration data. The screenshot 2800 may allow the user A 120A to create a profile of the facilities supporting their data center. The screenshot 2800 may include a profile tab 702, a trend tab 703, a strategy tab 704, a results tab 705, a report tab 706, save button 707, a help button 2660, a feedback button 2670, an administration button 708, a general tab 710, a details tab 715, a details tabset 2610, a close button 805, a cooling subsection 1310 and a general/detail button 905. The cooling subsection 1310 may include a number of HVAC units field 1312, an HVAC redundancy selector 1313, a suggested value column 1314, a chiller plan efficiency field 1315, a pump efficiency field 1316, a fan efficiency field 1317, and a total efficiency field 1318.

In operation the user A 120A may identify the number of HVAC units in the data center with the number of HVAC units field 1312, and the HVAC redundancy with the HVAC redundancy selector 1313. The user A 120A may input the chiller plan efficiency in kilowatts/ton in the chiller plan efficiency field 1315. The pump efficiency may be inputted in the pump efficiency field 1316, and the fan efficiency may be inputted in the fan efficiency field 1317. The total efficiency may be displayed in the total efficiency field 1318. The user A 120A may receive help by clicking on the help button 2660 and the user A 120A may submit feedback by clicking on the feedback button 2670.

FIG. 29 illustrates a general computer system 2900, which may represent a service provider server 240, or any of the other computing devices referenced herein. The computer system 2900 may include a set of instructions 2924 that may be executed to cause the computer system 2900 to perform any one or more of the methods or computer based functions disclosed herein. The computer system 2900 may operate as a standalone device or may be connected, e.g., using a network, to other computer systems or peripheral devices.

In a networked deployment, the computer system may operate in the capacity of a server or as a client user computer in a server-client user network environment, or as a peer computer system in a peer-to-peer (or distributed) network environment. The computer system 2900 may also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions 2924 (sequential or otherwise) that specify actions to be taken by that machine. In a particular embodiment, the computer system 2900 may be implemented using electronic devices that provide voice, video or data communication. Further, while a single computer system 2900 may be illustrated, the term "system" shall also be taken to include any collection of systems or subsystems that individually or jointly execute a set, or multiple sets, of instructions to perform one or more computer functions.

As illustrated in FIG. 29, the computer system 2900 may include a processor 2902, such as, a central processing unit (CPU), a graphics processing unit (GPU), or both. The processor 2902 may be a component in a variety of systems. For example, the processor 2902 may be part of a standard personal computer or a workstation. The processor 2902 may be one or more general processors, digital signal processors, application specific integrated circuits, field programmable gate arrays, servers, networks, digital circuits, analog circuits, combinations thereof, or other now known or later developed devices for analyzing and processing data. The processor 2902 may implement a software program, such as code generated manually (i.e., programmed).

The computer system 2900 may include a memory 2904 that can communicate via a bus 2908. The memory 2904 may be a main memory, a static memory, or a dynamic memory. The memory 2904 may include, but may not be limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one case, the memory 2904 may include a cache or random access memory for the processor 2902. Alternatively or in addition, the memory 2904 may be separate from the processor 2902, such as a cache memory of a processor, the system memory, or other memory. The memory 2904 may be an external storage device or database for storing data. Examples may include a hard drive, compact disc ("CD"), digital video disc ("DVD"), memory card, memory stick, floppy disc, universal serial bus ("USB") memory device, or any other device operative to store data. The memory 2904 may be operable to store instructions 2924 executable by the processor 2902. The functions, acts or tasks illustrated in the figures or described herein may be performed by the programmed processor 2902 executing the instructions 2924 stored in the memory 2904. The functions, acts or tasks may be independent of the particular type of instructions set, storage media, processor or processing strategy and may be performed by software, hardware, integrated circuits, firm-ware, micro-code and the like, operating alone or in combination. Likewise, processing strategies may include multiprocessing, multitasking, parallel processing and the like.

The computer system 2900 may further include a display 2914, such as a liquid crystal display (LCD), an organic light emitting diode (OLED), a flat panel display, a solid state display, a cathode ray tube (CRT), a projector, a printer or other now known or later developed display device for outputting determined information. The display 2914 may act as an interface for the user to see the functioning of the processor 2902, or specifically as an interface with the software stored in the memory 2904 or in the drive unit 2906.

Additionally, the computer system 2900 may include an input device 2912 configured to allow a user to interact with any of the components of system 2900. The input device 2912 may be a number pad, a keyboard, or a cursor control device, such as a mouse, or a joystick, touch screen display, remote control or any other device operative to interact with the system 2900.

The computer system 2900 may also include a disk or optical drive unit 2906. The disk drive unit 2906 may include a computer-readable medium 2922 in which one or more sets of instructions 2924, e.g. software, can be embedded. Further, the instructions 2924 may perform one or more of the methods or logic as described herein. The instructions 2924 may reside completely, or at least partially, within the memory 2904 and/or within the processor 2902 during execution by the computer system 2900. The memory 2904 and the processor 2902 also may include computer-readable media as discussed above.

The present disclosure contemplates a computer-readable medium 2922 that includes instructions 2924 or receives and executes instructions 2924 responsive to a propagated signal; so that a device connected to a network 235 may communicate voice, video, audio, images or any other data over the network 235. Further, the instructions 2924 may be transmitted or received over the network 235 via a communication interface 2918. The communication interface 2918 may be a part of the processor 2902 or may be a separate component. The communication interface 2918 may be created in software or may be a physical connection in hardware. The communication interface 2918 may be configured to connect with a network 235, external media, the display 2914, or any other components in system 2900, or combinations thereof. The connection with the network 235 may be a physical connection, such as a wired Ethernet connection or may be established wirelessly as discussed below. Likewise, the additional connections with other components of the system 2900 may be physical connections or may be established wirelessly. In the case of a service provider server 240 or the content provider servers 110A-N, the servers may communicate with users 120A-N through the communication interface 2918.

The network 235 may include wired networks, wireless networks, or combinations thereof. The wireless network may be a cellular telephone network, an 802.11, 802.16, 802.20, or WiMax network. Further, the network 235 may be a public network, such as the Internet, a private network, such as an intranet, or combinations thereof, and may utilize a variety of networking protocols now available or later developed including, but not limited to TCP/IP based networking protocols.

The computer-readable medium 2922 may be a single medium, or the computer-readable medium 2922 may be a single medium or multiple media, such as a centralized or distributed database, and/or associated caches and servers that store one or more sets of instructions. The term "computer-readable medium" may also include any medium that may be capable of storing, encoding or carrying a set of instructions for execution by a processor or that may cause a computer system to perform any one or more of the methods or operations disclosed herein.

The computer-readable medium 2922 may include a solid-state memory such as a memory card or other package that houses one or more non-volatile read-only memories. The computer-readable medium 2922 also may be a random access memory or other volatile re-writable memory. Additionally, the computer-readable medium 2922 may include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that may be a tangible storage medium. Accordingly, the disclosure may be considered to include any one or more of a computer-readable medium or a distribution medium and other equivalents and successor media, in which data or instructions may be stored.

Alternatively or in addition, dedicated hardware implementations, such as application specific integrated circuits, programmable logic arrays and other hardware devices, may be constructed to implement one or more of the methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system may encompass software, firmware, and hardware implementations.

The methods described herein may be implemented by software programs executable by a computer system. Further, implementations may include distributed processing, component/object distributed processing, and parallel processing. Alternatively or in addition, virtual computer system processing maybe constructed to implement one or more of the methods or functionality as described herein.

Although components and functions are described that may be implemented in particular embodiments with reference to particular standards and protocols, the components and functions are not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations described herein are intended to provide a general understanding of the structure of various embodiments. The illustrations are not intended to serve as a complete description of all of the elements and features of apparatus, processors, and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

The above disclosed subject matter is to be considered illustrative, and not restrictive, and the appended claims are intended to cover all such modifications, enhancements, and other embodiments, which fall within the true spirit and scope of the description. Thus, to the maximum extent allowed by law, the scope is to be determined by the broadest permissible interpretation of the following claims and their equivalents, and shall not be restricted or limited by the foregoing detailed description.

We claim:

1. A method for providing a strategy for reducing the energy consumption of a data center, the method comprising:

identifying a historical data center profile dataset which stores a plurality of historical data center configurations over a period of time;

receiving an initial data center configuration that describes an inventory of information technology equipment of an initial data center;

receiving an initial data center profile that describes characteristics of the initial data center;

receiving a selected data center initiative that provides a strategy for reducing an energy use of the initial data center;

determining a subset of data center configurations from the plurality of historical data center configurations described in the historical data center profile dataset wherein the subset of historical data center configurations provides historical data center configurations that have a similar profile as the initial data center;

determining a range of energy use reduction achieved by the subset of historical data center configurations by implementing the selected data center initiative;

receiving a target energy use reduction from the user, the target energy use reduction being selected from the range of energy use reduction achieved by the subset of historical data center configurations;

determining a recommended data center configuration capable of achieving the target energy use reduction, wherein the recommended data center configuration is determined based on the initial data center configuration and the range of energy use reduction achieved by the subset of historical data center configurations; and providing the recommended data center configuration to the user.

2. The method of claim 1 further comprising displaying a graph comparing the initial data center configuration and the recommended data center configuration.

3. The method of claim 2 further comprising displaying a graph comparing a projected quantity of carbon emissions resulting from the initial data center configuration to a projected quantity of carbon emissions resulting from the recommended data center configuration.

4. The method of claim 2 further comprising:

determining a projected energy increase factor;

determining a projected energy cost associated with the initial data center configuration, and a projected energy cost associated with the recommended data center configuration, in accordance with the projected energy increase factor; and displaying a graph comparing the projected energy cost associated with the initial data center configuration and the projected energy cost associated with the recommended data center configuration.

5. The method of claim 1 where in the initial data center configuration comprises an equipment inventory of the initial data center and a facilities inventory of the initial data center.

6. The method of claim 5 wherein the selected data center initiative comprises an initiative based on increasing an efficiency of the equipment.

7. The method of claim 6 wherein the selected data center initiative comprises at least one of a virtualization initiative, a consolidation initiative, a resource optimization initiative, and an energy efficiency initiative.

8. The method of claim 5 wherein the selected data center initiative comprises an initiative based on increasing an efficiency of the facilities.

9. The method of claim 8 wherein the selected data center initiative comprises at least one of a power delivery initiative and a cooling initiative.

10. The method of claim 1 wherein the recommended data center configuration comprises a description and a quantity of each server used in the recommended data center configuration.

11. A system for providing a strategy for reducing the energy consumption of a data center, the system comprising:
a memory to store:
a historical data center dataset that comprises a plurality of historical data center configurations over a period of time,
a profile of an initial data center that describes characteristics of the initial data center, and
an initial data center configuration that describes an inventory of information technology equipment of the initial data center;
an interface operatively connected to the memory, the interface operative to communicate with a user; and
a processor operatively connected to the memory and the interface, the processor operative to:
identify the historical data center dataset,
receive the initial data center profile and the initial data center configuration from the user via the interface,
receive from the user via the interface, a selected data center initiative that provides a strategy for reducing an energy use of the initial data center,
determine a subset of historical data center configurations from the plurality of historical data center configurations described in the historical data center dataset wherein the subset of historical data center configurations provides historical data configurations that have a similar profile as the initial data center,
determine a range of energy use reduction achieved by the subset of historical data center configurations by implementing the selected data center initiative;
receive a target energy use reduction from the user via the interface, the target energy use reduction being selected from the range of energy use reduction achieved by the subset of historical data center configurations;
determine a recommended data center configuration capable of achieving the target energy use reduction, wherein the recommended data center configuration is determined based on the initial data center configuration and the range of energy use reduction achieved by the subset of historical data center configurations, and
provide the recommended configuration to the user via the interface.

12. The system of claim 11 wherein the interface is further operative to communicate with an administrator.

13. The system of claim 12 wherein the administrator maintains the historical data center database via the interface.

14. The system of claim 11 wherein the processor is further operative to generate a graph comparing a projected energy use of the initial data center configuration with a projected energy use of the recommended data center configuration.

15. The system of claim 11 wherein the processor is further operative to calculate a reduction in energy costs associated with an implementation of the recommended data center configuration.

16. The system of claim 15 wherein the processor is further operative to incorporate a projected future energy cost in calculating the reduction in energy costs associated with an implementation of the recommended data center configuration.

* * * * *

UNITED STATES PATENT AND TRADEMARK OFFICE
CERTIFICATE OF CORRECTION

PATENT NO. : 8,395,621 B2
APPLICATION NO. : 12/030040
DATED : March 12, 2013
INVENTOR(S) : Teresa S. Tung et al.

It is certified that error appears in the above-identified patent and that said Letters Patent is hereby corrected as shown below:

In the Specification

In column 10, line 35, after "may use" replace "ADOBE AIRP)" with --ADOBE AIR®--.

In column 12, line 52, replace "/(1-V)]" with --/(1-v)]--.

Signed and Sealed this
Second Day of July, 2013

Teresa Stanek Rea
*Acting Director of the United States Patent and Trademark Office*